(12) United States Patent
Fahey et al.

(10) Patent No.: US 12,533,500 B2
(45) Date of Patent: Jan. 27, 2026

(54) ADJUSTABLE INTERATRIAL SHUNTS AND ASSOCIATED SYSTEMS AND METHODS

(71) Applicant: Shifamed Holdings, LLC, Campbell, CA (US)

(72) Inventors: Brian Fahey, Menlo Park, CA (US); Tom Saul, Moss Beach, CA (US); Claudio Argento, Felton, CA (US); Reza Kassayan, Atherton, CA (US); William Jason Fox, San Mateo, CA (US); Stefan Schreck, Duvall, CA (US); Anthony Pantages, San Jose, CA (US); Amr Salahieh, Saratoga, CA (US); Marwan Berrada, Los Gatos, CA (US); Susan Philip, Santa Rosa, CA (US); Veronica Neiman, San Jose, CA (US)

(73) Assignee: Shifamed Holdings, LLC, Campbell, CA (US)

( * ) Notice: Subject to any disclaimer, the term of this patent is extended or adjusted under 35 U.S.C. 154(b) by 733 days.

(21) Appl. No.: 17/618,220

(22) PCT Filed: Jun. 18, 2020

(86) PCT No.: PCT/US2020/038549
§ 371 (c)(1),
(2) Date: Dec. 10, 2021

(87) PCT Pub. No.: WO2020/257530
PCT Pub. Date: Dec. 24, 2020

(65) Prior Publication Data
US 2022/0347446 A1   Nov. 3, 2022

Related U.S. Application Data

(60) Provisional application No. 62/971,528, filed on Feb. 7, 2020, provisional application No. 62/971,812, filed
(Continued)

(51) Int. Cl.
*A61M 27/00* (2006.01)

(52) U.S. Cl.
CPC ... *A61M 27/008* (2013.01); *A61M 2205/0266* (2013.01); *A61M 2205/3344* (2013.01); *A61M 2210/125* (2013.01)

(58) Field of Classification Search
CPC .......... A61M 27/002; A61M 2210/125; A61M 2205/0266; A61M 60/161; A61M 60/157;
(Continued)

(56) References Cited

U.S. PATENT DOCUMENTS

| 3,874,388 A | 4/1975 | King et al. |
| 4,601,309 A | 7/1986 | Chang |

(Continued)

FOREIGN PATENT DOCUMENTS

| AU | 2005211243 | 8/2005 |
| AU | 2010344182 | 8/2012 |

(Continued)

OTHER PUBLICATIONS

Oxford Dictionary. Oxford Dictionary of Sports Science and Medicine [online]. 3rd revised edition. Oxford University Press, 2006 [retrieved on Apr. 3, 2024]. Retrieved from the Internet:<URL: https://www.oxfordreference.com/display/10.1093/acref/9780198568506.001.0001/acref-9780198568506-e-2672?rskey> (Year: 2006).*

(Continued)

*Primary Examiner* — Nicholas J. Weiss
*Assistant Examiner* — Linnae E. Raymond
(74) *Attorney, Agent, or Firm* — Perkins Coie LLP

(57) ABSTRACT

The present technology is generally directed to interatrial shunting systems and associated devices and methods. For example, a system configured in accordance with embodiments of the present technology can include a shunting element implantable into a patient at or adjacent a septal wall. The shunting element can have a lumen that fluidly (Continued)

connects a left atrium and a right atrium of the patient to facilitate blood flow therebetween when the shunting element is implanted. In some embodiments, the system further includes a flow control element to selectively control blood flow between the left atrium and the right atrium.

7 Claims, 25 Drawing Sheets

Related U.S. Application Data on Feb. 7, 2020, provisional application No. 62/970,269, filed on Feb. 5, 2020, provisional application No. 62/963,697, filed on Jan. 21, 2020, provisional application No. 62/897,938, filed on Sep. 9, 2019, provisional application No. 62/875,346, filed on Jul. 17, 2019, provisional application No. 62/868,626, filed on Jun. 28, 2019, provisional application No. 62/863,163, filed on Jun. 18, 2019.

(58) Field of Classification Search
CPC ...... A61B 2017/1139; A61B 17/12109; A61B 17/0057; A61B 17/12122; A61B 17/11; A61B 2017/00557; A61B 2017/00247; A61B 2017/00575; A61B 2017/1107; A61B 2017/00867; A61B 2017/00243; A61F 2/2445; A61F 2/2418; A61F 2/90; A61F 2250/0039; A61F 2250/001; A61F 2210/0023; A61F 2230/0069; A61F 2230/0078

See application file for complete search history.

(56) References Cited

U.S. PATENT DOCUMENTS

| | | | |
|---|---|---|---|
| 4,662,355 A | 5/1987 | Pieronne et al. | |
| 4,705,507 A | 11/1987 | Boyles | |
| 4,836,204 A | 6/1989 | Landymore et al. | |
| 4,979,955 A | 12/1990 | Smith | |
| 4,995,857 A | 2/1991 | Arnold | |
| 5,186,431 A | 2/1993 | Tamari | |
| 5,267,940 A | 12/1993 | Moulder | |
| 5,290,227 A | 3/1994 | Pasque | |
| 5,312,341 A | 5/1994 | Turi | |
| 5,326,374 A | 7/1994 | Ilbawi et al. | |
| 5,332,402 A | 7/1994 | Teitelbaum | |
| 5,334,217 A | 8/1994 | Das | |
| 5,409,019 A | 4/1995 | Wilk | |
| 5,429,144 A | 7/1995 | Wilk | |
| 5,500,015 A | 3/1996 | Deac | |
| 5,531,759 A | 7/1996 | Kensey et al. | |
| 5,556,386 A | 9/1996 | Todd | |
| 5,584,803 A | 12/1996 | Stevens et al. | |
| 5,597,377 A | 1/1997 | Aldea | |
| 5,645,559 A | 7/1997 | Hachtman et al. | |
| 5,655,548 A | 8/1997 | Nelson et al. | |
| 5,662,711 A * | 9/1997 | Douglas .................. A61F 2/06 604/9 |
| 5,702,412 A | 12/1997 | Popov et al. | |
| 5,725,552 A | 3/1998 | Kotula et al. | |
| 5,741,297 A | 4/1998 | Simon | |
| 5,795,307 A | 8/1998 | Krueger | |
| 5,810,836 A | 9/1998 | Hussein et al. | |
| 5,824,071 A | 10/1998 | Nelson et al. | |
| 5,916,193 A | 6/1999 | Stevens et al. | |
| 5,941,850 A | 8/1999 | Shah et al. | |
| 5,957,949 A | 9/1999 | Leonhardt et al. | |
| 6,039,759 A | 3/2000 | Carpentier et al. | |
| 6,077,298 A | 6/2000 | Tu et al. | |
| 6,126,686 A | 10/2000 | Badylak et al. | |
| 6,165,188 A | 12/2000 | Saadat et al. | |
| 6,210,318 B1 | 4/2001 | Lederman | |
| 6,217,541 B1 | 4/2001 | Yu | |
| 6,242,762 B1 | 6/2001 | Brown et al. | |
| 6,254,564 B1 | 7/2001 | Wilk et al. | |
| 6,260,552 B1 | 7/2001 | Mortier et al. | |
| 6,270,526 B1 | 8/2001 | Cox | |
| 6,277,078 B1 | 8/2001 | Porat et al. | |
| 6,302,892 B1 | 10/2001 | Wilk | |
| 6,328,699 B1 | 12/2001 | Eigler et al. | |
| 6,344,022 B1 | 2/2002 | Jarvik | |
| 6,358,277 B1 | 3/2002 | Duran | |
| 6,406,422 B1 | 6/2002 | Landesberg | |
| 6,447,539 B1 | 9/2002 | Nelson et al. | |
| 6,451,051 B2 | 9/2002 | Drasler et al. | |
| 6,458,153 B1 | 10/2002 | Bailey et al. | |
| 6,468,303 B1 | 10/2002 | Amplatz et al. | |
| 6,478,776 B1 | 11/2002 | Rosenman et al. | |
| 6,491,705 B2 | 12/2002 | Gifford, III et al. | |
| 6,527,698 B1 | 3/2003 | Kung et al. | |
| 6,544,208 B2 | 4/2003 | Ethier et al. | |
| 6,562,066 B1 | 5/2003 | Martin | |
| 6,572,652 B2 | 6/2003 | Shaknovich | |
| 6,589,198 B1 | 7/2003 | Soltanpour et al. | |
| 6,632,169 B2 | 10/2003 | Korakianitis et al. | |
| 6,638,303 B1 | 10/2003 | Campbell | |
| 6,641,610 B2 * | 11/2003 | Wolf .................. A61F 2/06 623/1.3 |
| 6,652,578 B2 | 11/2003 | Bailey et al. | |
| 6,685,664 B2 | 2/2004 | Levin et al. | |
| 6,712,836 B1 | 3/2004 | Berg et al. | |
| 6,911,043 B2 | 6/2005 | Myers et al. | |
| 7,001,409 B2 | 2/2006 | Amplatz | |
| 7,011,095 B2 | 3/2006 | Wolf et al. | |
| 7,056,294 B2 | 6/2006 | Khairkhahan et al. | |
| 7,149,587 B2 | 12/2006 | Wardle et al. | |
| 7,175,656 B2 | 2/2007 | Khairkhahan | |
| 7,270,675 B2 | 9/2007 | Chun et al. | |
| 7,294,115 B1 | 11/2007 | Wilk | |
| 7,311,690 B2 | 12/2007 | Burnett | |
| 7,311,730 B2 | 12/2007 | Gabbay | |
| 7,317,951 B2 | 1/2008 | Schneider et al. | |
| 7,390,310 B2 | 6/2008 | McCusker et al. | |
| 7,513,908 B2 | 4/2009 | Lattouf | |
| 7,524,329 B2 | 4/2009 | Rucker | |
| 7,524,330 B2 | 4/2009 | Berreklouw | |
| 7,524,332 B2 | 4/2009 | Osborne et al. | |
| 7,608,067 B2 | 10/2009 | Bonni | |
| 7,699,059 B2 | 4/2010 | Fonseca et al. | |
| 7,736,327 B2 | 6/2010 | Wilk et al. | |
| 7,780,725 B2 | 8/2010 | Haug et al. | |
| 7,794,473 B2 | 9/2010 | Tessmer et al. | |
| 7,806,921 B2 | 10/2010 | Hoffman | |
| 7,892,246 B2 | 2/2011 | Akin et al. | |
| 7,905,901 B2 | 3/2011 | Corcoran et al. | |
| 7,922,764 B2 | 4/2011 | Gordy et al. | |
| 7,938,840 B2 | 5/2011 | Golden et al. | |
| 7,967,769 B2 | 6/2011 | Faul et al. | |
| 7,988,724 B2 | 8/2011 | Salahieh et al. | |
| 8,012,198 B2 | 9/2011 | Hill et al. | |
| 8,016,877 B2 | 9/2011 | Seguin et al. | |
| 8,043,360 B2 | 10/2011 | McNamara et al. | |
| 8,070,708 B2 | 12/2011 | Rottenberg et al. | |
| 8,091,556 B2 | 1/2012 | Keren et al. | |
| 8,157,860 B2 | 4/2012 | McNamara et al. | |
| 8,172,896 B2 | 5/2012 | McNamara et al. | |
| 8,191,220 B2 | 6/2012 | Magnuson et al. | |
| 8,235,933 B2 | 8/2012 | Keren et al. | |
| 8,252,042 B2 | 8/2012 | McNamara et al. | |
| 8,303,511 B2 | 11/2012 | Eigler et al. | |
| 8,348,996 B2 | 1/2013 | Tuval et al. | |
| 8,398,708 B2 | 3/2013 | Meiri et al. | |
| 8,460,366 B2 | 6/2013 | Rowe | |
| 8,460,372 B2 | 6/2013 | McNamara et al. | |
| 8,597,225 B2 | 12/2013 | Kapadia | |
| 8,647,381 B2 | 2/2014 | Essinger et al. | |
| 8,696,611 B2 | 4/2014 | Nitzan et al. | |
| 8,740,962 B2 | 6/2014 | Finch et al. | |
| 8,745,845 B2 | 6/2014 | Finch et al. | |
| 8,747,458 B2 | 6/2014 | Tuval et al. | |
| 8,752,258 B2 | 6/2014 | Finch et al. | |

(56) References Cited

U.S. PATENT DOCUMENTS

| | | |
|---|---|---|
| 8,764,848 B2 | 7/2014 | Callaghan et al. |
| 8,882,697 B2 | 11/2014 | Celermajer et al. |
| 8,951,223 B2 | 2/2015 | McNamara et al. |
| 9,005,155 B2 | 4/2015 | Sugimoto |
| 9,034,034 B2 | 5/2015 | Nitzan et al. |
| 9,138,213 B2 | 9/2015 | Amin et al. |
| 9,205,236 B2 | 12/2015 | McNamara et al. |
| 9,232,997 B2 | 1/2016 | Sugimoto et al. |
| 9,277,995 B2 | 3/2016 | Celermajer et al. |
| 9,358,371 B2 | 6/2016 | McNamara et al. |
| 9,456,812 B2 | 10/2016 | Finch et al. |
| 9,629,715 B2 | 4/2017 | Nitzan et al. |
| 9,642,993 B2 | 5/2017 | McNamara et al. |
| 9,649,480 B2 | 5/2017 | Sugimoto et al. |
| 9,681,948 B2 | 6/2017 | Levi et al. |
| 9,707,382 B2 | 7/2017 | Nitzan et al. |
| 9,713,696 B2 | 7/2017 | Yacoby et al. |
| 9,724,499 B2 | 8/2017 | Rottenberg et al. |
| 9,757,107 B2 | 9/2017 | McNamara et al. |
| 9,775,636 B2 | 10/2017 | Fazio et al. |
| 9,918,856 B2 | 3/2018 | Favier et al. |
| 9,937,036 B2 | 4/2018 | Sugimoto et al. |
| 9,943,670 B2 | 4/2018 | Keren et al. |
| 9,980,815 B2 | 5/2018 | Nitzan et al. |
| 10,045,766 B2 | 8/2018 | McNamara et al. |
| 10,076,403 B1 | 9/2018 | Eigler et al. |
| 10,188,375 B2 | 1/2019 | McNamara et al. |
| 10,207,087 B2 | 2/2019 | Keren |
| 10,251,740 B2 | 4/2019 | Eigler et al. |
| 10,292,690 B2 | 5/2019 | Celermajer et al. |
| 10,350,384 B2 | 7/2019 | Farnan et al. |
| 10,357,357 B2 | 7/2019 | Levi et al. |
| 10,368,981 B2 | 8/2019 | Nitzan et al. |
| 10,376,359 B2 | 8/2019 | Essinger et al. |
| 10,376,680 B2 | 8/2019 | McNamara et al. |
| 10,398,421 B2 | 9/2019 | Celermajer |
| 10,405,903 B1 | 9/2019 | Biesinger et al. |
| 10,413,284 B2 | 9/2019 | McNamara et al. |
| 10,413,286 B2 | 9/2019 | McNamara et al. |
| 10,426,976 B1 | 10/2019 | Parsai et al. |
| 10,463,477 B2 | 11/2019 | Forcucci et al. |
| 10,463,490 B2 | 11/2019 | Rottenberg et al. |
| 10,478,594 B2 | 11/2019 | Yacoby et al. |
| 10,568,751 B2 | 2/2020 | McNamara |
| 10,588,611 B2 | 3/2020 | Magnin et al. |
| 10,610,210 B2 | 4/2020 | Finch et al. |
| 10,624,621 B2 | 4/2020 | Celermajer |
| 10,632,292 B2 | 4/2020 | Forcucci et al. |
| 10,639,459 B2 | 5/2020 | Nitzan et al. |
| 10,675,450 B2 | 6/2020 | Finch |
| 10,828,151 B2 | 11/2020 | Nitzan et al. |
| 10,835,394 B2 | 11/2020 | Nae et al. |
| 10,898,698 B1 * | 1/2021 | Eigler ............... A61B 17/0057 |
| 10,912,645 B2 | 2/2021 | Rottenberg et al. |
| 10,925,706 B2 | 2/2021 | Eigler et al. |
| 10,932,786 B2 | 3/2021 | McNamara et al. |
| 10,940,296 B2 | 3/2021 | Keren |
| 10,945,716 B2 | 3/2021 | Chen et al. |
| 11,135,410 B2 | 10/2021 | Finch et al. |
| 2002/0169371 A1 | 11/2002 | Gilderdale |
| 2002/0169475 A1 | 11/2002 | Gainor et al. |
| 2002/0177891 A1 | 11/2002 | Miles et al. |
| 2003/0125798 A1 | 7/2003 | Martin |
| 2003/0127090 A1 | 7/2003 | Gifford et al. |
| 2004/0016514 A1 | 1/2004 | Nien |
| 2004/0077988 A1 | 4/2004 | Tweden et al. |
| 2004/0088045 A1 | 5/2004 | Cox |
| 2004/0093075 A1 | 5/2004 | Kuehne |
| 2004/0143294 A1 | 7/2004 | Corcoran et al. |
| 2004/0147869 A1 | 7/2004 | Wolf et al. |
| 2004/0162514 A1 | 8/2004 | Alferness et al. |
| 2004/0210190 A1 | 10/2004 | Kohler et al. |
| 2004/0215067 A1 | 10/2004 | Stiger et al. |
| 2004/0215323 A1 | 10/2004 | Stiger |
| 2005/0033351 A1 | 2/2005 | Newton |
| 2005/0055082 A1 | 3/2005 | Ben Muvhar et al. |
| 2005/0148925 A1 | 7/2005 | Rottenberg et al. |
| 2005/0165344 A1 | 7/2005 | Dobak, III |
| 2005/0192627 A1 | 9/2005 | Whisenant et al. |
| 2006/0025857 A1 | 2/2006 | Bergheim et al. |
| 2006/0111660 A1 | 5/2006 | Wolf et al. |
| 2006/0116590 A1 | 6/2006 | Fayram et al. |
| 2007/0010837 A1 | 1/2007 | Tanaka |
| 2007/0010852 A1 | 1/2007 | Blaeser et al. |
| 2007/0043435 A1 | 2/2007 | Seguin et al. |
| 2007/0142907 A1 * | 6/2007 | Moaddeb ............... A61F 2/2469 623/2.37 |
| 2007/0179365 A1 | 8/2007 | Bitton et al. |
| 2007/0213813 A1 | 9/2007 | Von Segesser et al. |
| 2007/0282157 A1 | 12/2007 | Rottenberg et al. |
| 2008/0119891 A1 | 5/2008 | Miles et al. |
| 2009/0243956 A1 | 10/2009 | Keilman et al. |
| 2009/0276040 A1 | 11/2009 | Rowe et al. |
| 2010/0234716 A1 | 9/2010 | Engel |
| 2011/0054515 A1 | 3/2011 | Bridgeman et al. |
| 2011/0218480 A1 | 9/2011 | Rottenberg et al. |
| 2011/0218481 A1 | 9/2011 | Rottenberg et al. |
| 2011/0257723 A1 | 10/2011 | McNamara |
| 2011/0295183 A1 | 12/2011 | Finch et al. |
| 2011/0306916 A1 | 12/2011 | Nitzan et al. |
| 2012/0290062 A1 | 11/2012 | McNamara et al. |
| 2013/0060323 A1 | 3/2013 | McHugo |
| 2013/0178750 A1 | 7/2013 | Sheehan et al. |
| 2013/0331920 A1 | 12/2013 | Osypka |
| 2014/0128796 A1 | 5/2014 | Keren et al. |
| 2014/0163449 A1 | 6/2014 | Rottenberg et al. |
| 2014/0277054 A1 | 9/2014 | McNamara et al. |
| 2015/0034217 A1 | 2/2015 | Vad |
| 2015/0119796 A1 | 4/2015 | Finch |
| 2015/0230843 A1 | 8/2015 | Palmer et al. |
| 2016/0151179 A1 | 6/2016 | Favier et al. |
| 2017/0007261 A1 | 1/2017 | Paamand et al. |
| 2017/0072173 A1 | 3/2017 | Van Dam et al. |
| 2017/0340460 A1 | 11/2017 | Rosen et al. |
| 2018/0014828 A1 | 1/2018 | Fonte et al. |
| 2018/0028824 A1 | 2/2018 | Pivonka et al. |
| 2018/0070841 A1 | 3/2018 | Honore et al. |
| 2018/0085128 A1 | 3/2018 | Sellomo et al. |
| 2018/0256865 A1 | 9/2018 | Finch et al. |
| 2018/0311406 A1 | 11/2018 | Francis et al. |
| 2019/0008628 A1 * | 1/2019 | Eigler ............... A61F 2/91 |
| 2019/0021861 A1 | 1/2019 | Finch |
| 2019/0069815 A1 | 3/2019 | Burnes et al. |
| 2019/0151122 A1 | 5/2019 | Kim |
| 2019/0254814 A1 | 8/2019 | Nitzan et al. |
| 2019/0262118 A1 | 8/2019 | Eigler et al. |
| 2019/0269392 A1 | 9/2019 | Celermajer et al. |
| 2019/0328513 A1 | 10/2019 | Levi et al. |
| 2019/0336163 A1 | 11/2019 | McNamara et al. |
| 2020/0060825 A1 | 2/2020 | Rottenberg et al. |
| 2020/0078196 A1 | 3/2020 | Rosen et al. |
| 2020/0078558 A1 | 3/2020 | Yacoby et al. |
| 2020/0138612 A1 | 5/2020 | Higashi et al. |
| 2020/0188143 A1 | 6/2020 | McNamara |
| 2020/0229982 A1 | 7/2020 | Mixter et al. |
| 2020/0245991 A1 | 8/2020 | Celermajer |
| 2020/0261705 A1 | 8/2020 | Nitzan et al. |
| 2020/0268515 A1 | 8/2020 | Vettukattil et al. |
| 2020/0315599 A1 | 10/2020 | Nae et al. |
| 2020/0368505 A1 | 11/2020 | Nae et al. |
| 2021/0052378 A1 | 2/2021 | Nitzan et al. |
| 2021/0059527 A1 | 3/2021 | Najafi |
| 2021/0100665 A1 | 4/2021 | Nae et al. |
| 2021/0121179 A1 | 4/2021 | Ben-david et al. |
| 2021/0153776 A1 | 5/2021 | Minar et al. |
| 2021/0177508 A1 | 6/2021 | Kellerman |
| 2021/0259732 A1 | 8/2021 | Dicicco et al. |
| 2021/0259829 A1 | 8/2021 | Quinn |
| 2021/0259839 A1 | 8/2021 | Cole et al. |
| 2021/0290214 A1 | 9/2021 | Cole et al. |
| 2021/0299425 A1 | 9/2021 | Kume et al. |
| 2021/0299430 A1 | 9/2021 | Ratz et al. |
| 2021/0361257 A1 | 11/2021 | Eimer et al. |
| 2022/0176088 A1 | 6/2022 | Salahieh et al. |

(56) References Cited

U.S. PATENT DOCUMENTS

| | | |
|---|---|---|
| 2023/0042011 A1 | 2/2023 | Fahey et al. |
| 2024/0139478 A1 | 5/2024 | Robertson et al. |
| 2024/0252792 A1 | 8/2024 | Robertson et al. |

FOREIGN PATENT DOCUMENTS

| | | | | |
|---|---|---|---|---|
| AU | 2011332324 | 6/2013 | | |
| AU | 2012214279 | 8/2013 | | |
| AU | 2018228451 | 9/2019 | | |
| CA | 2785041 | 8/2011 | | |
| CA | 2786575 | 8/2011 | | |
| CA | 2818417 | 5/2012 | | |
| CA | 2955389 | 1/2016 | | |
| CA | 3054891 | 9/2018 | | |
| CN | 101415452 | 4/2009 | | |
| CN | 102458316 | 5/2012 | | |
| CN | 102905626 | 1/2013 | | |
| CN | 103458832 | 12/2013 | | |
| CN | 105662653 | 6/2016 | | |
| CN | 109646063 A | 4/2019 | | |
| CN | 110536657 | 12/2019 | | |
| EP | 2097012 | 9/2009 | | |
| EP | 2528646 | 12/2012 | | |
| EP | 2642954 | 10/2013 | | |
| EP | 2967867 | 1/2016 | | |
| EP | 3087953 | 11/2016 | | |
| EP | 3103393 | 12/2016 | | |
| EP | 3291773 | 3/2018 | | |
| EP | 3329860 | 6/2018 | | |
| EP | 3579907 | 12/2019 | | |
| EP | 3589238 | 1/2020 | | |
| EP | 3624701 | 3/2020 | | |
| EP | 2999412 | 5/2020 | | |
| EP | 3705154 | 9/2020 | | |
| EP | 3716877 | 10/2020 | | |
| EP | 3740163 | 11/2020 | | |
| EP | 3766431 | 1/2021 | | |
| EP | 3834737 | 6/2021 | | |
| EP | 3843618 | 7/2021 | | |
| EP | 3871626 | 9/2021 | | |
| EP | 3886761 | 10/2021 | | |
| EP | 3893731 | 10/2021 | | |
| EP | 3897369 | 10/2021 | | |
| IL | 176973 | 12/2006 | | |
| IL | 221127 | 9/2012 | | |
| IL | 226374 | 7/2013 | | |
| IL | 215975 | 11/2016 | | |
| IL | 227756 | 6/2017 | | |
| IL | 220201 | 8/2017 | | |
| IL | 253648 | 9/2017 | | |
| IL | 255379 | 12/2017 | | |
| IL | 252395 | 4/2020 | | |
| IN | 2011KN04472 | 7/2012 | | |
| IN | 2012KN01275 | 2/2013 | | |
| IN | 2013KN01954 | 11/2013 | | |
| IN | 2013CN06525 | 8/2014 | | |
| IN | 2012KN01988 | 8/2016 | | |
| JP | 2007527742 | 10/2007 | | |
| JP | 2010508093 | 3/2010 | | |
| JP | 2013046784 | 3/2013 | | |
| JP | 2014503246 | 2/2014 | | |
| JP | 2014512869 | 5/2014 | | |
| JP | 2020509812 | 4/2020 | | |
| KR | 20010046155 | 6/2001 | | |
| WO | WO2005074367 | 8/2005 | | |
| WO | WO2007083288 | 7/2007 | | |
| WO | WO-2007095233 A2 * | 8/2007 | ............... | A61F 2/82 |
| WO | WO2008055301 | 5/2008 | | |
| WO | WO2009003049 | 12/2008 | | |
| WO | WO-2009070784 A1 * | 6/2009 | ............ | A61L 31/022 |
| WO | WO2010128501 | 11/2010 | | |
| WO | WO-2010128501 A1 * | 11/2010 | ............... | A61F 2/01 |
| WO | WO2010129089 | 11/2010 | | |
| WO | WO2011093941 | 8/2011 | | |
| WO | WO2011094521 | 8/2011 | | |
| WO | WO2012071075 | 5/2012 | | |
| WO | WO2012085913 | 6/2012 | | |
| WO | WO2012109557 | 8/2012 | | |
| WO | WO2013014539 | 1/2013 | | |
| WO | WO2013096965 | 6/2013 | | |
| WO | WO-2013096965 A1 * | 6/2013 | ......... | A61B 17/0057 |
| WO | WO2014150106 | 9/2014 | | |
| WO | WO2014188279 | 11/2014 | | |
| WO | WO2016014821 | 1/2016 | | |
| WO | WO2016038115 | 3/2016 | | |
| WO | WO2016178171 | 11/2016 | | |
| WO | WO-2018076010 A1 * | 4/2018 | ............. | A61L 27/02 |
| WO | WO2018158747 | 9/2018 | | |
| WO | WO2019142152 | 7/2019 | | |
| WO | WO2019179447 | 9/2019 | | |
| WO | WO2019188917 | 10/2019 | | |
| WO | WO2019189079 | 10/2019 | | |
| WO | WO2019195336 | 10/2019 | | |
| WO | WO2019209420 | 10/2019 | | |
| WO | WO2020094085 | 5/2020 | | |
| WO | WO2020094087 | 5/2020 | | |
| WO | WO2020094094 | 5/2020 | | |
| WO | WO2020110048 | 6/2020 | | |
| WO | WO2020123338 | 6/2020 | | |
| WO | WO2020202046 | 10/2020 | | |
| WO | WO2020215090 | 10/2020 | | |
| WO | WO2020217194 | 10/2020 | | |
| WO | WO2020219265 | 10/2020 | | |
| WO | WO2020225698 | 11/2020 | | |
| WO | WO2020225757 | 11/2020 | | |
| WO | WO2020229636 | 11/2020 | | |
| WO | WO2020234751 | 11/2020 | | |
| WO | WO2020251700 | 12/2020 | | |
| WO | WO2020257530 | 12/2020 | | |
| WO | WO2020259492 | 12/2020 | | |
| WO | WO2021025905 | 2/2021 | | |
| WO | WO2021026485 | 2/2021 | | |
| WO | WO2021046753 | 3/2021 | | |
| WO | WO2021055264 | 3/2021 | | |
| WO | WO2021065873 | 4/2021 | | |
| WO | WO2021065874 | 4/2021 | | |
| WO | WO2021065875 | 4/2021 | | |
| WO | WO2021065912 | 4/2021 | | |
| WO | WO2021086707 | 5/2021 | | |
| WO | WO2021091566 | 5/2021 | | |
| WO | WO2021096766 | 5/2021 | | |
| WO | WO2021101707 | 5/2021 | | |
| WO | WO2021113670 | 6/2021 | | |
| WO | WO2021136252 | 7/2021 | | |
| WO | WO2021136261 | 7/2021 | | |
| WO | WO2021138041 | 7/2021 | | |
| WO | WO2021146342 | 7/2021 | | |
| WO | WO2021158559 | 8/2021 | | |
| WO | WO2021162888 | 8/2021 | | |
| WO | WO2021178636 | 9/2021 | | |
| WO | WO2021190547 | 9/2021 | | |
| WO | WO2021212011 | 10/2021 | | |
| WO | WO2021224736 | 11/2021 | | |
| WO | WO2022192382 | 9/2022 | | |
| WO | WO2022246283 | 11/2022 | | |

OTHER PUBLICATIONS

Jodi Perkins, "Corvia Medical and physIQ Partner in Global Phase 3 Heart Failure Clinical Trial to Leverage Novel Digital Endpoints," Press Release, 2019 Copyright, Medical Alley Association, 3 pages.

Lehner et al., "The Creation of an Interatrial Right-To-Left Shunt in Patients with Severe, Irreversible Pulmonary Hypertension: Rationale, Devices, Outcomes," Current Cardiology Reports (2019) 21: 31, https://doi.org/10.1007/s11886-019-1118-8; 9 pages.

International Search Report and Written Opinion received for International Application No. PCT/US20/38549, filed Jun. 18, 2020; Applicant: Shifamed Holdings, LLC; Date of Mailing: Nov. 2, 2020; 23 pages.

International Search Report and Written Opinion received for International Application No. PCT/US22/46584, filed Oct. 13, 2022; Applicant: Shifamed Holdings, LLC; Date of Mailing: Mar. 29, 2023; 12 pages.

(56) References Cited

OTHER PUBLICATIONS

Ando et al., "Left ventricular decompression through a patent foramen ovale in a patient with hypertrophic cardiomyopathy: a case report," Cardiovascular Ultrasound volume, Article No. 2 (2004).
Braunwald, Heart Disease, Chapter 6, 2015, p. 186.
Bridges et al., "The Society of Thoracic Surgeons practice guideline series: transmyocardial laser revascularization," The Annals of Thoracic Surgery, vol. 77, Issue 4, Apr. 2004, pp. 1494-1502.
Bristow et al., "Improvement in cardiac myocyte function by biological effects of medical therapy: A new concept in the treatment of heart failure," European Heart Journal, vol. 16, Issue suppl. F. Jul. 1995, pp. 20-31.
Case et al., "Relief of High Left-Atrial Pressure in Left-Ventricular Failure," Lancet, Oct. 17, 1964, pp. 841-842.
Coats et al., "Controlled trial of physical training in chronic heart failure. Exercise performance, hemodynamics, ventilation, and autonomic function," Circulation, 1992;85:2119-2131.
Davies et al., "Reduced contraction and altered frequency response of isolated ventricular myocytes from patients with heart failure," Circulation, (1995), 92:2540-2549, Circulation, (1995), 92:2540-2549.
Ennezat et al., "An unusual case of low-flow, low gradient severe aortic stenosis: Left-to-right shunt due to atrial septal defect," Cardiology, (2009), 113(2):146-148.
Ewert et al., "Masked Left Ventricular Restriction in Elderly Patients with Atrial Septal Defects: A Contraindication for Closure," Catheterization and Cardiovascular Interventions, 52: 177-180, 2001.
Ewert et al., "Acute left heart failure after interventional occlusion of an atrial septal defect," Z. Kardiol., Catheterization and Cardiovascular Interventions, (May 2001), 90(5):362-366.
Geiran et al., "Changes in cardiac dynamics by opening an interventricular shunt in dogs," J. Surg. Res., (Jan. 1990), 48(1):6-12.
Gelernter-Yaniv et al., "Transcatheter closure of left-to-right interatrial shunts to resolve hypoxemia," Congenit. Heart Dis., (Jan. 2008), 31(1):47-53.
Gewillig et al., "Creation with a stent of an unrestrictive lasting atrial communication," Cardio. Young, (2002), 12(4):404-407.
Khositseth et al., "Transcatheter Amplatzer Device Closure of Atrial Septal Defect and Patent Foramen Ovale in Patients With Presumed Paradoxical Embolism," Mayo Clinic Proc., 79:35-41 (2004).
Kramer et al., "Controlled study of captopril in chronic heart failure: A rest and exercise hemodynamic study," Circulation, (1983), 67(4):807-816.
Lai et al., "Bidirectional shunt through a residual atrial septal defect after percutaneous transvenous mitral commissurotomy," Cardiology, (1993), 83(3):205-207.

Lemmer et al., "Surgical implications of atrial septal defect complicating aortic balloon valvuloplasty," Ann. thorac. Surg., (Aug. 1989), 48(2):295-297.
Park et al., "Blade atrial septostomy: collaborative study," Circulation, 66(2):258-266 (1982).
Roven et al., "Effect of Compromising Right Ventricular Function in Left Ventricular Failure by Means of Interatrial and Other Shunts," American Journal Cardiology, 24:209-219 (1969).
Salehian et al., "Improvements in Cardiac Form and Function After Transcatheter Closure of Secundum Atrial Septal Defects," Journal of the American College of Cardiology, 45(4):499-504 (2005).
Schmitto et al., "Chronic heart failure induced by multiple sequential coronary microembolization in sheep," The International Journal of Artificial Organs, 31(4):348-353 (2008).
Schubert et al., "Left ventricular conditioning in the elderly patient to prevent congestive heart failure after transcatheter closure of the atrial septal defect," Catheter Cardiovasc. Interv., (2005), 64(3):333-337.
Stormer et al., "Comparative study of in vitro flow characteristics between a human aortic valve and a designed aortic and six corresponding types of prosthetic heart valves," European Surgical Research, (1976), 8(2):117-131.
Stumper et al., "Modified technique of stent fenestration of the atrial septum, Heart," (2003), 89:1227-1230.
Trainor et al., "Comparative Pathology of an Implantable Left Atrial Pressure Sensor," ASAIO Journal, Clinical Cardiovascular/Cardiopulmonary Bypass, 59(5):486-92 (2013).
Zhou et al., "Unidirectional valve patch for repair of cardiac septal defects with pulmonary hypertension," Annals of Thoracic Surgeons, 60: 1245-1249, 1995.
Anomet Products "Conductive Nitinol Wire" Aug. 15, 2020, Retrieved from website <URL: https://helpx.adobe.com/acrobat/using/allow-or-block-linksinternet.html?mv=product&mv2=acrobat>, 4 pages.
International Search Report and Written Opinion received for International Application No. PCT/US22/19526, filed Mar. 9, 2022; Applicant: Shifamed Holdings, LLC; Date of Mailing: Aug. 16, 2022; 11 pages.
International Search Report and Written Opinion received for International Application No. PCT/US22/30380, filed May 20, 2022; Applicant: Shifamed Holdings, LLC; Date of Mailing: Aug. 16, 2022; 10 pages.
Extended European Search Report received for Application No. 20826077.8, Applicant: Shifamed Holdings, LLC; Date of Mailing: May 23, 2023; 11 pages.
Extended European Search Report received for Application No. 21791938.0, Applicant: Shifamed Holdings, LLC; Date of Mailing: Apr. 3, 2024; 6 pages.
Yeung K.W.K. et al., "Optimization of thermal treatment parameters to alter austenitic phase transition temperature of NiTi alloy for medical implant," Materials Science, Elsevier, Amsterdam, NL, vol. 383, No. 2, Oct. 15, 2004, pp. 213-218.

* cited by examiner

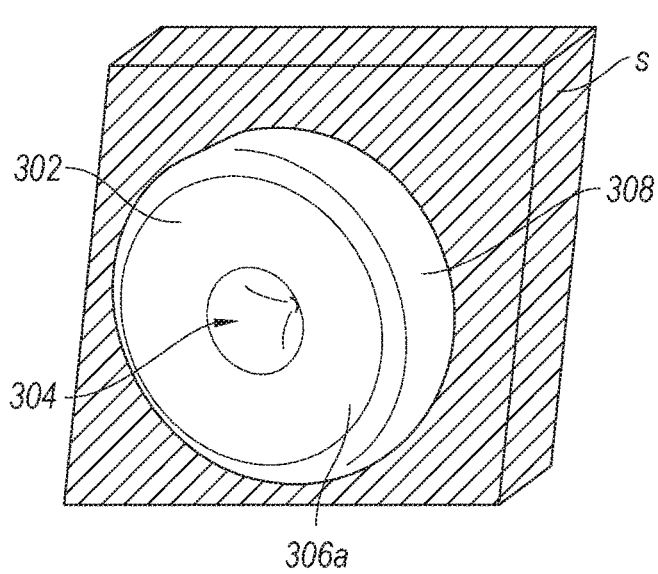 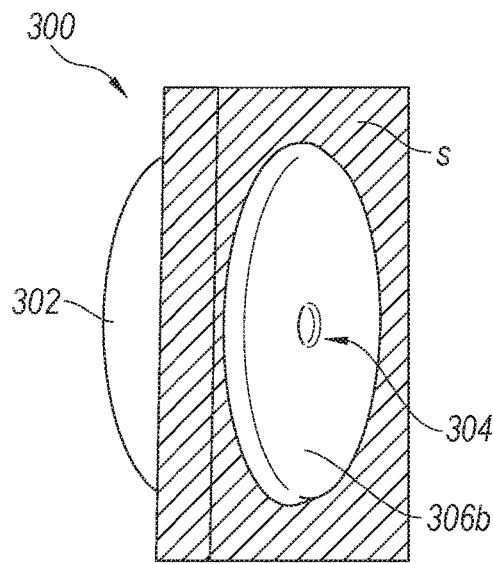
Fig. 3D  Fig. 3E
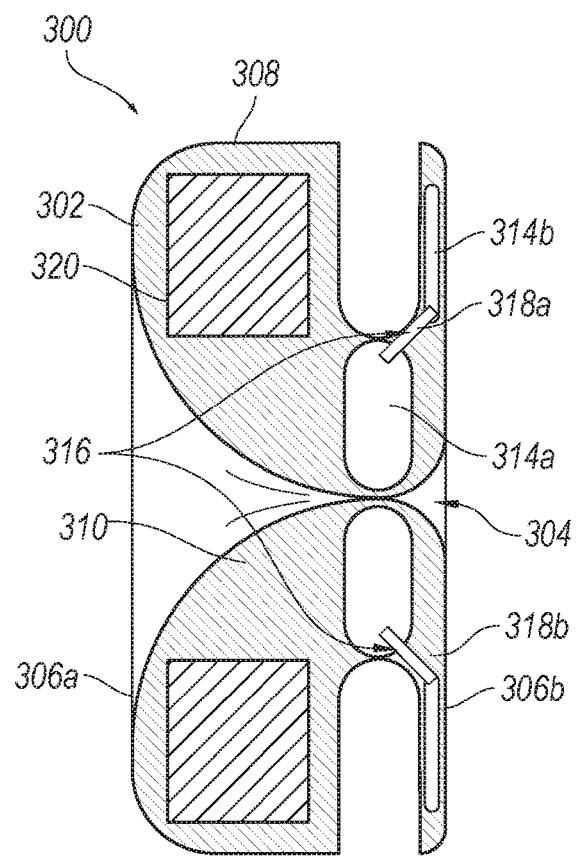
Fig. 3F

ADJUSTABLE INTERATRIAL SHUNTS AND ASSOCIATED SYSTEMS AND METHODS

CROSS-REFERENCE TO RELATED APPLICATION(S)

This application is a 35 U.S.C. § 371 U.S. National Phase application of International Patent Application No. PCT/US2020/038549, filed Jun. 18, 2020, which claims priority to U.S. Provisional Patent Application No. 62/863,163, filed Jun. 18, 2019, U.S. Provisional Patent Application No. 62/868,626, filed Jun. 28, 2019, U.S. Provisional Patent Application No. 62/875,346, filed Jul. 17, 2019, U.S. Provisional Patent Application No. 62/897,938, filed Sep. 9, 2019, U.S. Provisional Patent Application No. 62/963,697, filed Jan. 21, 2020, U.S. Provisional Patent Application No. 62/970,269, filed Feb. 5, 2020, U.S. Provisional Patent Application No. 62/971,528, filed Feb. 7, 2020, and U.S. Provisional Patent Application No. 62/971,812, filed Feb. 7, 2020, the disclosures of which are all incorporated by reference herein in their entireties.

TECHNICAL FIELD

The present technology generally relates to implantable medical devices and, in particular, to implantable interatrial systems and associated methods for selectively controlling blood flow between the right atrium and the left atrium of a heart.

BACKGROUND

Heart failure is a medical condition associated with the inability of the heart to effectively pump blood to the body. Heart failure affects millions of people worldwide, and may arise from multiple root causes, but is generally associated with myocardial stiffening, myocardial shape remodeling, and/or abnormal cardiovascular dynamics. Chronic heart failure is a progressive disease that worsens considerably over time. Initially, the body's autonomic nervous system adapts to heart failure by altering the sympathetic and parasympathetic balance. While these adaptations are helpful in the short-term, over a longer period of time they may serve to make the disease worse.

Heart failure (HF) is a medical term that includes both heart failure with reduced ejection fraction (HFrEF) and heart failure with preserved ejection fraction (HFpEF). The prognosis with both HFpEF and HFrEF is poor; one-year mortality is 26% and 22%, respectively, according to one epidemiology study. In spite of the high prevalence of HFpEF, there remain limited options for HFpEF patients. Pharmacological therapies have been shown to impact mortality in HFrEF patients, but there are no similarly-effective evidence-based pharmacotherapies for treating HFpEF patients. Current practice is to manage and support patients while their health continues to decline.

A common symptom among heart failure patients is elevated left atrial pressure. In the past, clinicians have treated patients with elevated left atrial pressure by creating a shunt between the left and right atria using a blade or balloon septostomy. The shunt decompresses the left atrium (LA) by relieving pressure to the right atrium (RA) and systemic veins. Over time, however, the shunt typically will close or reduce in size. More recently, percutaneous interatrial shunt devices have been developed which have been shown to effectively reduce left atrial pressure. However, these percutaneous devices often have an annular passage with a fixed diameter which fails to account for a patient's changing physiology and condition. For this reason, existing percutaneous shunt devices may have a diminishing clinical effect after a period of time. Many existing percutaneous shunt devices typically are also only available in a single size that may work well for one patient but not another. Also, sometimes the amount of shunting created during the initial procedure is later determined to be less than optimal months later. Accordingly, there is a need for improved devices, systems, and methods for treating heart failure patients, particularly those with elevated left atrial pressure.

BRIEF DESCRIPTION OF THE DRAWINGS

FIGS. 3D and 3E are perspective views of the system of FIGS. 3A-3C implanted in the septal wall during a different stage of operation.

FIG. 3F is a side cross-sectional view of the system of FIGS. 3D and 3E.

DETAILED DESCRIPTION

Figure 1A:
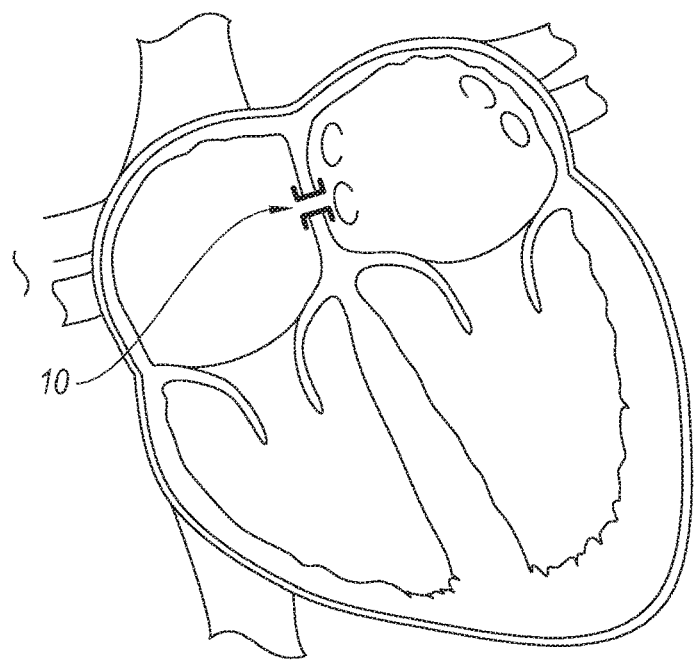
FIG. 1A is a schematic illustration of an interatrial device implanted in a heart and configured in accordance with select embodiments of the present technology.

The present technology is generally directed to interatrial shunting systems and associated devices and methods. For example, in some embodiments the present technology provides a system having a shunting element implantable into a patient at or adjacent a septal wall of the patient's heart. The shunting element can have a lumen that, when the shunting element is implanted within the patient, fluidly connects a LA and a RA of the patient to facilitate blood flow therebetween. In some embodiments, the system further includes a flow control element to selectively control blood flow between the LA and the RA. For example, the flow control element can be selectively transitioned between two or more positions or geometries, with each position or geometry permitting a different relative flow rate between the LA and the RA.

In some embodiments, the present technology provides an interatrial shunting system for shunting blood between a LA and an RA that includes a shunting element and an expandable (e.g., inflatable) flow control element. The shunting element can have a lumen extending therethrough, which can fluidly couple the LA and the RA when the shunting element is implanted in the patient. The expandable flow control element can be positioned within and/or adjacent the lumen and can be operably coupled to a fluid reservoir. The system can further include an actuation mechanism configured to selectively adjust a volume of the expandable flow control element by controlling fluid or gas flow between the fluid reservoir and the expandable flow control element. For example, the actuation mechanism can cause fluid to flow out of the fluid reservoir and into the expandable flow control element to increase the volume of the flow control element, thereby increasing the flow resistance through the lumen. The actuation mechanism can also cause fluid to flow out of the expandable flow control element and into the fluid reservoir to decrease the volume of the flow control element, thereby decreasing the flow resistance through the lumen. In some embodiments, adjusting the volume of the expandable member can change a diameter of the lumen to selectively control the flow of blood therethrough, while in other embodiments, adjusting the volume of the expandable member can block and/or unblock an opening to the lumen to selectively control the flow of blood therethrough.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "about" and "approximately" are used herein to mean the stated value plus or minus 10%.

As used herein, the terms "interatrial device," "interatrial shunt device," "IAD," "IASD," "interatrial shunt," and "shunt" are used interchangeably to refer to a device that, in at least one configuration, includes a shunting element that provides a blood flow between a first region (e.g., a LA of a heart) and a second region (e.g., a RA or coronary sinus of the heart) of a patient. Although described in terms of a shunt between the atria, namely the LA and the RA, one will appreciate that the technology may be applied equally to devices positioned between other chambers and passages of the heart, between other parts of the cardiovascular system, or between other parts of the body. For example, any of the shunts described herein, including those referred to as "interatrial," may be nevertheless used and/or modified to shunt between the LA and the coronary sinus, or between the right pulmonary vein and the superior vena cava. Moreover, while the disclosure herein primarily describes shunting blood from the LA to the RA, the present technology can be readily adapted to shunt blood from the RA to the LA to treat certain conditions, such as pulmonary hypertension. For example, mirror images of embodiments, or in some cases identical embodiments, used to shunt blood from the LA to the RA can be used to shunt blood from the RA to the LA in certain patients.

As used herein, the terms "flow control element" and "flow restrictor" are used interchangeably to refer to any structure that can change the flow resistance through a shunt lumen or flow path.

As used herein, the term "geometry" can include the size and/or the shape of an element. Accordingly, when the present disclosure describes a change in geometry, it can refer to a change in the size of an element (e.g., moving from a smaller circle to a larger circle), a change in the shape of an element (e.g., moving from a circle to an oval), and/or a change in the shape and size of an element (e.g., moving from a smaller circle to a larger oval).

The headings provided herein are for convenience only and do not interpret the scope or meaning of the claimed present technology.

A. INTERATRIAL SHUNTS FOR TREATMENT OF HEART FAILURE

Heart failure can be classified into one of at least two categories based upon the ejection fraction a patient experiences: (1) HFpEF, historically referred to as diastolic heart failure or (2) HFrEF, historically referred to as systolic heart failure. One definition of HFrEF is a left ventricular ejection fraction lower than 35%-40%. Though related, the underlying pathophysiology and the treatment regimens for each heart failure classification may vary considerably. For example, while there are established pharmaceutical therapies that can help treat the symptoms of HFrEF, and at times slow or reverse the progression of the disease, there are limited available pharmaceutical therapies for HFpEF with only questionable efficacy.

In heart failure patients, abnormal function in the left ventricle (LV) leads to pressure build-up in the LA. This leads directly to higher pressures in the pulmonary venous system, which feeds the LA. Elevated pulmonary venous pressures push fluid out of capillaries and into the lungs. This fluid build-up leads to pulmonary congestion and many of the symptoms of heart failure, including shortness of breath and signs of exertion with even mild physical activity. Risk factors for HF include renal dysfunction, hypertension, hyperlipidemia, diabetes, smoking, obesity, old age, and obstructive sleep apnea. HF patients can have increased stiffness of the LV which causes a decrease in left ventricular relaxation during diastole resulting in increased pressure and inadequate filling of the ventricle. HF patients may also have an increased risk for atrial fibrillation and pulmonary hypertension, and typically have other comorbidities that can complicate treatment options.

Interatrial shunts have recently been proposed as a way to reduce elevated left atrial pressure, and this emerging class of cardiovascular therapeutic interventions has been demonstrated to have significant clinical promise. FIG. 1 shows the conventional placement of a shunt in the septal wall between the LA and RA. Most conventional interatrial shunts (e.g., shunt 10) involve creating a hole or inserting an implant with a lumen into the atrial septal wall, thereby creating a fluid communication pathway between the LA and the RA. As such, elevated left atrial pressure may be partially relieved by unloading the LA into the RA. In early clinical trials, this approach has been shown to improve symptoms of heart failure.

One challenge with many conventional interatrial shunts is determining the most appropriate size and shape of the shunt lumen. A lumen that is too small may not adequately unload the LA and relieve symptoms; a lumen that is too large may overload the RA and right-heart more generally, creating new problems for the patient. Moreover, the relationship between pressure reduction and clinical outcomes and the degree of pressure reduction required for optimized outcomes is still not fully understood, in part because the pathophysiology for HFpEF (and to a lesser extent, HFrEF) is not completely understood. As such, clinicians are forced to take a best guess at selecting the appropriately sized shunt (based on limited clinical evidence) and generally cannot adjust the sizing over time. Worse, clinicians must select the size of the shunt based on general factors (e.g., the size of the patient's anatomical structures, the patient's hemodynamic measurements taken at one snapshot in time, etc.) and/or the design of available devices rather than the individual patient's health and anticipated response. With traditional devices, the clinician does not have the ability to adjust or titrate the therapy once the device is implanted, for example, in response to changing patient conditions such as progression of disease. By contrast, interatrial shunting systems configured in accordance with embodiments of the present technology allow a clinician to select the size—perioperatively or post-implant—based on the patient.

Figure 1B:
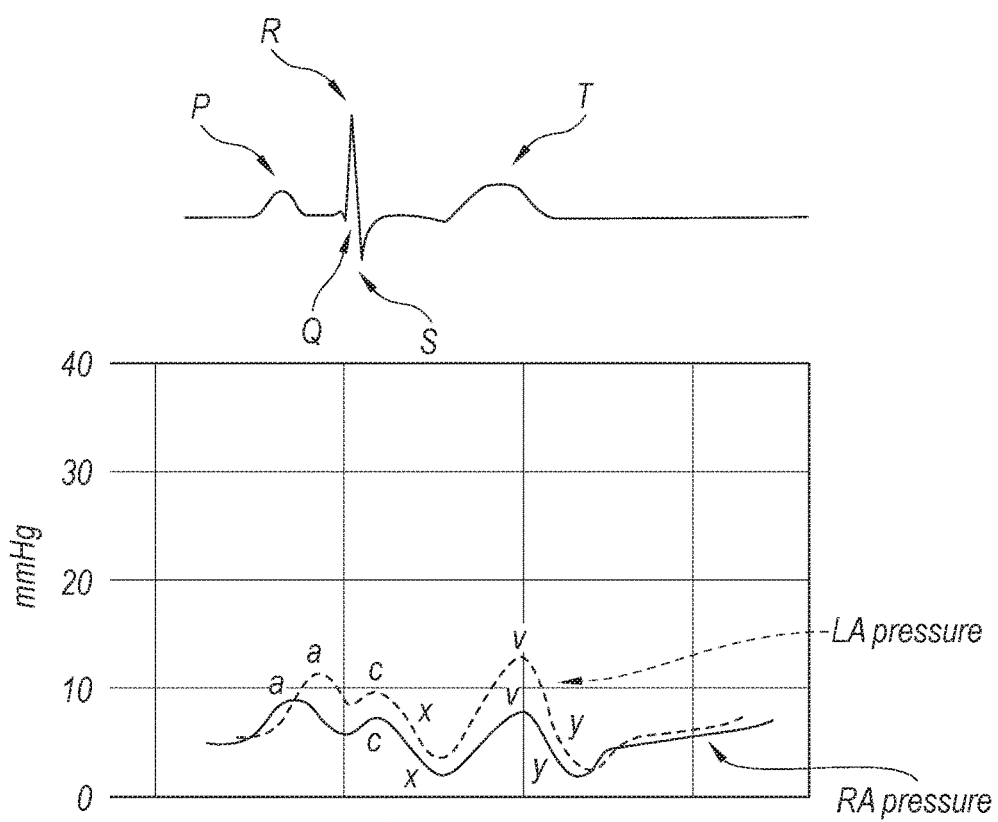
FIG. 1B a graphical illustration of typical left atrial pressures and right atrial pressures at various stages of a heartbeat.

FIG. 1B is a graphical illustration of typical left atrial pressures and right atrial pressures in a healthy patient at various stages of a heartbeat. As illustrated, left atrial pressure typically exceeds right atrial pressure at various stages throughout the heartbeat. In a patient with heart failure, LA pressure is often abnormally elevated more than RA pressure, and it may be typical for LA pressure to exceed RA pressure at substantially all times. The first positive deflection in both left atrial pressure and right atrial pressure occurs during the a-wave, which is generated when the LA and the RA contract, thereby causing increased pressure within the LA and the RA. This occurs during the P-wave on the ECG. The next increase in pressure is caused during ventricular contraction. This wave is called the c-wave and typically directly follows the QRS complex on the ECG. The first major reduction in left atrial pressure and right atrial pressure occurs during the x-descent. This sudden drop in pressure occurs as a result of depolarization of the LA and the RA. This occurs between the QRS complex and the T-wave on the ECG. The next rise in left atrial pressure and right atrial pressure occurs during the v-wave, which occurs during the passive filling of the LA and RA. This occurs during the T-wave on the ECG. The final descent in left atrial pressure and right atrial pressure occurs during the y-descent, which is a result of the rapid fall in left atrial pressure and right atrial pressure once the mitral valve and tricuspid valves, respectively, open. This occurs after the T-wave on the ECG.

In a healthy patient who is at rest, typical left atrial pressure during the a-wave ranges from about 4.0 mmHg to about 16.0 mmHg, and typical right atrial pressure during the a-wave ranges from about 2.5 mmHg to about 7 mmHg. Typical left atrial pressure during the v-wave ranges from about 6.0 mmHg to about 21.0 mmHg, and typical right atrial pressure during the v-wave ranges from about 2.0 mmHg to about 7.5 mmHg. The average left atrial pressure ranges from about 2.0 mmHg to about 12.0 mmHg, and the average right atrial pressure ranges from about 2.0 mmHg to about 5.0 mmHg. During exercise, pressures may be considerably higher. For patients with heart failure, pressures may vary substantially from the values cited above, especially during periods of exertion. As described in detail below, embodiments of the present technology may include selectively adjusting a shunt or other implantable device based, at least in part, on the pressure differential between the LA and the RA exceeding a predetermined threshold. In some embodiments, the predetermined threshold can be about 5 mmHg or greater.

B. ADJUSTABLE INTERATRIAL SHUNTING SYSTEMS

As provided above, the present technology is generally directed to adjustable interatrial shunting systems. Adjustable interatrial shunting systems provided herein can include, for example, a shunting element implantable into a patient at or adjacent to a septal wall that can fluidly connect a LA and a RA of the patient to facilitate blood flow therebetween. In some embodiments, one or more aspects of the system is adjustable to selectively control blood flow through the shunting element between the LA and the RA. For example, the system can include a flow control element that can transition between a plurality of geometries (e.g., shapes, sizes, orientations, positions, etc.), with each geometry being associated with a flow resistance of blood through the shunting element between the LA and the RA. In some embodiments, the flow control element can selectively change a size and/or shape of the lumen. For example, the flow control element can be configured to selectively increase a diameter of the lumen and/or selectively decrease a diameter of the lumen. Throughout the present disclosure, reference to adjusting a diameter (e.g., increasing a diameter, decreasing a diameter, etc.) can refer to adjusting a hydraulic diameter of the lumen, adjusting a diameter at a particular location of the lumen, and/or adjusting a diameter along a length (e.g., a full length) of the lumen. In other embodiments, the flow control element is configured to otherwise affect flow through the lumen. For example, in some embodiments the flow control element can at least partially block an inflow port and/or an outflow port for the lumen. Accordingly, the flow control element can be coupled to a shunting element and/or can be included within the shunting element.

In some embodiments, the flow control element is a passive mechanism that is automatically adjusted in response to physiological variations (e.g., blood pressure gradients) without any external input (e.g., physician procedure). For example, in some embodiments the flow control element can automatically change in geometry based on the pressure within a heart chamber (e.g., within the LA) of the patient and/or in response to a pressure differential between two heart chambers (e.g., between the LA and the RA). The change in geometry can be a restriction (e.g., contraction), an opening (e.g., expansion), or another shape/configuration change, and can change a fluid path through the shunting element. For example, if the pressure within the heart chamber increases, the flow control element can increase the amount of blood flow through the shunting element. Conversely, if the pressure within the heart chamber decreases, the flow control element can decrease the amount of blood flow through the shunting element.

In other embodiments, the flow control mechanism is an active mechanism, such that energy or another input is needed to alter the flow control element and change the blood flow through the shunting element. In such embodiments, the system can include an energy storage component (e.g., a battery and/or supercapacitor), and/or energy can be delivered to the system via one or more energy delivery modules. In embodiments in which the system includes an active mechanism, the flow control element can be controlled by an actuation mechanism having one or more actuation elements. Actuation of the actuation element(s) may generate a change in a geometry of the flow control element, which can change a geometry of the fluid path through the shunting element. The change in geometry can be a restriction (e.g., contraction), an opening (e.g., expansion), or another configuration change. The actuation mechanism can be a motor, a shape memory actuator, a pump, or another suitable mechanism for driving operation of the flow control element. Suitable motors include, for example, electromagnetic motors, mechanical motors, MEMS motors, micro brushless DC motors, piezoelectric based motors, solenoids, and other motors capable of adjusting a flow control element.

As noted above, some embodiments of the interatrial shunting systems include an electromagnetic motor for adjusting the flow control element. A variety of electromagnetic motors can be incorporated into the systems described herein to power the flow control element. In some embodiments, for example, the system includes elements that actuate in response to electromagnetic energy or a change to a magnetic field. For example, in some embodiments, a "squirrel-cage" induction motor is incorporated into the device and operably coupled to the flow control element. Applying a magnetic field across the induction motor can cause a rotor of the squirrel-cage induction motor to spin, which in turn can adjust a position of the flow control element.

As noted above, some embodiments of the interatrial shunting systems include a battery coupled to the actuation mechanism. The battery can provide power the actuation mechanism, enabling the actuation mechanism to adjust the flow control element. The battery can be (a) incorporated into the shunting element or flow control element, (b) implanted yet spaced apart from the shunting element or flow control element, or (c) external to the patient. The battery can be operably coupled to the mechanical motor (e.g., a piezoelectric motor) such that the motor can be selectively actuated by the battery. In some embodiments, the battery can be controlled by incorporating metal-oxide-semiconductor field-effect transistors ("MOSFET").

As noted above, some embodiments of the adjustable interatrial shunting systems include MEMS motors for adjusting the flow control element. In some embodiments, for example, the MEMS motor may comprise a MEMS-based valve. The MEMS-based valve may sense flow at a microfluidic level and may function via thermal actuator principles to adjust a position of the valve to change flow therethrough. In some embodiments, the MEMS motor can be amplified with hydraulics. In some embodiments incorporating MEMS motors, the flow control element may be biased towards a first position (e.g., a closed position) via a friction fit. The MEMS motor can be used to overcome the friction force to move the flow control element towards a second position (e.g., an open position). In some embodiments, incorporation of a MEMS motor or valve facilitates relatively rapid adjustments to various components, such as adjustments synchronized to a cardiac rhythm. As one skilled in the art will appreciate from the disclosure herein, a number of modifications to the motors described herein could incorporated into the interatrial shunting systems without departing from the scope of the present technology.

As noted above, some embodiments of the interatrial shunting systems include a shape memory actuator for adjusting the flow control element. A shape memory actuator includes at least one actuation element composed of a shape memory material (e.g., a shape memory alloy, a shape memory polymer, etc.). Actuation of the actuation element can be generated through externally applied stress and/or the use of a shape memory effect (e.g., as driven by a change in temperature). The shape memory effect enables deformations that have altered an element from its original geometric configuration to be largely or entirely reversed during operation of the actuation element. For example, sufficient heating can produce at least a temporary change in material state (e.g., a phase change) in the actuator material, inducing a temporary elevated internal stress that promotes a shape change toward the original geometric configuration. In an example, the geometric change that accompanies a change in material state may reverse deformations that have been made to the material following manufacturing. For a shape memory alloy, the change in state can be from a martensitic phase (alternatively, R-phase) at the lower temperature to an austenitic phase (alternatively, R-phase) at the higher temperature. For a shape memory polymer, the change in state can be via a glass transition temperature or a melting temperature. The change in material state can recover deformation(s) of the material—for example, deformation with respect to its original (e.g., manufactured) geometric configuration—without any externally applied stress to the actuator element. That is, a deformation that is present in the material at a first temperature (e.g., body temperature) can be partially or fully recovered and/or altered by raising the material to a second (e.g., higher) temperature. In some embodiments, upon cooling (and reverting material state, e.g., back to a martensitic phase), the actuator element may approximately retain its geometric configuration (e.g., it may remain in the configuration that results from the application of heat). In some embodiments, upon cooling the actuator element may approximately retain its geometric configuration to within 30% of the heated, phase transition configuration. However, when the material has returned to a relatively cooler temperature (e.g., cools to body temperature following the cessation of heat application), it may require a relatively lower force or stress to thermoelastically deform it compared to the material at a sufficiently heated temperature, and as such any subsequently applied external stress can cause the actuator element to once again deform away from the original geometric configuration.

The shape memory actuation element can be processed such that a transition temperature at which a change in state occurs (e.g., the austenite start temperature, the austenite final temperature, etc.) is above a threshold temperature (e.g., body temperature). For example, the transition temperature can be set to be about 45 deg. C., about 50 deg. C., about 55 deg. C., about 60 deg. C., or another higher or lower temperature. In some embodiments, the actuator material is heated from body temperature to a temperature above the austenite start temperature (or alternatively above the R-phase start temperature) such that an upper plateau stress (e.g., "UPS_body temperature") of the material in a first state (e.g., thermoelastic martensitic phase, or thermoelastic R-phase at body temperature) is lower than an upper plateau stress (e.g., "UPS_actuated temperature") of the material in a heated state (e.g., superelastic state), which achieves partial or full geometric recovery. For example, the actuator material can be heated such that UPS_actuated temperature>UPS_body temperature. In some embodiments, the actuator material is heated from body temperature to a temperature above the austenite start temperature (or alternatively above the R-phase start temperature) such that an upper plateau stress of the material in a first state (e.g., thermoelastic martensite or thermoelastic R-phase at body temperature") is lower than a lower plateau stress (e.g., "LPS") of the material in a heated state (e.g., superelastic state), which achieves partial or full geometric recovery. For example, the actuator material can be aged such that LPS_activated temperature>UPS_body temperature. In some embodiments, the actuator material is heated from body temperature to a temperature above the austenite start temperature (or alternatively above the R-phase start temperature) such that an upper plateau stress of the material in a first state (e.g., thermoelastic martensite or thermoelastic R-phase) is higher than a lower plateau stress of the material in a heated state, which achieves partial geometric recovery. For example, the actuator material can be aged such that LPS_activated temperature<UPS_body temperature.

In some embodiments, the actuation mechanism is powered and/or controlled using one or more energy sources (e.g., energy storage components) included within the system. In other embodiments, the actuation mechanism is powered and/or controlled using an adjustment module or tool configured to deliver energy to the actuation mechanism. For example, in some embodiments the flow control element can be adjusted via one or more energy modalities. A healthcare practitioner can use the energy modality to manipulate the position of the flow control element, thereby manipulating the flow rate between the LA and the RA. Suitable energy modalities can include, for example, magnetic, radiofrequency, ultrasonic, and the like. In some embodiments, the energy source can be positioned external to the patient such that the energy is applied non-invasively. In other embodiments, however, the energy source can be positioned within the body (e.g., via a catheter) before targeting the actuation mechanism with the energy. In some embodiments, the energy is applied for a relatively short period of time (e.g., less than about 0.1 seconds, less than about 1 second, less than about 10 seconds, etc.) until the flow control element is in the desired position, reducing the risk that tissue surrounding the device will overheat. In some embodiments, the adjustment module does not provide energy to the actuation mechanism, but rather directly engages with the flow control element or another aspect of the implanted device and adjusts the flow control element via mechanical means. In such embodiments, the adjustment module can be delivered to the device via a catheter.

In embodiments powered via magnetic energy, the system may include one or more magnetic coils. For example, a first magnetic coil can be positioned on a first side of a flow control element and a second magnetic coil can be positioned on a second side of the flow control element. The first magnetic coil and the second magnetic coil may be configured to be resonated, and therefore actuated, at different frequencies. Thus, the flow control element can be adjusted by selectively targeting either the first magnetic coil or the second magnetic coil with their respective resonance frequencies. Suitable magnetic coils can be sized to fit in or on the system and to provide a target range of motion. For example, the coils can be about 2 cm or less. In other embodiments, a single magnetic coil can be used and the energy can be directed to different parts of the actuation mechanism.

In embodiments powered via radiofrequency (RF) energy, the system may have an antenna (e.g., a metallic, nitinol, or nitinol-silver composite receiving antenna) configured to receive RF energy. The received energy can be used to adjust the flow control element. In some embodiments, for example, the RF energy is delivered at a low frequency to reduce signal attenuation and/or to reduce tissue heating. Low frequency signals include signals having frequencies between about 20 kHz and 300 kHz. However, one skilled in the art will appreciate that other frequencies, such as those less than 20 kHz or greater than 300 kHz, may be used in certain embodiments of the present technology, such as, for example, in the 6.78 MHz band. In some embodiments, the received RF energy may comprise about 10-30 watts. In other embodiments the received energy may comprise about 100 uW-100 mW, and can be used to charge an energy storage component that will subsequently power the actuation mechanism. Due to scattering, absorption, eddy-current shielding, or other attenuation mechanisms, however, the device may receive less power than transmitted. Accordingly, the device can be configured to operate with less power than transmitted, such as one watt. In embodiments powered via ultrasonic energy, the system may include various mechanical elements that move in response to exposure to ultrasound energy. For example, the flow control element may be operably coupled to an ultrasonically actuatable element such that, when ultrasound energy is applied to the system, the flow control element is adjusted. In another example, an ultrasound transducer may provide energy to a piezoelectric receiver that is a component of the device, which converts the ultrasound energy to electrical energy. This electrical energy may be directly or indirectly (e.g., via storage in an energy storage component such as a capacitor) used to operate a flow control element.

In some embodiments, the interatrial shunting systems described herein optionally include one or more sensors. The one or more sensors can be configured to detect a physiological parameter of the patient, such as one or more of LA blood pressure, RA blood pressure, flow velocity, heart rate, cardiac output, myocardial strain, and/or rates of change of any of the foregoing parameters. Other suitable physiological parameters include any of, or any combination of, blood pressure waveform characteristics (e.g., diastolic pressure, systolic pressure, mean slope of anacrotic or dicrotic limbs, ratio of the time in systole and diastole, pressure at dicrotic notch, ECG characteristics, respiration rate, or rates of change of any of the foregoing parameters. The sensors can be, for example, (1) coupled to the shunting element, (2) implanted yet spaced apart from the shunting element (e.g., in the LA, RA, CS, etc.), and/or (3) included on a wearable patch or device external to the body. If included on a wearable patch or device, the wearable patch or device could provide power to the sensor (e.g., RFID). In some embodiments, the wearable patch or device can also read sensor data. The sensors can be continuously recording or can be turned on at select times. In one embodiment, for example, the sensors are battery powered and the battery is recharged via power harvesting, as will be described in greater detail below.

The sensors can transmit sensed physiological parameters to external display elements, external controllers, control circuitry included on the device, and/or control circuitry wirelessly coupled to the device. In some embodiments, the system can automatically adjust the flow control element in response to the sensed data, including any of the parameters discussed herein. For example, if left atrial pressure increases above a predetermined threshold, the system can automatically manipulate the flow control element to selectively increase blood flow between the LA and the RA. Likewise, if left atrial pressure decreases below a predetermined threshold, the system can automatically manipulate the flow control element to selectively decrease blood flow between the LA and the RA. In some embodiments, if the patient's heart rate increases above a predetermined threshold, the system can automatically manipulate the flow control element to selectively increase the blood flow between the LA and the RA. Likewise, if the patient's heart rate decreases below a predetermined threshold, the system can automatically manipulate the flow control element to selectively decrease the blood flow between the LA and the RA. In this manner, the intertrial shunting systems described herein may be able to improve cardiac function of a patient, for example, to increase an exercise capacity of a patient.

As previously indicated, some embodiments of the interatrial shunting systems described herein include a wearable component. The wearable component can be a temporary patch, band, covering, clothing, or other device that can be affixed to, or otherwise worn by, the patient. For example, in some embodiments the wearable is an adhesive patch configured to adhere to the skin of the patient. In another example, the wearable is a device that can be secured to the patient using one or more bands/straps. In some embodiments, the wearable component is configured to communicate with one or more implanted portions of the system. For example, the wearable component may receive data from, and/or send data to, one or more implanted portions of the system. The wearable may also act as a relay between one or more implanted portions of the system and one or more external portions of the system (e.g., a controller, described below) to facilitate the transfer of data therebetween. In addition to, or in lieu of, data transfer, the wearable component can also be configured to provide power to one or more implanted portions of the system. Wireless power and data transfer may utilize the same or different transmission mechanisms. In some embodiments, the wearable components can include one or more antenna for generating RF fields (e.g., from about 100 MHz to 1 GHz) and/or magnetic fields (e.g., below about 20 MHz). In some embodiments, data and power transfer can be accomplished using the same modality but at different frequencies. For example, in some embodiments, power can be transferred using 6-7 MHz magnetic fields (which are generally not attenuated by the body) and data (which can withstand attenuation) can be transferred using 910-920 MHz magnetic fields. In addition to, or in lieu of, the antenna, the wearable components may include an ultrasonic receiver and/or an ultrasonic source.

Figure 1C:
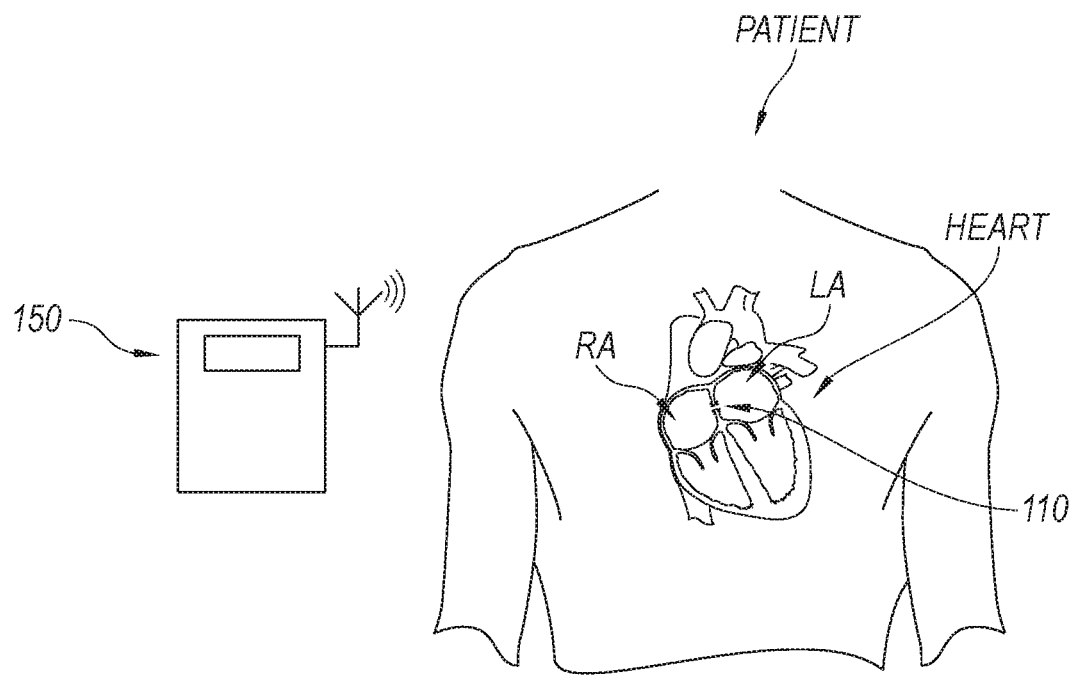
FIGS. 1C and 1D are partially schematic illustrations of a controller for an interatrial shunting system and configured in accordance with select embodiments of the present technology.

In some embodiments, the interatrial shunting systems described herein may optionally include a controller. For example, FIG. 1C illustrates an external controller 150 for controlling the operation of one or more implanted components (e.g., an interatrial shunt 110). Suitable controllers include, for example, computers, tablets, cell phones, mobile device applications, or other dedicated hardware (e.g., a wearable such as a patch, band, covering, clothing, or the like). The implantable portion of the system may be coupled to the controller 150 via magnetic, ultrasound, radiofrequency (including WiFi, Bluetooth®, e.g., BLE 5.0), or other wireless means. In other embodiments, the implantable portion of the system may be coupled to the controller 150 via a wired connection. The wired connection can be temporary, such as a connection formed by a reversible coupling. In some embodiments, at least a portion of the wired connection can be positioned sub-dermally. In some embodiments, a portion of the system such as an antenna sits sub-dermally and communicates wirelessly with one or more external components (e.g., the controller) and communicates via a wired connection to one or more implanted components (e.g., a shunt).

Figure 1D:
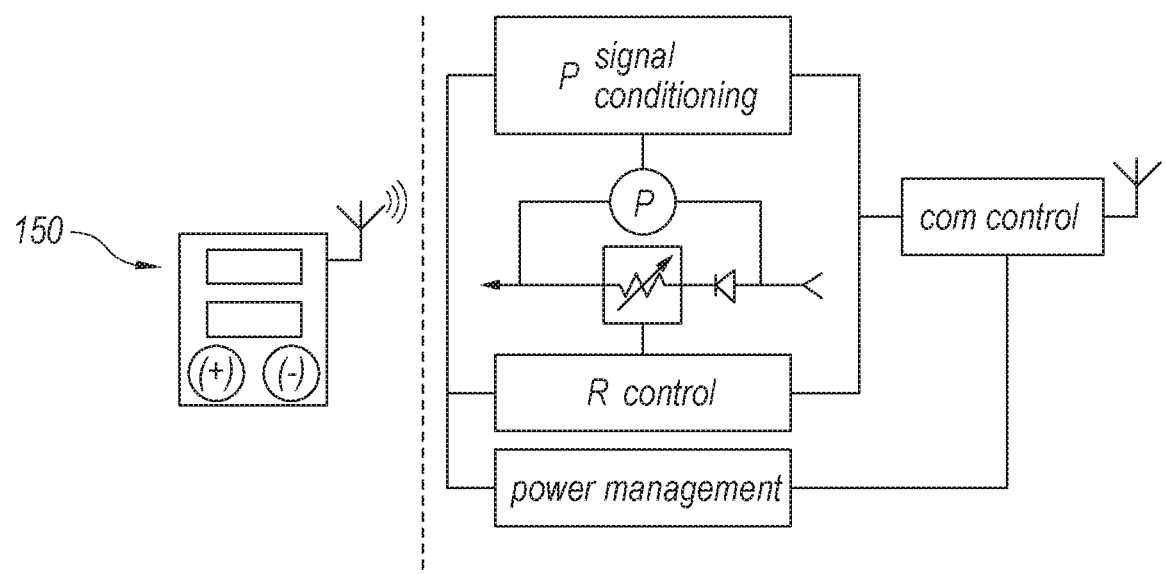

The controller 150 can provide a user interface such that a user (e.g., the patient, a healthcare practitioner, etc.) can selectively control one or more aspects of the system (e.g., an actuation mechanism, the flow control element, etc.) via the controller 150. For example, a healthcare practitioner can input a desired setpoint, such as a flow control element orifice size or flow rate, to attain a particular outcome relative to a characteristic of a pressure waveform (as described above) or an ECG waveform. The controller 150 can communicate with the implanted portion of the system such that an actuator mechanism of the system manipulates the flow control element to achieve the desired performance and/or setpoint. The performance and/or setpoint can include a correlation between orifice size and flow resistance and/or flow rate (at a given pressure). The controller can also display values of one or more sensed physiological parameters measured by one or more sensors included with the system. In some embodiments, the controller 150 can transmit power to a pressure sensing system (e.g., pressure sensing system 240, described with respect to FIG. 2B). The controller 150 may also receive data from the pressure sensing system. FIG. 1D is a schematic diagram of certain features of the controller 150. In some embodiments, a power management component such as illustrated in FIG. 1D can include one or more power storage elements.

As described above, the implantable portion of the system may be coupled to the controller 150 via a combination of wired and wireless connections. Distributing the communication across multiple devices and/or modalities may provide improved flexibility and power savings. It is understood that wireless communication with "deep" implants well below the skin—including the interatrial shunts positioned in the heart—present greater challenges with wireless data and power transmission. Accordingly, in some embodiments the interatrial shunting systems described herein may utilize wireless technology to connect external components with a hub and wired technology to connect the hub to the system electronics. For example, the portion of the system implanted into an organ (e.g., the heart) may communicate to a subcutaneous device via a wired connection, and the subcutaneously-implanted device may communicate to an external device via a wireless connection, or vice versa.

Some embodiments of the present technology describe interatrial systems that are "smart" or otherwise dynamic in nature. In this context, the term "smart" may reference various approaches, which are described in detail below and further understood from the description herein. For instance, a smart shunt may include sensors and/or information gathering capability in order to add diagnostic capability to the system, or to further enhance the therapeutic capabilities of the system. In other implementations, a smart system may contain one or more lumens that is adaptable to adjust in size and/or effective size in response to a patient's physiological condition or in response to a physician or healthcare provider action.

In some embodiments, the shunting element has an outer or external surface with a generally fixed and/or constant outer diameter that is configured to interface with native tissue (e.g., at a septal wall). The shunting element can also have an internal surface that defines a lumen for directing blood between the LA and the RA. In some embodiments, the internal surface may be at least partially defined by the flow control element (e.g., in embodiments in which the flow control element is a toroid-shaped expandable member, described in detail with reference to FIGS. 2A-5J). The flow control element can be configured to change a geometry (e.g., shape and/or size) of the internal surface to adjust a diameter of the lumen, while the outer diameter of the shunting element remains generally the same.

As one of skill in the art will appreciate from the disclosure herein, various components of the interatrial shunting systems described above can be omitted without deviating from the scope of the present technology. Likewise, additional components not explicitly described above may be added to the interatrial shunting systems without deviating from the scope of the present technology. Accordingly, the systems described herein are not limited to those configurations expressly identified, but rather encompasses variations and alterations of the described systems.

C. SELECT EMBODIMENTS OF ADJUSTABLE INTERTRIAL SHUNTING SYSTEMS WITH EXPANDABLE FLOW CONTROL ELEMENTS

Some embodiments of the present technology are directed to adjustable interatrial shunting systems having expandable flow control elements for selectively controlling the flow of blood between the LA and the RA. In such embodiments, a fluid or gas is transferred into and/or out of the expandable flow control elements to change a size of the flow control element and, as a result, change the flow resistance between the LA and RA. For example, some embodiments of the present technology include a shunting element having a lumen extending therethrough that is configured to fluidly couple the LA and the RA when the shunting element is implanted in the patient. An expandable flow control element, such as an expandable member or balloon, can be positioned within and/or adjacent the lumen. A fluid reservoir can be operably coupled to the expandable flow control element. In such embodiments, the system may transfer fluid from the fluid reservoir to the expandable flow control element to increase a volume of the expandable flow control element, thereby decreasing a dimension (e.g., a cross-sectional diameter) of, or otherwise further blocking, the lumen. The system may also transfer fluid from the expandable flow control element to the fluid reservoir to decrease a volume of the expandable flow control element, thereby increasing a dimension of, or otherwise further unblocking, the lumen. Select embodiments of adjustable interatrial shunting systems that include expandable flow control element are described below with respect to FIGS. 2A-11D.

Figure 2A:
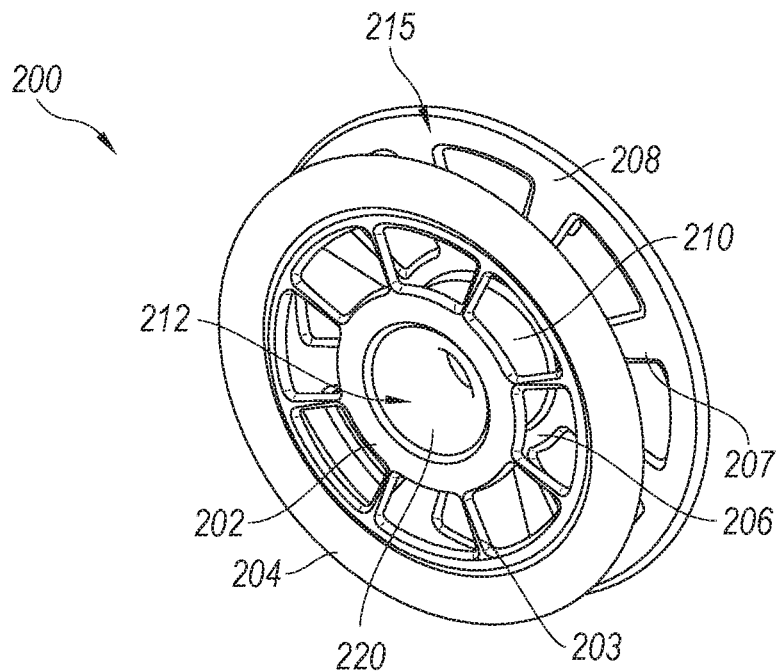
FIGS. 2A-2C are partially schematic illustrations of an interatrial shunting system having an expandable flow control element and configured in accordance with select embodiments of the present technology.

FIG. 2A, for example, is a partially isometric view of an interatrial shunting system 200 ("system 200") configured in accordance with embodiments of the present technology. System 200 includes a shunting or tubular element 210 having a lumen 212 extending therethrough. When the system 200 is implanted within a heart (e.g., across a septal wall), the lumen 212 can fluidly connect a LA and a RA to shunt blood therebetween. As described in greater detail below with respect to FIGS. 2C and 2D, a flow control element 220 can be placed within the tubular element 210 to control the flow of blood between the LA and the RA.

The system 200 can be secured across the septal wall or other anatomical structure using one or more anchoring elements, such as flanges. In the illustrated embodiment, for example, the system 200 includes a first flange 202 having a plurality of first spokes 203 and a first ring 204. The system 200 also includes a second flange 206 having a plurality of second spokes 207 and a second ring 208. In other embodiments, the first flange 202 and/or the second flange 206 extend radially outward as a circular plate-like structure, and the first spokes 203 and the second spokes 207 are omitted. The first flange 202 and the second flange 206 can be at least partially spaced apart to create a gap 215. The gap 215 can be configured to receive native tissue (e.g., a portion of the septal wall). Accordingly, when the system 200 is implanted within a heart, the first flange 202 can reside on a LA side of the septal wall, the second flange 206 can reside on a RA side of the septal wall, and a portion of the septal wall can be disposed in the gap 215 between the first flange 202 and the second flange 206, thereby securing the system 200 in place. In some embodiments, the first flange 202 and the second flange 206 can be transitionable between a generally low-profile delivery configuration and an expanded deployed configuration. For example, in some embodiments at least some aspects of the first flange 202 and the second flange 206 are inflatable such that after delivery of the system 200, the first flange 202 and the second flange 206 can be inflated to expand from the low-profile delivery configuration to the deployed configuration, thereby securing the system 200 in position. In some embodiments, the system 200 may have additional or alternative anchoring mechanisms to secure the system 200 in position.

Figure 2B:
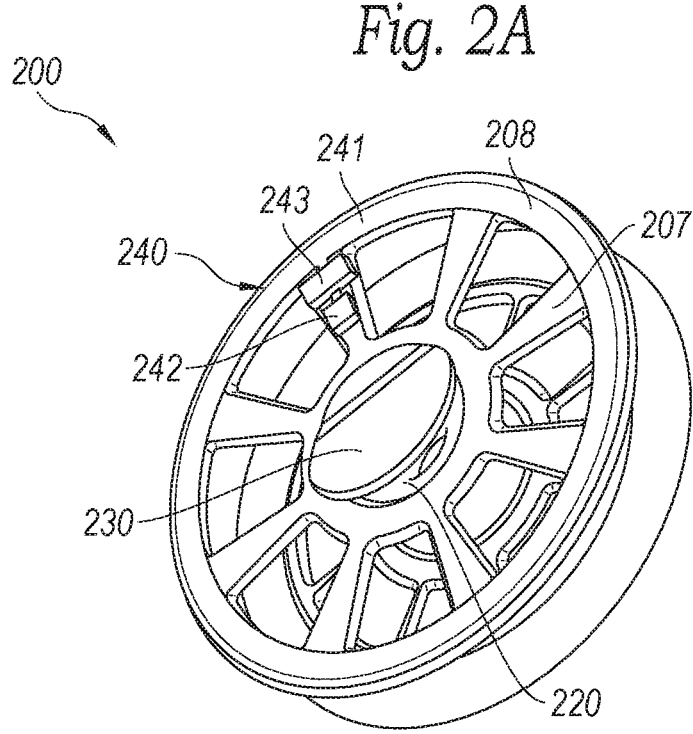

FIG. 2B is a partially isometric view of the system 200 from an outflow side of the system 200. As illustrated in FIG. 2B, the system 200 can optionally include a valve or flap 230 that can close to block blood flow through the lumen 212. The flap 230 can be a one-way valve that permits blood flow in a first direction (e.g., from the LA to the RA) and prevents and/or reduces blood flow in a second direction (e.g., from the RA to the LA). Accordingly, the flap 230 can reduce the risk of backflow through the lumen 212 when the system 200 is implanted in the septal wall. In some embodiments, the flap 230 is omitted and flow through the lumen 212 is controlled through inflation and deflation of the flow control element 220, as described in greater detail below.

Figure 2C:
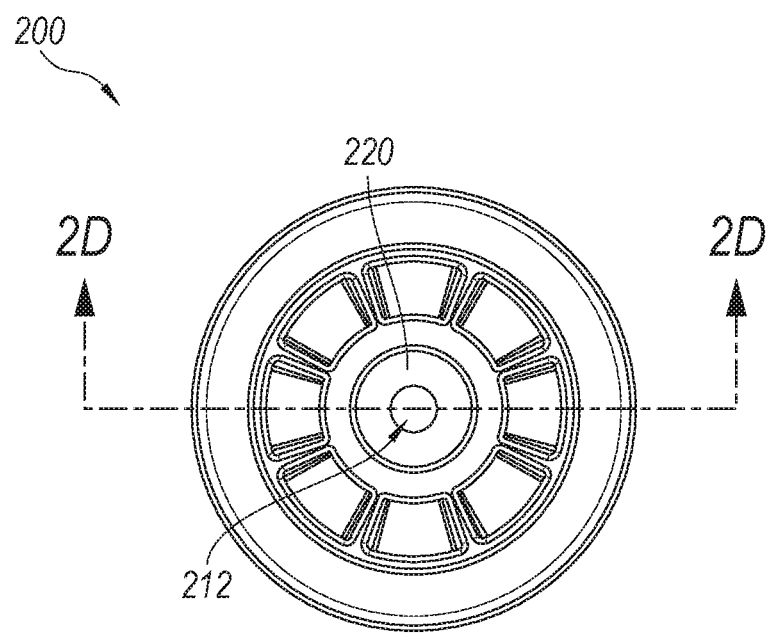
Figure 2D:
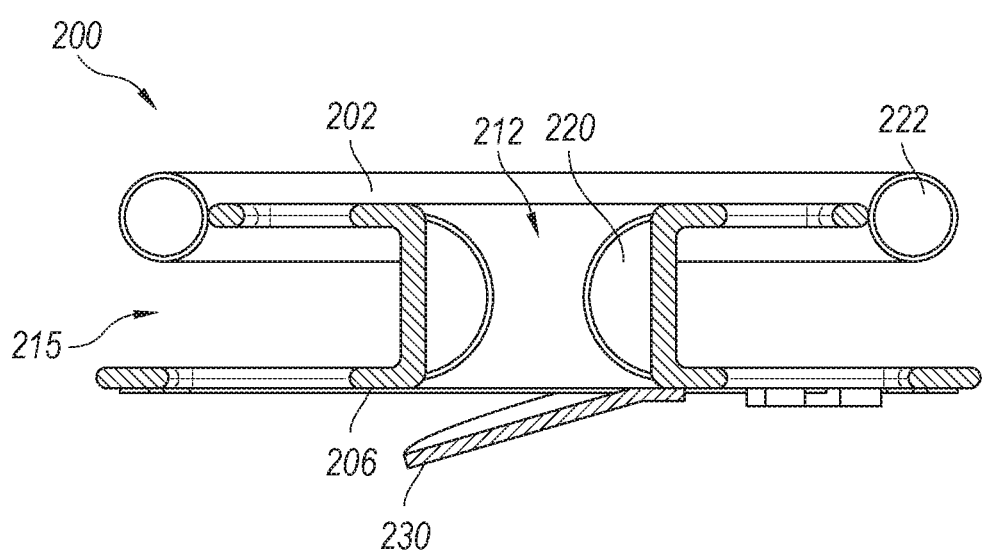
FIG. 2D is a cross-sectional view of the system of FIGS. 2A-2C.

FIG. 2C is a front view of the system 200, and FIG. 2D is a cross-section view of the system 200 taken along the line 2D-2D indicated in FIG. 2C. As illustrated, the flow control element 220 can have a generally toroidal shape that, in at least some configurations, occupies at least a portion of the lumen 212. Accordingly, the flow control element 220 can at least partially block the lumen 212. In some embodiments, the flow control element 220 is an at least partially flexible (e.g., expandable and/or compressible) structure (e.g., a bladder, cavity, balloon, etc.) that can hold a fluid (e.g., saline, silicon oil, hydrogel) or a gas (e.g., air). Accordingly, the flow control element 220 can inflate (e.g., fill with liquid or gas) and/or deflate (e.g., unfill) to change the shape and or size of the lumen 212. The flow control element 220 can also be referred to as an "expandable flow restrictor" or an "expandable member." As described in detail below, the flow control element 220 may fill and/or unfill depending on, for example, the pressure differential between the environment surrounding the flow control element 220 (e.g., the lumen 212) and the environment surrounding another bladder or reservoir (e.g., a reservoir 222) in fluid communication with the flow control element 220.

As noted above, the system 200 can also include a reservoir 222 fluidly coupled to the flow control element 220. Accordingly, as described in detail below, the fluid or gas can be routed between the reservoir 222 and the flow control element 220. In some embodiments, the reservoir 222 is at least partially flexible (e.g., expandable and/or compressible). Accordingly, the reservoir 222 can inflate (e.g., fill with liquid or gas) and/or deflate (e.g., unfill) based on the relative presence or absence of gas or fluid in the reservoir 222. In other embodiments, the reservoir 222 does not change in shape or size as fluid or gas flows into and/or out of the reservoir 222. In some embodiments, the reservoir 222 can be positioned on or within the first flange 202, on or within the second flange 206, on or within another suitable structure of the system 200, or on or within a combination of structures of the system 200. In some embodiments, the reservoir 222 is positioned within a housing formed by the first flange 202 or the second flange 206 such that the pressure exerted on the reservoir 222 is generally constant. In other embodiments, the reservoir 222 may be at least partially exposed to a heart chamber (e.g., a LA or an RA), and the pressure exerted on the reservoir 222 is determined at least in part by the pressure in the heart chamber.

Fluid or gas can flow between the reservoir 222 and the flow control element 220 (and vice versa) to fill (e.g., inflate) and/or unfill (e.g., deflate) the flow control element 220 and the reservoir 222. Filling and/or unfilling the flow control element 220 changes the size and/or shape of the lumen 212 and can accordingly change the flow resistance and/or the flow of blood through the lumen 212. For example, the flow control element 220 inflates as fluid flows into the flow control element 220 and out of the reservoir 222, thereby reducing the size of the lumen 212 (and the flow of blood between the LA and the RA). The flow control element 220 deflates as fluid flows out of the flow control element 220 and into the reservoir 222, thereby increasing the size of the lumen 212 (and the flow of blood between the LA and the RA). In some embodiments, and as described below, the flow of fluid between the reservoir 222 and the flow control element 220 can be passively controlled based on, among other things, a pressure differential between the LA and the RA.

In some embodiments, the system 200 can be biased such that below a certain pressure threshold or pressure gradient threshold (e.g., below a predetermined pressure difference between the LA and the RA, etc.), the fluid within the system is biased towards occupying the flow control element 220. As a result, the flow control element 220 is generally inflated and at least partially blocks blood flow through the lumen 212. In such embodiments, the flow control element 220 may comprise a material with greater elasticity and/or flexibility than the reservoir 222 such the fluid preferentially occupies the flow control element 220. As the pressure in the LA increases and overcomes the pressure keeping the fluid in the flow control element 220, the fluid flows out of the flow control element 220 and into the reservoir 222. As a result, the reservoir 222 inflates, the flow control element 220 deflates, and the overall size of the lumen 212 increases. In other embodiments, the system 200 can be biased such that fluid preferentially occupies the reservoir 222.

In some embodiments, the reservoir 222 is inflatable, is at least partially exposed to the RA, and is less elastic and/or less flexible than the flow control element 220. Accordingly, until a pressure differential between the environment surrounding the flow control element 220 (e.g., the lumen) and the environment surrounding the reservoir 222 (e.g., the RA) exceeds a predetermined threshold, fluid is biased towards and preferentially occupies the flow control element 220. However, as the pressure differential between the environment surrounding the flow control element 220 and the environment surrounding the reservoir 222 increases, the forces acting on the flow control element 220 are sufficient to overcome the biasing forces created by the less flexible reservoir 222. As a result, fluid is pushed out of the flow control element 220 and into the reservoir 222 (e.g., against the biasing forces created by the less flexible reservoir 222). This deflates the flow control element 220 and inflates the reservoir 222. If the pressure differential drops below the predetermined threshold, the fluid is forced back towards the flow control element 220 as a result of the biasing forces created by the less flexible reservoir 222. As one skilled in the art will appreciate, the composition and materials of the flow control element 220 and the reservoir 222 can be selectively chosen such that a predetermined pressure differential is required to overcome the biasing forces that direct fluid towards the flow control element 220. Accordingly, the system 200 can be configured such that fluid is forced out of the flow control element 220 (and thus the lumen 212 is increased in diameter) only when pressure within the LA exceeds pressure within the RA by a predetermined amount.

In some embodiments, the shunt can include a valve (e.g., a MEMS valve, not shown) configured to control fluid transfer between the reservoir 222 and the flow control element 220. For example, in some embodiments the MEMS valve can include a thermal or piezoelectric diaphragm that can, upon actuation, block or unblock a fluid path between the reservoir 222 and the flow control element 220. When unblocked, fluid can flow between the reservoir 222 and the flow control element 220, thereby allowing the size and/or shape of the flow control element 220 to change according to the pressure differential between the reservoir 222 and the flow control element 220. When blocked, fluid cannot flow between the reservoir 222 and the flow control element 220, thereby holding the size and/or shape of the flow control element 220 in a generally constant state. In some embodiments, the MEMS valve is set to open when the pressure differential between the LA and the RA exceeds a predetermined threshold to allow transfer of fluid from the flow control element 220 to the reservoir 222. In some embodiments, the MEMS valve is set to open when the pressure differential between the LA and the RA falls below a predetermined threshold to allow transfer of fluid from the reservoir 222 to the flow control element. In some embodiments, the valve may partially open in order to serve as a rate control mechanism that limits how quickly fluid can be transferred between the flow control element 220 and the reservoir 222. In various embodiments, the valve may be configured to work bidirectionally or may be directed to control the flow in primarily one direction. The operation of the valve may be controlled by sensors that monitor the cardiac cycle, e.g., to account for the effects of time-varying atrial pressures throughout a cardiac cycle (see FIG. 1B) and help prevent fluid from excessively cycling back and forth between the chambers as pressures (and/or pressure differentials) vary. Without being bound by theory, the power input required to drive the MEMS valve is expected to be relatively low (e.g., about 10 mW or less, about 5 mW or less, etc.). In some embodiments, the MEMS valve can be actuated (e.g., opened or closed) based at least in part on a pressure reading from a pressure sensor, such as pressure sensor 242 described below.

In some embodiments, fluid can be actively pumped between the reservoir 222 and the flow control element 220 to change the size and/or shape of the flow control element 220. For example, in some embodiments the system 200 can include a MEMS or other pumping mechanism (not shown) that actively transfers fluid between the reservoir 222 and the flow control element 220. Use of an active pump can enable the fluid to flow against the expected direction of flow based upon the pressure difference between the reservoir 222 and the flow control element 220. Actively pumping the fluid can be in addition to or in lieu of relying on the passive flow of fluid between the reservoir 222 and the flow control element 220 (e.g., flow controlled using the MEMS valve).

Referring back to FIG. 2B, the system 200 can optionally include a pressure sensing system 240. The pressure sensing system 240 can include a data antenna 241, a pressure sensor 242, and a pressure sensor control circuit 243. The pressure sensor 242 can be configured to measure one or more physiological parameters surrounding the system 200, such as left atrial pressure and/or right atrial pressure. In the illustrated embodiment, the pressure sensor 242 is illustrated on the outflow side (e.g., the RA side) of the system 200, although in other embodiments the pressure sensor 242 can be on a first side (e.g., LA side) of the system 200. In yet other embodiments, the system 200 includes a pressure sensor 242 on both the inflow side of the system 200 and a second side of the system 200. Although only illustrated as including one pressure sensor 242, the system 200 can have multiple sensors (e.g., arranged along a perimeter of the first ring 204 and/or the second ring 208). The pressure sensor 242 can take any form suitable for measuring one or more physiologic parameters. For example, the pressure sensor 242 can have any suitable shape, including circular, oval-shaped, triangular, rectangular, etc. The pressure sensors may also be formed of one or more loops of wire (e.g., copper and/or silver wires with a diameter of between about 5-15 mm). The data antenna 241 can communicate data to and or from the pressure sensing system 240. For example, the data antenna 241 may be able to communicate with an external controller (e.g., controller 1250 in FIG. 12A). The pressure sensor control circuit 243 can control power delivered from the data antenna 241 and/or signals received from the pressure sensor 242 and delivered to the data antenna 241. In some embodiments, the system 200 can be adjusted based at least in part on physiological parameters (e.g., pressure) measured using the pressure sensing system 240. In some embodiments, one or more pressure sensors (e.g., pressure sensor 242) can be configured to measure pressure within either or both of the flow control element 220 and the reservoir 222.

Figures 3A, 3B:
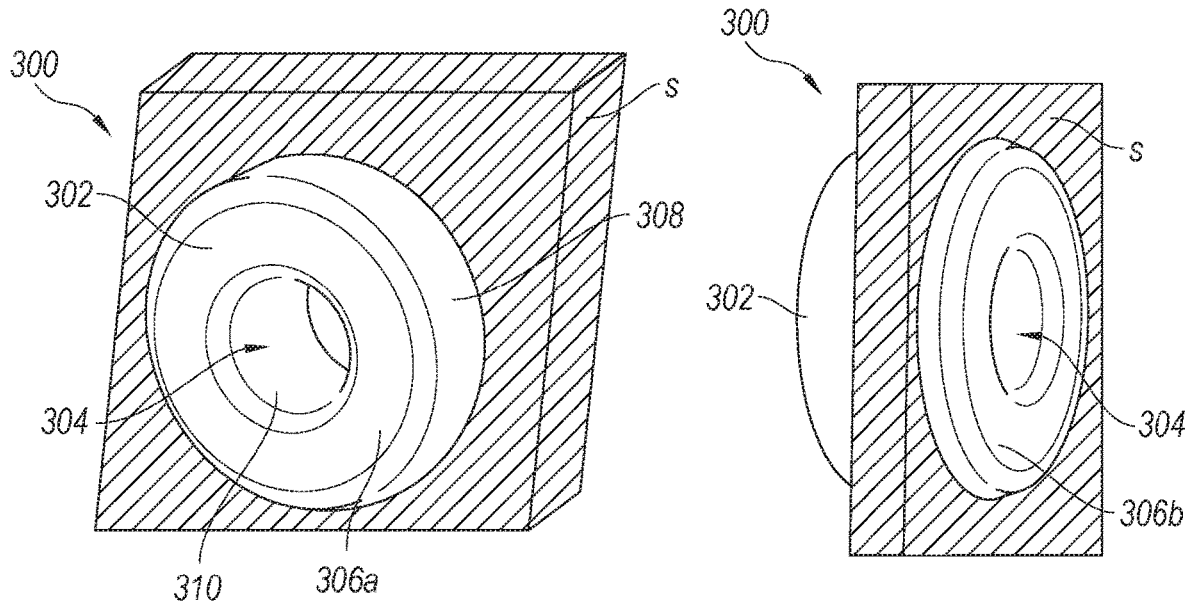
FIGS. 3A and 3B are perspective views of an interatrial shunting system implanted in a septal wall and configured in accordance with an embodiment of the present technology.
Figure 3C:
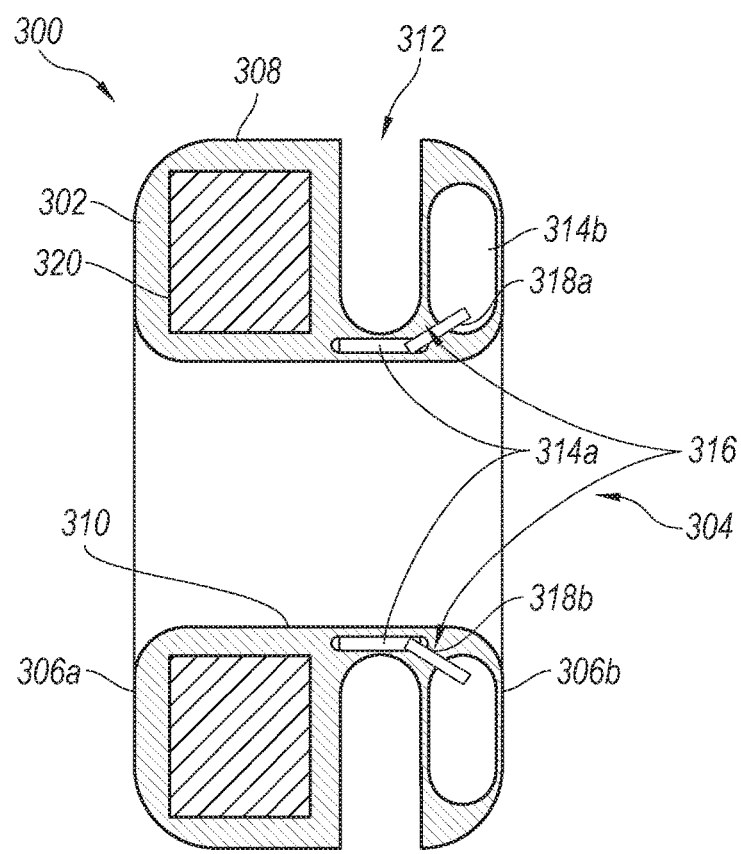
FIG. 3C is a side cross-sectional view of the system of FIGS. 3A and 3B.

FIGS. 3A-3F illustrate an interatrial shunting system 300 ("system 300") having an expandable flow control element and configured in accordance with another embodiment of the present technology. More specifically, FIGS. 3A and 3B are perspective views of the system 300 implanted in a septal wall S, FIG. 3C is a side cross-sectional view of the system 300 of FIGS. 3A and 3B, FIGS. 3D and 3E are perspective views of the system 300 implanted in the septal wall S during a different stage of operation, and FIG. 3F is a side cross-sectional view of the system 300 of FIGS. 3D and 3E.

Referring first to FIGS. 3A-3C together, the system 300 includes a flow control system 302 configured for placement in the septal wall S. The flow control system 302 can be engaged with a lumen 304 of a shunting element (not shown). In some embodiments, the flow control system 302 is carried by and/or operably coupled to the shunting element and is positioned near, adjacent to, or at least partially within the lumen 304. In other embodiments the flow control system 302 can be part of the shunting element and can at least partially define the lumen 304. The flow control system 302 can be configured to selectively control blood flow through the lumen 304. In some embodiments, for example, the flow control system 302 is configured to adjust the shape, size (e.g., cross-sectional area, diameter, etc.), and/or other characteristic of the lumen 304. For example, the flow control system 302 can be configured to selectively increase a diameter of the lumen 304 and/or selectively decrease a diameter of the lumen 304.

In the illustrated embodiment, the flow control system 302 is an annular and/or toroid-shaped structure including a first end surface 306a, a second end surface 306b opposite the first end surface 306a, an outer surface 308 extending between the first and second end surfaces 306a-b, and an inner surface 310 surrounding the lumen 304. When implanted in the septal wall S, the first end surface 306a can be near or within a first heart chamber (e.g., the RA), the second end surface 306b can be near or within a second heart chamber (e.g., the LA), and the outer surface 308 can be near or adjacent to the septal wall S and/or the shunting element. Optionally, the outer surface 308 can include a circumferential groove or channel 312 to engage the septal wall S and/or the shunting element.

As best seen in FIG. 3C, the flow control system 302 can include a first expandable chamber 314a (e.g., a flow control element) and a second expandable chamber 314b (e.g., a fluid reservoir). The first and second expandable chambers 314a-b can each be a flexible structure configured to hold fluid (e.g., a reservoir, cavity, bladder, etc.), such as a liquid (e.g., saline, silicon oil) or a gas (e.g., air). In the illustrated embodiment, the first and second expandable chambers 314a-b each have an annular shape and extend circumferentially around the lumen 304. In other embodiments, however, the first and second expandable chambers 314a-b can extend only partially around the lumen 304. Additionally, although FIG. 3C illustrates the first and second expandable chambers 314a-b as each having an elliptical cross-sectional shape, in other embodiments the first and second expandable chambers 314a-b can have different cross-sectional shapes (e.g., circular, square, rectangular, polygonal, curvilinear, etc.).

The first and second expandable chambers 314a-b can each be positioned within an interior portion of the flow control system 302 between the first and second end surfaces 306a-b, outer surface 308, and inner surface 310. In some embodiments, the flow control system 302 is a solid structure and the first and second expandable chambers 314a-b are embedded or formed in the solid structure. The first expandable chamber 314a can be positioned adjacent or near the lumen 304 while the second expandable chamber 314b can be spaced apart from the lumen 304. In the illustrated embodiment, for example, the first expandable chamber 314a is positioned near or adjacent to the inner surface 310 of the flow control system 302, while second expandable chamber 314b is positioned near or adjacent to the second end surface 306b of the flow control system 302. In other embodiments, the second expandable chamber 314b can be positioned at different location, such as near or adjacent to the first end surface 306a.

In some embodiments, the flow control system 302 is made of an elastic material such that the geometry (e.g., shape and/or size) of the first and second expandable chambers 314a-b are adjustable by varying the amount of fluid therein. For example, the size (e.g., volume, cross-sectional area) can increase as fluid is introduced into the chamber and decrease as fluid is withdrawn from the chamber. In some embodiments, the first and second expandable chambers 314a-b are fluidly coupled to each other (e.g., by a tube, channel, or other connecting structure) such that the size changes are antagonistic, e.g., the first expandable chamber 314a increases in size as the second expandable chamber 314b decreases in the size, and vice-versa.

The flow control system 302 can include an actuation mechanism 316 (e.g., a fluid pump—shown schematically) operably coupled to the first and second expandable chambers 314a-b for moving fluid therebetween. The actuation mechanism 316 can be configured in many different ways. In the illustrated embodiment, the actuation mechanism 316 is located within the interior portion of the flow control system 302. In other embodiments, the actuation mechanism 316 can be at a different location in the system 300, such as external to the flow control system 302. In some embodiments, the actuation mechanism 316 includes a plurality of actuation elements (e.g., pumps, shape memory elements, etc.), such as a first actuation element 318a and a second actuation element 318b. The first actuation element 318a can be configured to move fluid in first direction (e.g., from the second expandable chamber 314b into the first expandable chamber 314a) and the second actuation element 318b can be configured to move fluid in a second, opposite direction (e.g., from the first expandable chamber 314a into the second expandable chamber 314b). Optionally, one or both of the first and second actuation elements 318a-b can be configured to move fluid in both directions (e.g., from the first expandable chamber 314a into the second expandable chamber 314b, and from the second expandable chamber 314b into the first expandable chamber 314a). Additionally, in other embodiments the actuation mechanism 316 can include a different number of actuation elements (e.g., one, three, four, five, or more).

In some embodiments, the flow control system 302 is configured to selectively control the amount of blood flow through the lumen 304 by changing the geometry of the first and/or second expandable chambers 314a-b (e.g., via fluid transfer actuated by the actuation mechanism 316). The change in geometry of the first and/or second expandable chambers 314a-b can produce a corresponding change in the geometry of the lumen 304 (e.g., an increase or decrease in the diameter in at least one location). In some embodiments, the first expandable chamber 314a is positioned near the lumen 304 such that changes in the geometry of the first expandable chamber 314a affect the geometry of the lumen 304, while the second expandable chamber 314b is positioned away from the lumen 304 so that changes in the geometry of the second expandable chamber 314b have little or no effect on the geometry of the lumen 304. In such embodiments, the second expandable chamber 314b can serve primarily as a reservoir for storing fluid withdrawn from the first expandable chamber 314a. Accordingly, the first expandable chamber 314a can also be referred to as a "flow control element," expandable member," or "flow restrictor", and the second expandable chamber 314b can also be referred to as a "fluid reservoir."

For example, referring to FIGS. 3A-3C together, the actuation mechanism 316 (e.g., second actuation element 318b) can transfer fluid out of the first expandable chamber 314a and into the second expandable chamber 314b, thus decreasing the size of the first expandable chamber 314a and increasing the size of the second expandable chamber 314b. As a result, the first expandable chamber 314a can be in a partially or completely unfilled configuration having a relatively small size (e.g., volume), while the second expandable chamber 314b can be in a partially or completely filled configuration having a relatively large size. In some embodiments, the first expandable chamber 314a produces little or no obstruction of the lumen 304 when in the partially or completely unfilled configuration. For example, in the illustrated embodiment, the first expandable chamber 314a is contracted so that the inner surface 310 of the flow control system 302 is positioned closer to the outer surface 308. As a result, the lumen 304 can have a relatively large size (e.g., diameter, cross-sectional area, etc.) allowing for a greater amount of blood flow therethrough. In some embodiments, when the second expandable chamber 314b is in the partially or completely filled configuration, the second end surface 306b is expanded laterally outward, e.g., away from the septal wall S and/or into the heart chamber. The outward expansion of the second end surface 306b can produce little or no obstruction of blood flow through the lumen 304.

Referring to FIGS. 3D-3F together, in a different stage of operation, the actuation mechanism 316 (e.g., first actuation element 318a) can transfer fluid out of the second expandable chamber 314b and into the first expandable chamber 314a, thus increasing the size of the first expandable chamber 314a and decreasing the size of the second expandable chamber 314b. As a result, the first expandable chamber 314a can transform into a partially or completely filled configuration having a relatively large size (e.g., volume), while the second expandable chamber 314b can transform into a partially or completely unfilled configuration having a relatively small size. In some embodiments, the first expandable chamber 314a at least partially obstructs the lumen 304 as the size of the first expandable chamber 314a increases, thereby reducing the volume of blood flow or inhibiting blood flow through the lumen 304. For example, in the illustrated embodiment, when the first expandable chamber 314a is in the partially or completely filled configuration, the first expandable chamber 314a expands radially inward so that the inner surface 310 of the flow control system 302 moves away from the outer surface 308 and protrudes into the lumen 304. As a result, the lumen 304 can have a relatively large small size (e.g., diameter, cross-sectional area, etc.) permitting a decreased amount or no amount of blood flow therethrough. Optionally, the expansion of the first expandable chamber 314a can displace the first end surface 306a inward and at least partially within the lumen 304 to further obstruct blood flow therethrough.

In some embodiments, when the second expandable chamber 314b is in the partially or completely unfilled configuration, the second end surface 306b is contracted inward, e.g., toward the septal wall S and/or away from the heart chamber. For example, in the illustrated embodiment, the second end surface 306b has a generally flattened shape when the second expandable chamber 314b is in the partially or completely unfilled configuration.

Referring to FIGS. 3C and 3F together, the flow control system 302 can further include one or more electronic components 320 (shown schematically) for operating the flow control system 302, such as one or more energy storage components (e.g., a battery), energy receiving components, controllers, sensors, etc. The electronic component(s) 320 can be positioned at any suitable location of the system 300, such as within the interior portion of the flow control system 302. In some embodiments, the electronic components 320 include one or more energy storage components, such as a primary battery, a rechargeable battery, a capacitor, a supercapacitor, and/or other suitable elements that can retain energy. The energy stored within the energy storage component(s) can be used by the flow control system 302 (e.g., actuation mechanism 316) to adjust the flow through the lumen 304, can be used to power sensors, and/or can be used for other operations requiring an energy input.

In some embodiments, the electronic components 320 include one or more energy transmission components (e.g., an antenna). The energy transmission component(s) can be configured to transmit energy and/or signals to an external device (e.g., a mobile device or other computing device operated by a user, such as a clinician or patient). For example, the energy transmission component(s) can be configured to transmit data to an external hub or reader, e.g., for notification purposes, for processing and/or analysis, etc.

The electronic components 320 can also include or be operably coupled to one or more sensors. The sensors can measure one or more physiological parameters related to the system 300 and/or the environment proximate to the sensors, such as a left atrial pressure and/or a right atrial pressure. In some embodiments, the electronic components 320 also include a processor configured to calculate a pressure differential between the LA and the RA based on the information measured by the sensors and/or other relevant calculations. The flow control system 302 can adjust the lumen 304 based on the parameters measured by the sensors and/or the pressure differential calculated by the processor. In some embodiments, the electronic component(s) 320 are operably coupled to and control the actuation mechanism 316 based on the measured physiological parameters to selectively adjust the lumen 304, as previously described herein.

The configuration of the system 300 can be varied in a number of different ways. For example, although the illustrated embodiment includes two expandable chambers 314a-b, in other embodiments the system 300 can include a different number of expandable chambers (e.g., one, three, four, five, or more). The positioning of the expandable chambers within the flow control system 302 can also be varied as desired (e.g., at or near the first end surface 306a, second end surface 306b, outer surface 308, or inner surface 310).

Additionally, although FIGS. 3A-3F illustrate the flow control system 302 as having an annular shape, in other embodiments, the flow control system 302 can have a different shape (e.g., circular, elliptical, rectangular, square, polygonal, rectilinear, curvilinear, etc.). The flow control system 302 can have one or more apertures passing therethrough (e.g., two, three, four, five, or more). In some embodiments, the apertures each have the same shape (e.g., circular, elliptical, rectangular, square, polygonal, rectilinear, curvilinear, etc.) and/or size (e.g., area, circumference, diameter, perimeter, width, etc.). In other embodiments, some or all of the apertures can have a different shape and/or size. Alternatively, the flow control system 302 can have no apertures. Moreover, although the illustrated embodiment depicts the flow control system 302 as extending around the entire circumference or perimeter of the lumen 304, in other embodiments, the flow control system 302 can extend around only a portion of the circumference or perimeter of the lumen 304 (e.g., no more than 90%, 80%, 70%, 60%, 50%, 40%, 30%, 30%, 10%, or less of the circumference or perimeter of the lumen 304).

Figure 4A:
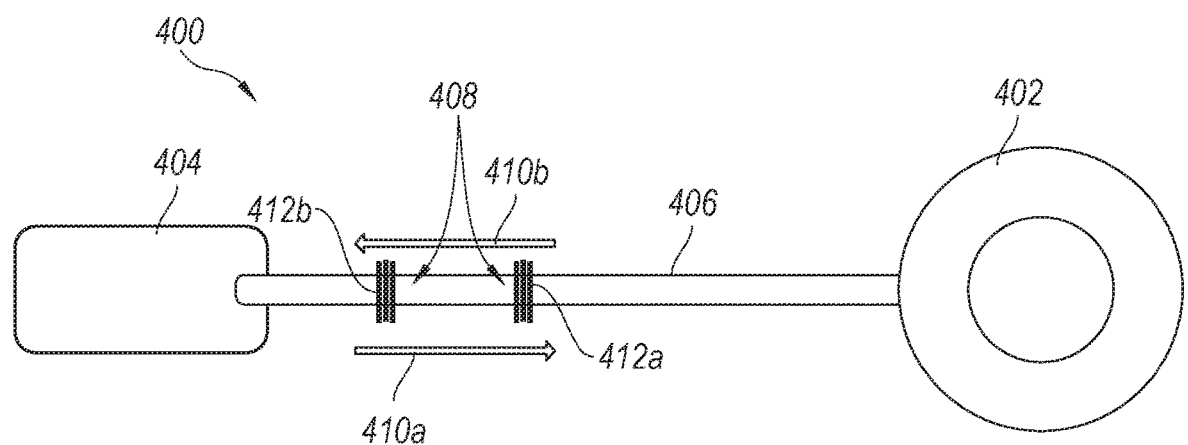
FIG. 4A is a schematic illustration of an interatrial shunting system with a shape memory-based actuation mechanism and configured in accordance with an embodiment of the present technology.
Figure 4B:
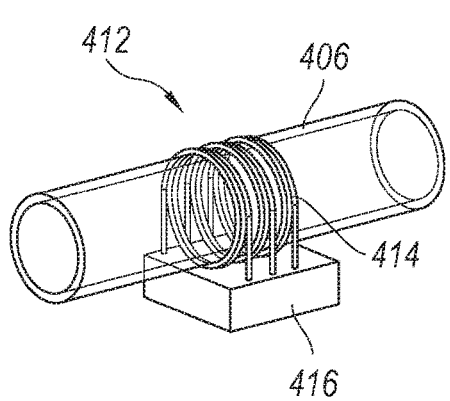
FIGS. 4B and 4C are closeup perspective views of an actuation mechanism of the system of FIG. 4A.
Figure 4C:
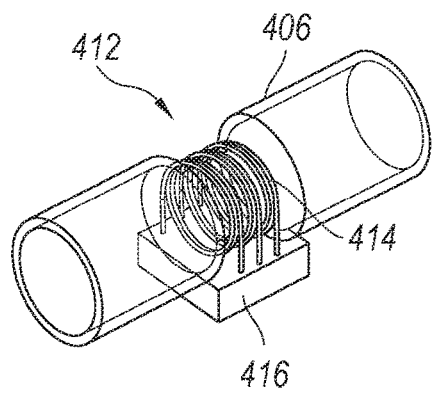

FIGS. 4A-4C illustrate an interatrial shunting system 400 ("system 400") with an expandable flow control element and a shape memory-based actuation mechanism configured in accordance with embodiments of the present technology. More specifically, FIG. 4A is a schematic illustration of the system 400, and FIGS. 4B and 4C are closeup perspective views of an actuation mechanism 408 of the system 400. Referring to FIG. 4A, the system 400 includes an expandable member 402 operably coupled to a fluid reservoir 404. The expandable member 402 can be coupled to a shunting element (not shown) to control blood flow therethrough by inflating and deflating (e.g., as previously described with respect to flow control element 220 in FIGS. 2A-2D and the first expandable chamber 314a in FIGS. 3A-3F). Accordingly, the expandable member 402 can also be referred to as a "flow control element" or a "flow restrictor." The fluid reservoir 404 can be fluidly coupled to the expandable member 402 via a connecting structure 406 (e.g., a tube, shaft, etc.). The connecting structure 406 can be flexible or rigid, or can include a combination of flexible portions and rigid portions. In some embodiments, the connecting structure 406 is a silicone rubber tube.

In some embodiments, the system 400 further includes an actuation mechanism 408 coupled to the connecting structure 406 to control fluid flow between the expandable member 402 and the fluid reservoir 404. For example, the actuation mechanism 408 can cause fluid to flow from the fluid reservoir 404 into the expandable member 402 (e.g., along the direction indicated by arrow 410a) to inflate the expandable member 402 to a greater volume. Conversely, the actuation mechanism 408 can cause fluid to flow from the expandable member 402 into the fluid reservoir 404 (e.g., along the direction indicated by arrow 410b) to deflate the expandable member 402 to a smaller volume.

In the illustrated embodiment, the actuation mechanism 408 includes a first actuator 412a and a second actuator 412b (collectively, actuators 412). The actuators 412 can include valves, gates, spring elements, shape memory elements, etc. configured to selectively permit or restrict fluid flow through the connecting structure 406. Each actuator 412 can be transformable between an open configuration allowing fluid to pass through a corresponding coupled portion of the connecting structure 406, a closed configuration preventing fluid from passing therethrough, and/or one or more intermediate configurations in which fluid is at least partially inhibited from passing through the connecting structure 406.

For example, referring to FIGS. 4B and 4C together, each actuator 412 can include one or more shape memory elements 414 coupled to a support 416. In the illustrated embodiment, the shape memory element(s) 414 include a plurality of shape memory wires (e.g., nitinol wires) wrapped about a portion of the connecting structure 406. When the actuator 412 is in its open configuration (e.g., as shown in FIG. 4B), the shape memory element(s) 414 can be in a less restrictive and/or loosened configuration that applies little or no force to the connecting structure 406, thereby allowing fluid to flow therethrough. To transition the actuator 412 to and/or toward its closed configuration (e.g., as shown in FIG. 4C), energy can be applied to the shape memory element(s) 414 (e.g., by heating) to cause the shape memory element(s) 414 to change shape into a more restrictive and/or tightened configuration. As a result, the shape memory element(s) 414 can tighten around and compress the connecting structure 406, thereby partially or fully obstructing fluid flow therethrough. To transition the actuator 412 back to and/or toward the open configuration, a counteracting force can be applied to change the shape of the shape memory element(s) 414 into a less restrictive and/or loosened configuration (e.g., via another shape memory element or another suitable element).

Referring again to FIG. 4A, the actuation mechanism 408 can control fluid flow between the expandable member 402 and fluid reservoir 404 by selectively opening and/or closing the various actuators 412. For example, in some embodiments, the first actuator 412a is coupled to a portion of the connecting structure 406 closer to the expandable member 402, and the second actuator 412b is coupled to a portion of the connecting structure closer to the fluid reservoir 404. The first actuator 412a and second actuator 412b can both initially be in a closed (or substantially closed) configuration, thus preventing fluid flow between the expandable member 402 and the fluid reservoir 404. To cause fluid to flow from the fluid reservoir 404 to the expandable member 402, the first actuator 412a can be opened (e.g., partially open, substantially open, fully open, etc.) and/or oscillated (e.g., cycled back and forth at least once between an open and closed configuration), followed by the second actuator 412b being opened and/or oscillated. To cause fluid to flow from the expandable member 402 to the fluid reservoir 404, the second actuator 412b can be opened and/or oscillated, followed subsequently by the first actuator 412a being opened and/or oscillated. With proper relative timing of the opening and/or oscillation of two or more flow control elements, a pumping effect can be created to shift fluid between the expandable member 402 and the fluid reservoir 404. In some embodiments, this pumping effect is the sole mechanism driving fluid transfer in the system 400. In other embodiments other supplementary forces (e.g., gravity, pressure, etc.) can be used in combination with actuators 412a-b to transfer fluid between various components of the system 400.

Although the illustrated embodiment includes only two actuators 412a-b, in other embodiments, the actuation mechanism 408 can include a different number of actuators (e.g., one, three, four, five, or more). Each actuator 412 can be positioned along a portion of the connecting structure 406 between the expandable member 402 and the fluid reservoir 404, and can be sequentially or simultaneously opened and/or closed to control fluid flow therebetween.

Figure 5A:
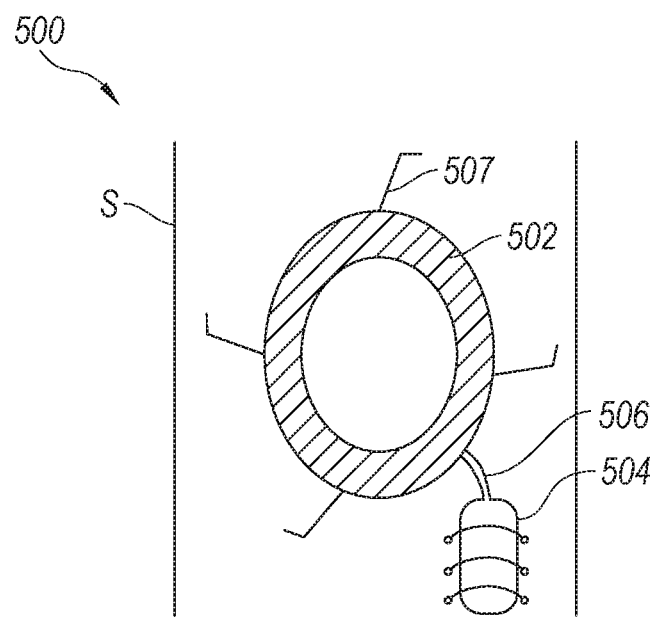
FIG. 5A is a schematic illustration of an interatrial shunting system with a shape memory-based actuation mechanism and configured in accordance with another embodiment of the present technology.
Figure 5B:
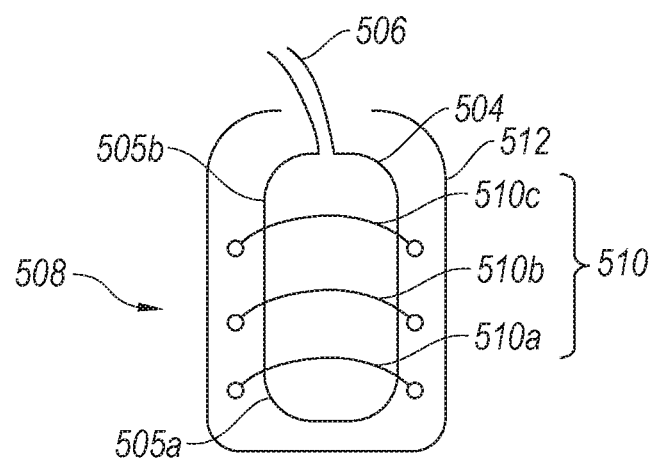
FIG. 5B is a top view of a fluid reservoir and an actuation mechanism of the system of FIG. 5A.

FIGS. 5A-5J illustrate an interatrial shunting system 500 ("system 500") with a shape memory-based actuation mechanism and configured in accordance with another embodiment of the present technology. More specifically, FIG. 5A is a schematic illustration of an expandable member 502 and a fluid reservoir 504 of the system 500, FIG. 5B is a top view of the fluid reservoir 504 and an actuation mechanism 508, and FIGS. 5C-5J illustrate the system 500 at various stages of operation (FIGS. 5C, 5E, 5G, and SI are side views of the fluid reservoir 504 and actuation mechanism 508, and FIGS. 5D, 5F, 8H, and 5J are front views of the expandable member 502).

Referring first to FIG. 5A, the system 500 includes the expandable member 502 fluidly coupled to the fluid reservoir 504 via a connecting structure 506. The expandable member 502 can be an inflatable toroid-shaped structure for controlling blood flow between the LA and the RA. Accordingly, the expandable member 502 can also be referred to as a "flow control element" or a "flow restrictor." In some embodiments, the expandable member 502 is positioned within and/or coupled to a shunting element such as stent-like structure or other frame (not shown) to control blood flow therethrough, e.g., as previously described herein. In other embodiments, the expandable member 502 is positioned directly within a septal opening or fluid path created between the LA and RA without first inserting a shunting element or other structure. The expandable member 502, the fluid reservoir 504, and the connecting structure 506 can be positioned within the patient's heart in a number of different ways. For example, in the illustrated embodiment, the expandable member 502 is coupled to the septum S via a plurality of anchoring elements 507. The fluid reservoir 504 and/or connecting structure 506 can also be coupled to the septum S via respective anchoring elements (not shown). In some embodiments, the fluid reservoir 504 is coupled to one side of the septal wall within a heart chamber (e.g., the LA or RA). In other embodiments, the fluid reservoir 504 traverses the septal wall, such that a first portion of the fluid reservoir 504 is located in a first heart chamber (e.g., the LA) and a second portion of the fluid reservoir 504 is located in a second heart chamber (e.g., the RA). Similarly, the connecting structure 506 can be located within a single heart chamber of the heart (e.g., the same heart chamber as the fluid reservoir 504 or a different heart chamber), or can traverse the septal wall so that different portions of the connecting structure 506 are within different heart chambers.

The configuration of the fluid reservoir 504 can be varied as desired. In the illustrated embodiment, for example, the fluid reservoir 504 has an elongated shape with a longitudinal axis extending vertically along the septal wall. In other embodiments, the fluid reservoir 504 can be oriented with its longitudinal axis extending laterally along the septal wall. Additionally, although FIG. 5A illustrates the fluid reservoir 504 as being positioned below the expandable member 502, in other embodiments, the fluid reservoir 504 can be positioned above or to the side of the expandable member 502.

Referring to FIG. 5B, the system 500 further includes an actuation mechanism 508 for controlling fluid flow between the expandable member 502 and the fluid reservoir 504. The actuation mechanism 508 can be coupled to the fluid reservoir 504. In the illustrated embodiment, the actuation mechanism includes a first shape memory element 510a, a second shape memory element 510b, and a third shape memory element 510c (collectively, shape memory elements 510). Each of the shape memory elements 510 can be coupled to a support 512 (e.g., an anchoring plate). In some embodiments, the support 512 may be on the opposing side of the septal wall (e.g., on an LA side) than the reservoir 504. In other embodiments, the support 512 may be omitted and the septal wall or another tissue structure may be functionally utilized as a support structure. Although FIG. 5B illustrates three shape memory elements 510a-c, in other embodiments the actuation mechanism 508 can include a different number of shape memory elements (e.g., one, two, four, five, or more).

The shape memory elements 510 can include wires, struts, or other elongated structures extending across the fluid reservoir 504. In some embodiments, the fluid reservoir 504 includes a first end portion 505a away from the connecting structure 506 and a second end portion 505b coupled to the connecting structure 506. The shape memory elements 510 are arranged between the first end portion 505a and the second end portion 505b. For example, the first shape memory element 510a can be positioned near the first end portion 505a, the third shape memory element 510c can be positioned near the second end portion 505b, and the second shape memory element 510b can be positioned between the first shape memory element 510a and the third shape memory element 510c.

Referring to FIGS. 5C-5J together, the shape memory elements 510 of the actuation mechanism 508 can be individually actuated to drive fluid between the fluid reservoir 504 and expandable member 502. In some embodiments, the shape memory elements 510 are sequentially transformed into a more restrictive and/or tightened configuration (e.g., starting from the first shape memory element 510a and ending with the third shape memory element 510c) to progressively drive fluid out of the fluid reservoir 504 and into the expandable member 502. Conversely, the shape memory elements 510 can be sequentially transformed into a less restrictive and/or loosened configuration (e.g., starting from the third shape memory element 510c and ending with the first shape memory element 510a) to progressively drive fluid out of the expandable member 502 and into the fluid reservoir 504. In some embodiments, each shape memory element 510 can have one or more intermediate configurations between the tightened configuration and the loosened configuration to enable even more control over the amount of fluid being forced out of, or permitted to flow into, the fluid reservoir 504.

Figure 5C:
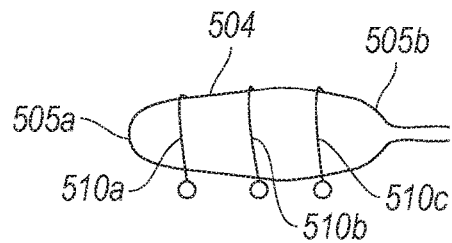
FIGS. 5C-5J illustrate the fluid reservoir, the actuation mechanism, and an expandable member of the system of FIG. 5A at various stages of operation.
Figure 5E:
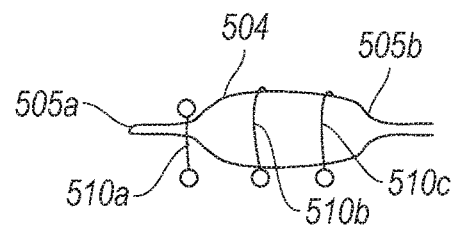
Figure 5D:
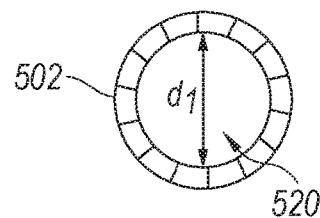

Referring to FIGS. 5C and 5D together, during an initial stage of operation, the shape memory elements 510 can be in a loosened configuration that applies little or no force to the fluid reservoir 504. Accordingly, the fluid reservoir 504 can initially be in a partially or fully filled configuration having a first reservoir volume. The expandable member 502 can initially be in a partially or fully unfilled configuration having a first member volume. The expandable member 502 can be positioned around a lumen 520 of a shunting element (not shown), such that lumen 520 has a first diameter di when the expandable member 502 has the first member volume. The first diameter di can be sufficiently large such that blood flows through the lumen 520 with little or no obstruction.

Figure 5F:
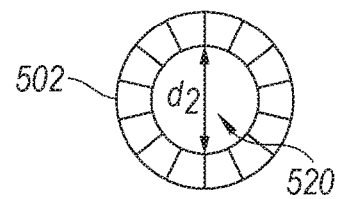

Referring to FIGS. 5E and 5F together, in a subsequent stage of operation, energy can be applied to the first shape memory element 510a (e.g., by heating) to cause the first shape memory element 510a to change geometry into a more restrictive and/or tightened configuration. When in the more restrictive and/or tightened configuration, the first shape memory element 510a can compress the first end portion 505a of the fluid reservoir 504, thereby driving at least some fluid toward the second end portion 505b and/or out of the fluid reservoir 504. At this stage of operation, the fluid reservoir 504 can be in a partially filled configuration having a second reservoir volume less than the first reservoir volume. The fluid from the fluid reservoir 504 can be driven into the expandable member 502, causing the expandable member 502 to assume a partially filled configuration having a second member volume greater than the first member volume. The filling of the expandable member 502 can shrink the lumen 520 to a second diameter $d_2$ smaller than the first diameter di, thus decreasing blood flow through the lumen 520.

Figure 5G:
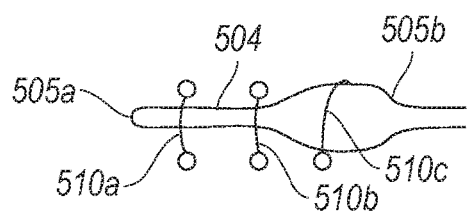

Referring to FIGS. 5G and 8H together, in a subsequent stage of operation, energy can be applied to the second shape memory element 510b to cause the second shape memory element 510b to change geometry into a more restrictive and/or tightened configuration. When in the more restrictive and/or tightened configuration, the second shape memory element 510a can further compress the fluid reservoir 504, thereby continuing to drive fluid toward the second end portion 505b and/or out of the fluid reservoir 504. At this stage of operation, the fluid reservoir 504 can be in a partially filled configuration having a third reservoir volume less than the second reservoir volume. The fluid from the fluid reservoir 504 can be driven into the expandable member 502, further filling the expandable member 502 to a partially filled configuration having a third member volume greater than the second member volume. The filling of the expandable member 502 can further shrink the lumen 520 to a third diameter $d_3$ smaller than the second diameter $d_2$, thus further decreasing blood flow through the lumen 520.

Figure 5I:
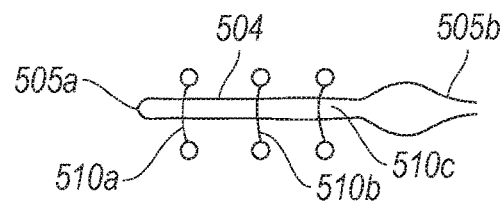
Figure 5H:
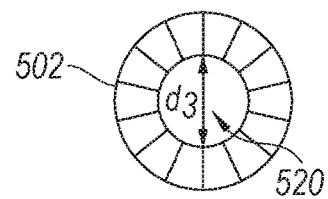
Figure 5J:
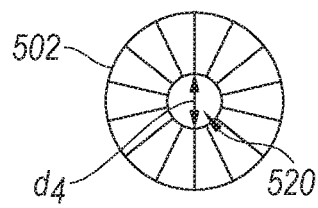

Referring to FIGS. 5I and 5J together, in a subsequent stage of operation, energy can be applied to the third shape memory element 510c to cause the third shape memory element 510c to change geometry into a more restrictive and/or tightened configuration. When in the more restrictive and/or tightened configuration, the third shape memory element 510c can compress the second end portion 505b of the fluid reservoir 504, thereby driving all or nearly all of the fluid out of the fluid reservoir 504. At this stage of operation, the fluid reservoir 504 can be in a partially or fully unfilled configuration having a fourth reservoir volume less than the third reservoir volume. The fluid from the fluid reservoir 504 can be driven into the expandable member 502, further filling the expandable member 502 to a partially or fully filled configuration having a fourth member volume greater than the third member volume. The filling of the expandable member 502 can further shrink the lumen 520 to a fourth diameter d4 smaller than the third diameter $d_3$, thus partially or fully obstructing blood flow through the lumen 520.

The operation described with respect to FIGS. 5C-5J can be reversed in order to introduce fluid back into the fluid reservoir 504. For instance, the third shape memory element 510c can be transformed back to the less restrictive and/or loosened configuration, followed by the second shape memory element 510b, and then the first shape memory element 510a. Accordingly, fluid can flow out of the expandable member 502 and into the fluid reservoir 504, causing the expandable member 502 to progressively decrease in volume while the fluid reservoir 504 progressively increases in volume. As a result, the diameter of the lumen 520 can gradually increase (e.g., from $d_4$ to $d_1$) to permit increased blood flow therethrough. In some embodiments, the system 500 may include one or more valves to assist with controlling the flow of fluid between the reservoir 504 and the expandable member 502.

The shape memory elements 510 can be actuated using various techniques. For example, the actuation mechanism 508 can include one or more additional shape memory elements (not shown) configured to counteract the shape memory elements 510, such that transformation of the additional shape memory elements into a more restrictive and/or tightened configuration causes the shape memory elements 510 to transform into a less restrictive and/or loosened configuration. As another example, a force (e.g., a pressure) can be applied to the shape memory elements 510 to cause them to revert to the less restrictive and/or loosened configuration.

Figures 6A, 6B:
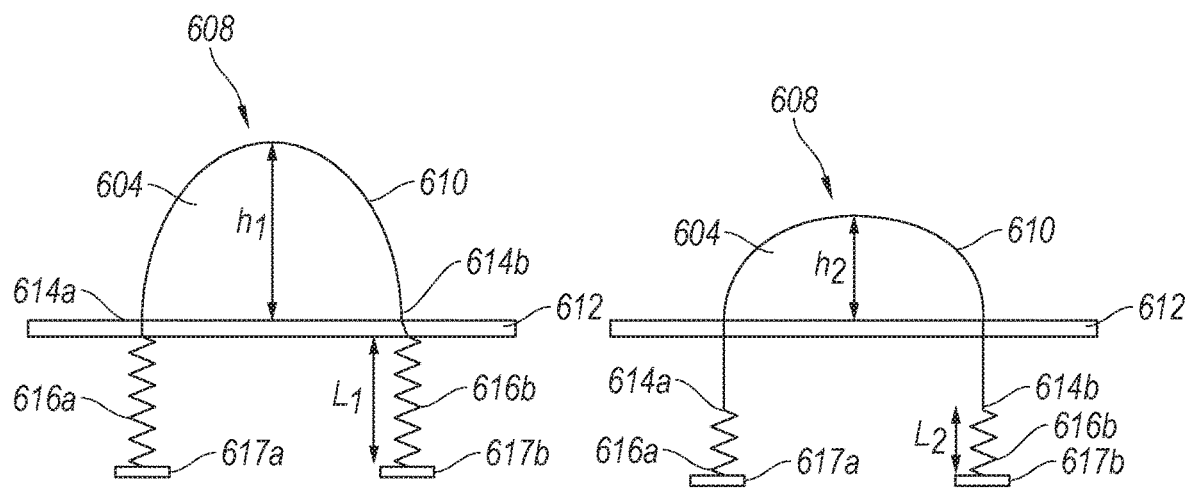
FIGS. 6A and 6B are side-cross-sectional views of a fluid reservoir and a shape memory-based actuation mechanism configured in accordance with another embodiment of the present technology.

FIGS. 6A-8D illustrate additional embodiments for controlling the transfer of fluid between a fluid reservoir and an expandable flow control element using a shape memory-based actuation mechanism. FIGS. 6A and 6B, for example, are side-cross-sectional views of a fluid reservoir 604 and a shape memory-based actuation mechanism 608 configured in accordance with another embodiment of the present technology. The fluid reservoir 604 and actuation mechanism 608 can be generally similar to the fluid reservoir 504 and actuation mechanism 508 described with respect to FIGS. 5A-5J. For example, the actuation mechanism 608 can include a plurality of elongated elements 610 (e.g., struts, wires, etc.—a single elongated element 610 is shown in FIGS. 6A-6B merely for purposes of clarity) coupled to a support 612. The fluid reservoir 604 can be positioned between the elongated elements 610 and the support 612.

In some embodiments, each elongated element 610 includes a first end portion 614a coupled to a first shape memory element 616a (e.g., a wire, spring, coil, etc.) and a second end portion 614b coupled to a second shape memory element 616b (e.g., a second wire, spring, coil, etc.). The first and second shape memory elements 616a-b can be positioned beneath the support 612. Distal end portions of the first and second shape memory elements 616a-b can be secured to second support structures or anchors 617a-b. The anchors 617a-b generally do not move during actuation of the actuation mechanism 608. Referring to FIG. 6A, during an initial stage of operation, the first and second shape memory elements 616a-b can each be in a lengthened configuration having a first length $L_1$. The elongated element 610 can be positioned around the fluid reservoir 604 with a first height hi above the support 612. The height hi can be sufficiently large such that little or no force is applied to the fluid reservoir 604 by the elongated element 610.

Referring to FIG. 6B, during a subsequent stage of operation energy can be applied to the first and/or second shape memory elements 616a-b (e.g., by heating) to transform the first and/or second shape memory elements 616a-b to a shortened configuration having a second, shorter length $L_2$. The shape change of the first and/or second shape memory elements 616a-b can pull the elongated element 610 down toward and/or through the support 612, thereby reducing the height of the elongated element 610 above the support 612 to a second, shorter height hz. As a result, the elongated element 610 can compress and drive fluid out of the fluid reservoir 604. To allow fluid to re-enter the fluid reservoir 604, the first and/or second shape memory elements 616a-b can be transformed back to the first length $L_1$, e.g., by applying a counteracting force.

In some embodiments, the elongated element 610 maintains a constant length, and actuation is based primarily on the shape change of the of the first and/or second shape memory elements 616a-b. In such embodiments, the elongated element 610 can be a non-shape memory material. Alternatively, the elongated element 610 can be a shape memory material, but no energy is applied to the elongated element 610 during operation of the actuation mechanism 608. In other embodiments, energy can also be applied to the elongated element 610, such that the elongated element 610 and the first and/or second shape memory elements 616a-b transform in concert to drive fluid into and/or out of the fluid reservoir 604.

The configuration of the actuation mechanism 608 can be varied as desired. For example, although FIGS. 6A and 6B illustrate a symmetric configuration in which both end portions 614a-b of the elongated element 610 are coupled to a respective shape memory element 616a-b, in other embodiments, the actuation mechanism 608 can have an asymmetric configuration in which only one end portion of the elongated element 610 is coupled to a shape memory element. In such embodiments, the other end portion can be coupled to the support 612.

Figures 7A, 7B:
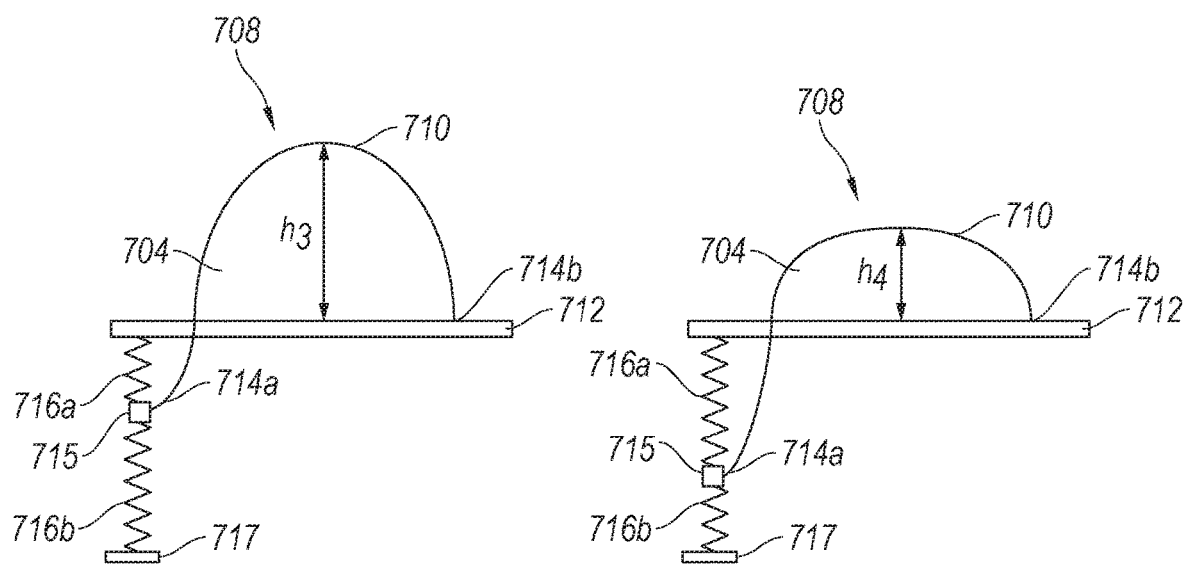
FIGS. 7A and 7B are side-cross-sectional views of another fluid reservoir and shape memory-based actuation mechanism configured in accordance with a further embodiment of the present technology.

FIGS. 7A and 7B are side-cross-sectional views of another fluid reservoir 704 and shape memory-based actuation mechanism 708 configured in accordance with a further embodiment of the present technology. The fluid reservoir 704 and actuation mechanism 708 can be generally similar to the corresponding components described with respect to FIGS. 5A-5J and FIGS. 6A-6B. For example, the actuation mechanism 708 can include a plurality of elongated elements 710 (e.g., struts, wires, etc.—a single elongated element 710 is shown in FIGS. 7A-7B for clarity) coupled to a support 712. The fluid reservoir 704 can be positioned between the elongated elements 710 and the support 712.

In some embodiments, each elongated element 710 includes a first end portion 714a extending through the support 712, and a second end portion 714b coupled to the support 712. The first end portion 714a can be coupled to an attachment point 715 located beneath the support 712. A first shape memory element 716a (e.g., a wire, spring, coil, etc.) can be coupled between the attachment point 715 and the lower surface of the support 712. A second shape memory element 716b (e.g., a wire, spring, coil, etc.) can be coupled beneath the attachment point 715. In some embodiments, the other end portion of the second shape memory element 716b can be coupled to a second support structure or anchor 717. The second support structure 717 generally does not move during actuation of the actuation mechanism 708. The first and second shape memory elements 716a-b can be configured to counteract each other, such that transformation of the first shape memory element 716a into a shortened configuration applies a force that transforms the second shape memory element 716b into a lengthened configuration, and vice-versa.

Referring to FIG. 7A, during an initial stage of operation, the first shape memory element 716a can be in a shortened configuration, while the second shape memory element 716b can be in a lengthened configuration. The elongated element 710 can be positioned around the fluid reservoir 704 with a first height $h_3$ above the support 712. The height $h_3$ can be sufficiently large such that little or no force is applied to the fluid reservoir 704 by the elongated element 710.

Referring to FIG. 7B, during a subsequent stage of operation, energy can be applied to the second shape memory element 716b (e.g., by heating) to cause the second shape memory element 716b to transform from the lengthened configuration to a shortened configuration. The shortening of the second shape memory element 716b can apply a force that stretches the first shape memory element 716a from the shortened configuration to a lengthened configuration. As a result, the attachment point 715 can be displaced downwards, causing the elongated element 710 to be pulled further toward and/or through the support 712 to a second, shorter height $h_4$. As a result, the elongated element 710 can compress and drive fluid out of the fluid reservoir 704.

To allow fluid to re-enter the fluid reservoir 704, energy (e.g., heat) can be applied to the first shape memory element 716a to transform it back to the shortened configuration. The shortening of the first shape memory element 716a can apply a force that stretches the second memory element 716b back to the lengthened configuration. As a result, the attachment point 715 can be displaced upwards, pushing the elongated element 710 toward and/or through the support 712 back to the first height $h_3$. In some embodiments, the attachment point 715 can be displaced to one or more intermediate positions by heating only a portion of the first shape memory element 716a and/or the second shape memory element 716b.

In some embodiments, the elongated element 710 maintains a constant length, and actuation is based primarily on the shape change of the of the first and second shape memory elements 716a-b. In such embodiments, the elongated element 710 can be a non-shape memory material. Alternatively, the elongated element 710 can be a shape memory material, but no energy is applied to the elongated element 710 during operation of the actuation mechanism 708. In other embodiments, energy can also be applied to the elongated element 710, such that the elongated element 710, the first shape memory element 716a, and second shape memory element 716b each transform in concert to drive fluid into and/or out of the fluid reservoir 704.

The configuration of the actuation mechanism 708 can be varied as desired. For example, although the embodiment of FIGS. 7A and 7B illustrates a single end portion 714a of the elongated element 710 being coupled to the first and second shape memory elements 716a-b, in other embodiments, both end portions 714a-b can be coupled to respective shape memory elements. In such embodiments, heating can be applied to the shape memory elements at both end portions 714a-b of the elongated element 710 to control the positioning of the elongated element 710 relative to the support 712.

Figure 8A:
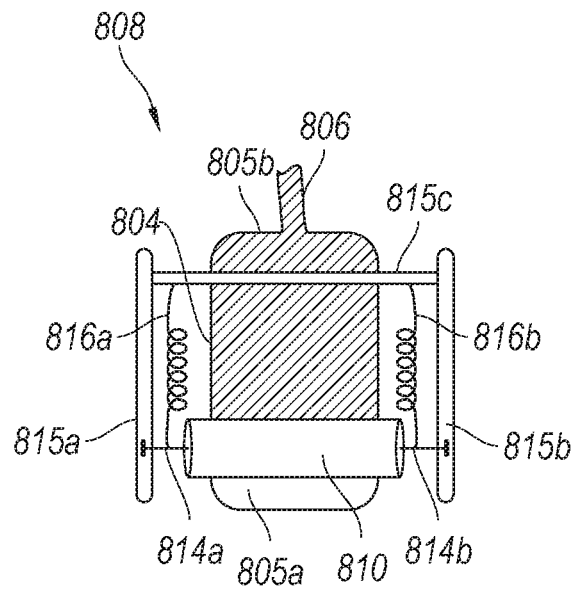
FIGS. 8A and 8B are a top view and side cross-sectional view, respectively, of a fluid reservoir and a shape memory-based actuation mechanism configured in accordance with an embodiment of the present technology.
Figure 8B:
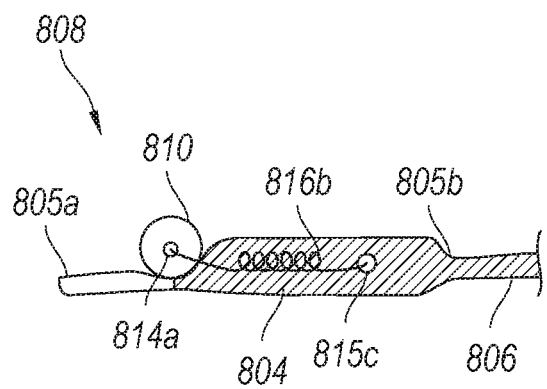
Figure 8C:
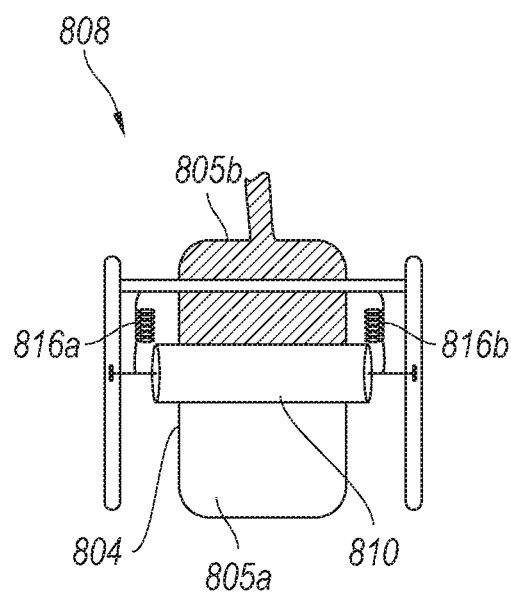
FIGS. 8C and 8D are a top view and side cross-sectional view, respectively, of the of the fluid reservoir and the actuation mechanism of FIGS. 8A and 8B during a subsequent stage of operation.
Figure 8D:
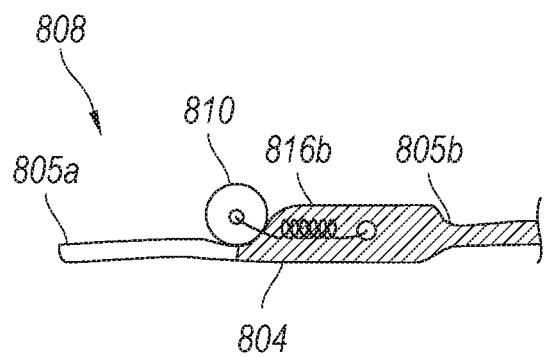

FIGS. 8A-8D illustrates a fluid reservoir 804 and shape memory-based actuation mechanism 808 configured in accordance with still another embodiment of the present technology. More specifically, FIGS. 8A and 8B are a top view and side cross-sectional view, respectively, of the fluid reservoir 804 and actuation mechanism 808 during an initial stage of operation, and FIGS. 8C and 8D are a top view and side cross-sectional view, respectively, of the of the fluid reservoir 804 and actuation mechanism 808 during a subsequent stage of operation.

Referring to FIGS. 8A and 8B together, the fluid reservoir 804 is connected to an expandable member (not shown) via a connecting structure 806 (e.g., a tube). The fluid reservoir 804 includes a first end portion 805a away from the connecting structure 806 and a second end portion 805b coupled to the connecting structure. The actuation mechanism 808 includes a rod 810 positioned over a portion of the fluid reservoir 804. The rod 810 can be moved (e.g., rolled, dragged, etc.) over the fluid reservoir (e.g., from the first end portion 805a towards the second end portion 805b, or vice-versa) to move fluid out of the fluid reservoir 804 or to allow fluid to return to the fluid reservoir 804.

The actuation mechanism 808 can further include a support structure coupled to the rod 810. For example, a first end portion 814a of the rod 810 can be coupled to a first support member 815a and a second end portion 814b of the rod 810 can be coupled to a second support member 815b. The first and second support members 815a-b can be elongated structures (e.g., rails) extending along the longitudinal axis of the fluid reservoir 804. The first and second support members 815a-b can be coupled to a third support member 815c (e.g., a cross-bar) positioned at the second end portion 805b of the fluid reservoir 804. In some embodiments, the first and second support members 815a-b include grooves, channels, tracks, etc. that slidably receive the corresponding end portions 814a-b of the rod 810. As a result, the rod 810 can slide along the longitudinal axis of the fluid reservoir 804 toward the third support member 815c.

The actuation mechanism 808 can further include one or more shape memory elements for driving movement of the rod 810 along the fluid reservoir 804. In some embodiments, the actuation mechanism 808 includes a first shape memory element 816a and a second shape memory element 816b (e.g., wires, coils, springs, etc.) coupled between the rod 810 and the third support member 815c. The shape memory elements 816a-b can counteract each other, such that application of energy to one shape memory element pulls the rod 810 toward the second end portion 805b of the fluid reservoir 804, and application of energy to the other shape memory element pushes the rod 810 toward the first end portion 805a of the fluid reservoir 804.

In the illustrated embodiment, the first shape memory element 816a is coupled to the first end portion 814a of the rod 810 and the second shape memory element 816b is coupled to the second end portion 814b of the rod 810. In some embodiments, the first shape memory element 816a is made of a material that transforms to a shortened configuration when energy is applied, and the second shape memory element 816b is made of a material that transforms to a lengthened configuration when energy is applied. In other embodiments, this configuration can be reversed, such that the first shape memory element 816a transformed to a lengthened configuration when energy is applied, and the second shape memory element 816b transforms to a shortened configuration when energy is applied.

As shown in FIGS. 8A and 8B, during an initial stage of operation, the first and second shape memory elements 816a-b can each be in a lengthened configuration having a first length. When the first and second shape memory elements 816a-b are in the lengthened configuration, the rod 810 can be positioned over the first end portion 805a of the fluid reservoir 804. As a result, the fluid reservoir 804 can be partially or fully filled with fluid.

Referring to FIGS. 8C and 8D, during a subsequent stage of operation energy can be applied to the first shape memory element 816a (e.g., by heating) to transform it to a shortened configuration with a second, shorter length. The shortening of the first shape memory element 816a can apply a force to the rod 810 that pulls it toward the second end portion 805b of the fluid reservoir 804. As the rod 810 moves toward the second end portion 805b, it progressively compresses the fluid reservoir 804, thus pushing fluid out of the fluid reservoir 804 and into an expandable member (not shown). The force can also compress the second shape memory element 816b to a shortened configuration.

To allow fluid to re-enter the fluid reservoir 804, energy can be applied to the second shape memory element 816b to transform it back toward the lengthened configuration. The lengthening of the second shape memory element 816b can apply a force to the rod 810 that pushes it away from the second end portion 805b of the fluid reservoir 804 and toward the first end portion 805a, thereby decompressing the fluid reservoir 804 and allowing fluid to flow from the expandable member into the fluid reservoir 804. The force can also stretch the first shape memory element 816a back to the lengthened configuration.

The configuration of the actuation mechanism 808 can be varied as desired. For example, although the illustrated embodiment shows an asymmetric configuration, in which the first shape memory element 816a transforms to a shortened configuration when energy is applied and the second shape memory element 816b transforms to a lengthened configuration when energy is applied, in other embodiments, a symmetric configuration can be used. In such embodiments, each end portion 814a-b of the rod 810 can be coupled to a pair of shape memory elements—one shape memory element that transforms to a shortened configuration when energy is applied, and one shape memory element that transforms to a lengthened configuration when energy is applied. Thus, the rod 810 can be pushed or pulled by selectively applying energy to the appropriate shape memory element at each end portion 814a-b.

Figures 9A, 9B:
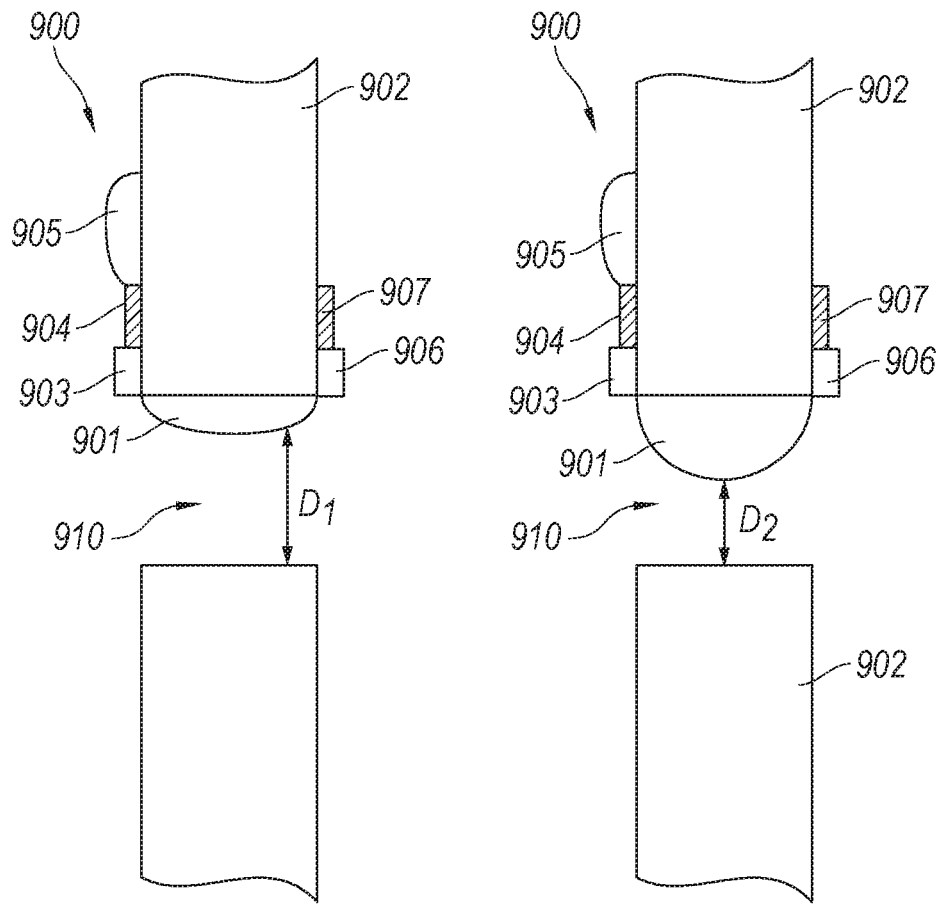
FIGS. 9A and 9B illustrate another adjustable interatrial shunting system having an expandable flow control element and configured in accordance with select embodiments of the present technology.

FIGS. 9A and 9B illustrate an adjustable interatrial system 900 ("system 900") having an expandable flow control element 901 and configured in accordance with another embodiment of the present technology. More specifically, FIG. 9A is a cross-sectional view of the system 900 implanted across a patient's septal wall during a first stage of operation (e.g., when the flow control element 901 is in a generally deflated state), and FIG. 9B is a cross-sectional view of the system 900 implanted across a patient's septal wall during a second stage of operation (e.g., when the flow control element 901 is in a generally inflated state).

Referring to FIGS. 9A and 9B together, a clinician can make a transseptal puncture through the septal wall 902 to form a septal opening 910 that fluidly connects the LA and the RA. For example, in some embodiments the healthcare practitioner may create a septal opening 910 that is between about 5mm to 15mm in diameter. In some embodiments, a support mechanism (not shown), such as a metal or bioabsorbable stent or frame, may be inserted into and/or across the septal opening 910 to prevent the septal opening 910 from closing. In addition to, or in lieu of, the support mechanism, the tissue surrounding the septal opening 910 can be treated with energy (e.g., radiofrequency energy) to minimize regrowth of tissue. Various components of the system 900, such as the flow control element 901, can be positioned within and/or adjacent the septal opening (and/or within and/or adjacent the support mechanism).

As described above, the flow control element 901 can be positioned within the septal opening 910 (e.g., within the support mechanism). In the illustrated embodiment, the flow control element 901 is biased toward a superior aspect of the septal opening 910, although in other embodiments the flow control element 901 can be biased toward an inferior aspect of the septal opening 910, or can be toroid-shaped such that it extends circumferentially around the septal opening 910. The flow control element 901 can be an expandable member such as a compliant balloon comprised of latex, silicone, nylon, or another similar material. The system 900 can also include an actuation mechanism 903, one or more LA anchors 904, and a fluid reservoir 905 positioned on an LA side of the septal opening, and one or more pressure sensors 906 and one or more RA anchors 907 positioned on a RA side of the septal opening. As one skilled in the art will appreciate, the various components of system 900 can be positioned in other locations than those explicitly described herein. The system 900 can also contain other hardware features, for example a battery or other power source, battery recharging hardware and circuitry, a data communication means, on-board memory, and other appropriate components.

As with the other expandable flow control mechanisms described herein, the system 900 can adjust the flow resistance through the septal opening by transferring fluid between the fluid reservoir 905 and the flow control element 901 to change a geometry of the flow control element 901. Referring to FIG. 9A, the flow control element 901 is shown in a first (e.g., generally uninflated) geometry or state in which it only partially occludes the septal opening and creates an effective minimal diameter of D1 though the septal opening. FIG. 9B illustrates the flow control element 901 in a second (e.g., generally inflated) geometry or state in which it occludes the septal opening to a greater extent than in the first geometry, thereby creating an effective minimal diameter of D2 that is less than the diameter D1. Accordingly, the flow resistance through the septal opening is greater when the flow control element 901 is in the second geometry. Although only illustrated as having two geometries, the flow control element 901 can transition between a number of intermediate geometries between the first geometry and the second geometry.

Fluid can be transferred between the flow control element 901 and the fluid reservoir 905 via operation of the actuation mechanism 903. The actuation mechanism 903 can be a pumping mechanism, a shape-memory mechanism, or another suitable mechanism for permitting and or driving fluid flow between the flow control element 901 and the fluid reservoir 905, such as any of those described previously with reference to FIGS. 2A-8D. In an example mode of operation, the system 900 may have base configuration similar to that shown in FIG. 9B, with the flow control element 901 enlarged such that the minimal opening diameter is D2. In response to an input (e.g., an input corresponding to pressure sensor 906 measuring a left atrial pressure that exceeds a pre-determined value, remains elevated over pre-determined value for a pre-set period of time, or changes by a pre-determined amount over a pre-set period of time, or an input from a healthcare practitioner), on-board electronics can instruct the actuation mechanism 903 to initiate a transfer of fluid or gas from the flow control element 901 to the fluid reservoir 905, thus reducing the volume of the flow control element 901, such as shown in FIG. 9A. This widens the effective diameter of the septal opening 910 and may permit greater flow between heart chambers, and thus may more effectively unload the LA. Based on readings from the pressure sensor 906, based on readings from other sensors, after a set period of time, or based on another criteria, the actuation mechanism 903 may reverse the filling states of the flow control element 901 and the fluid reservoir 905 and return the system to its base configuration. In variation embodiments, the flow control element 901 may operate in a continuum of inflation states and sizes to create a spectrum of possible septal opening diameters.

Figure 10A:
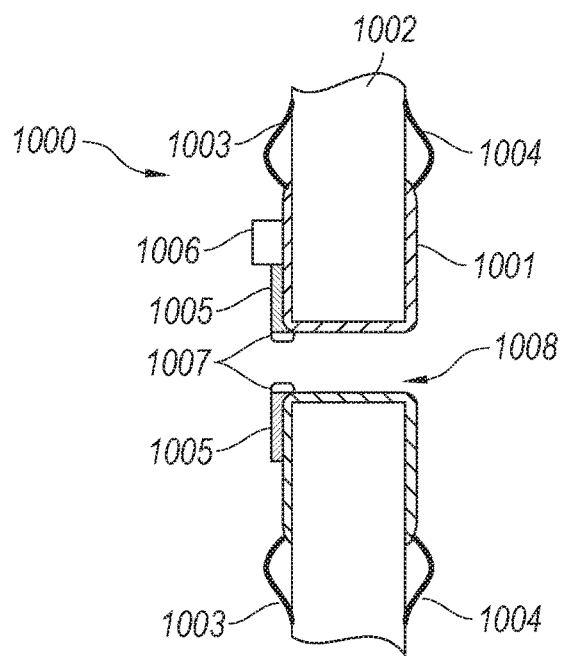
FIGS. 10A-10C illustrate an adjustable interatrial shunting system having an expandable flow control element positioned external to a lumen and configured in accordance with select embodiments of the present technology.
Figure 10B:
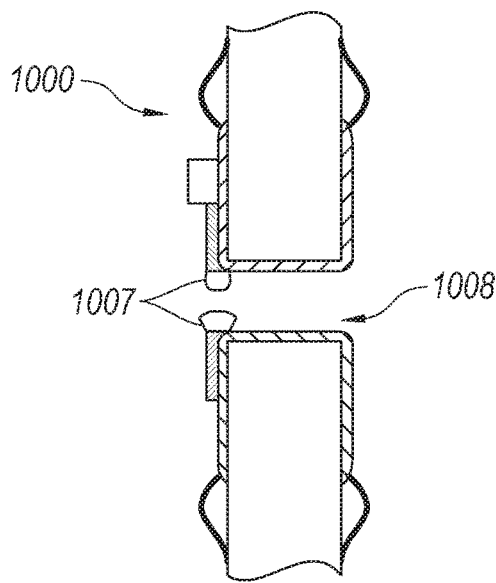
Figure 10C:
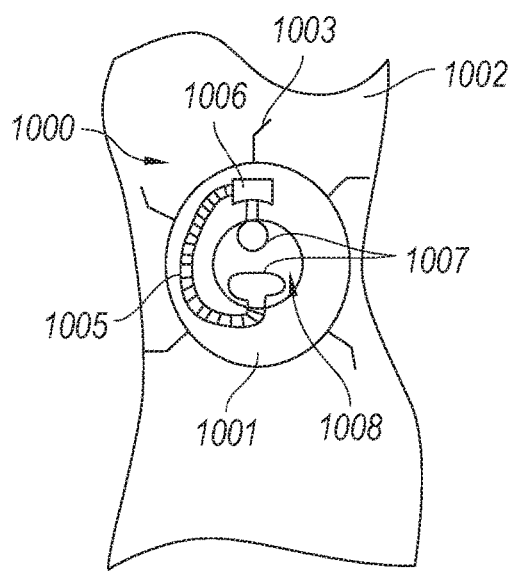

FIGS. 10A-10C illustrate an adjustable interatrial system 1000 ("system 1000") having one or more flow control elements 1007 and configured in accordance with embodiments of the present technology. FIG. 10A is a cross-sectional view of the system 1000 implanted across a patient's septal wall during a first stage of operation (e.g., when the flow control elements 1007 are in a generally deflated state), FIG. 10B is a cross-sectional view of the system 1000 implanted across a patient's septal wall during a second stage of operation (e.g., when the flow control elements 1007 are in a generally inflated state), and FIG. 10C is a front view of the system 1000 during the second stage of operation shown in FIG. 10B. The system 1000 can include a shunting element 1001 having a lumen 1008 extending therethrough, first (e.g., RA-side) anchors 1003, second (e.g., LA-side) anchors 1004, one or more fluid reservoirs 1006, the one or more expandable flow control elements 1007, and one or more conduits 1005 connecting the fluid reservoir 1006 and the one or more expandable flow control elements 1007. The system 1000 may also include an actuation mechanism (not shown) for transferring fluid between the fluid reservoir(s) 706 and the expandable flow control element(s) 1007. The system 1000 can operate in a similar manner to those previously described, in which the fluid is transferred between the fluid reservoir(s) 1006 and the expandable flow control element(s) 1007 to change a volume of the expandable flow control element(s) 1007 and affect the flow resistance through the lumen 1008. Relative to system 900, however, the flow control elements(s) 1007 of the system 1000 are positioned external to the septal opening/lumen 1008 shunting element 1001. Accordingly, during operation of the system 1000, the flow control elements(s) 1007 can block and/or unblock the lumen 1008, but do not change the diameter of the lumen 1008. As best illustrated in FIG. 10C, in some embodiments there are two flow control elements 1007 having different shapes when inflated. In other embodiments, there are two flow control elements 1007 having generally the same shape when inflated. In yet other embodiments, there is a single flow control element 1007 that is toroid-shaped.

D. ADDITIONAL EMBODIMENTS OF ADJUSTABLE INTERATRIAL SHUNTING SYSTEMS

Figure 11A:
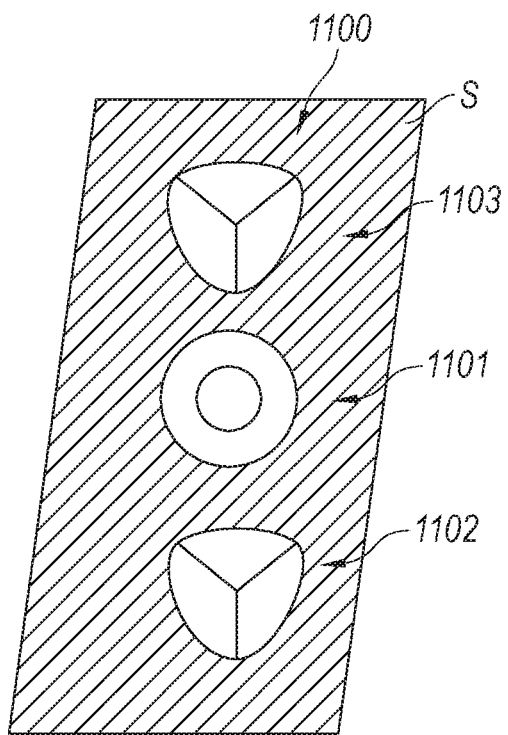
FIGS. 11A-11C illustrate an interatrial shunting system having a shunting element and two interatrial valves and configured in accordance with select embodiments of the present technology.
Figure 11B:
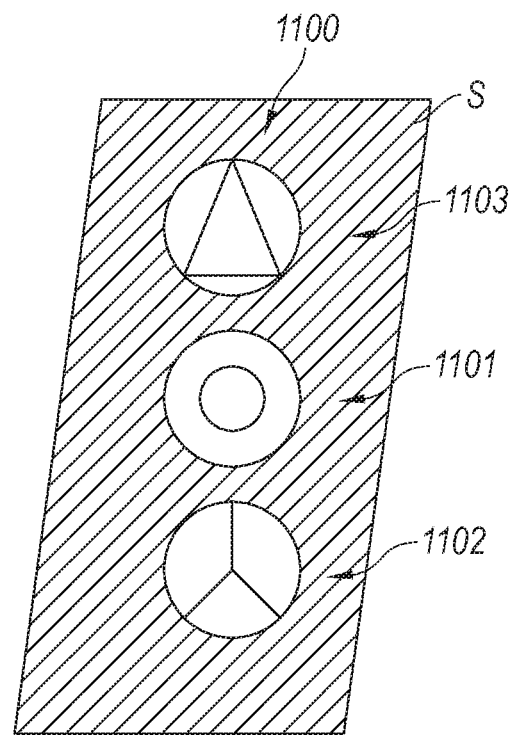
Figure 11C:
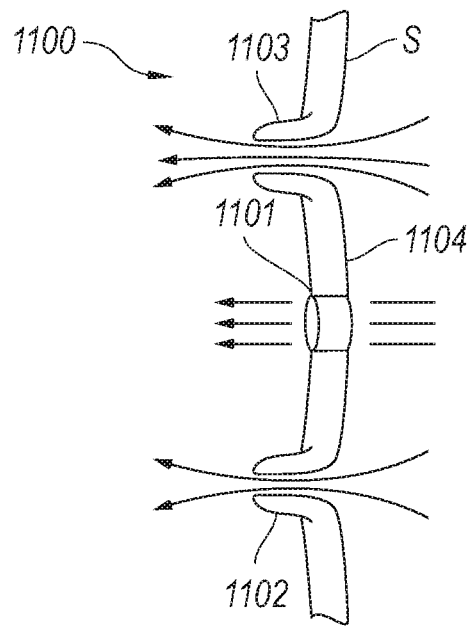

FIGS. 11A-11C illustrate a passive interatrial shunting system 1100 ("system 1100") configured in accordance with further embodiments of the present technology. More specifically, FIGS. 11A and 11B illustrate the system 1100 as viewed from inside the RA, looking at the septal wall S, and FIG. 11C is a side view of the system 1100. Referring to FIGS. 11A-11C together, the system 1100 includes a shunting element 1101 positioned centrally between a first flap or valve 1102 and a second flap or valve 1103. Although illustrated as having a generally vertical orientation, the shunting element 1101, the first valve 1102, and the second valve 1103 can have any suitable orientation, such as horizontal, triangular, or the like. In some embodiments, the first valve 1102 is a different size and/or shape than the second valve 1103 (e.g., the first valve 1102 has a smaller diameter than the second valve 1103), although in other embodiments the first valve 1102 and the second valve 1103 have the same size and/or shape. The first valve 1102 and the second valve 1103 can be formed from native tissue, as described below, or can include one or more implantable structural components. Because the first valve 1102 and the second valve 1103 aid in the control of the flow of blood between the LA and the RA, the first valve 1102 and the second valve 1103 can also be referred to as a first flow control element and a second flow control element, respectively.

As shown, the shunting element 1101 can be anchored across the septal wall S and have a lumen that is continuously open, thus keeping the LA and the RA in continuous fluid communication. The first valve 1102 and the second valve 1103 can transition between fully open and fully closed positions, as well as intermediate positions between fully open and fully closed, to change the degree of fluid communication between the LA and the RA. In FIG. 11A, for example, the first valve 1102 and the second valve 1103 are in a closed positioned. In FIG. 11B, the first valve 1102 is in a closed position, but the second valve 1103 is in an open position, fluidly connecting the LA and the RA. In yet other stages of operation, such as shown in FIG. 11C, both the first valve 1102 and the second valve 1103 are open.

The first valve 1102 and the second valve 1103 can open and/or close based at least partially upon a pressure differential between the LA and the RA. For example, when the pressure differential between the LA and the RA is below a first (e.g., predetermined) threshold (e.g., below 5 mmHg, 10 mmHg, 15 mmHg, etc.), both the first valve 1102 and the second valve 1103 remain closed. As the pressure differential between the LA and the RA increases above the first threshold, the second valve 1103 may open while the first valve 1102 remains closed. As the pressure differential between the LA and the RA continuous to increase above a second (e.g., predetermined) threshold greater than the first threshold, the first valve 1102 may also open such that both the first valve 1102 and the second valve 1103 are open. If the pressure differential between the LA and the RA drops below the second threshold, the first valve 1102 can once again close such that the first valve 1102 is closed while the second valve 1103 is open. If the pressure differential drops below the first threshold, the second valve 1103 also closes such that both the first valve 1102 and the second valve 1103 are closed, leaving the lumen of the shunting element 1101 as the only means of fluid passage from the LA to the RA.

Although described as having two valves, the system 1100 can have any number of suitable valves, such as one, three, four, five, six, or more. Without being bound by theory, increasing the number of valves in the septal wall S is expected to increase the granularity with which the system 1100 can unload the LA (e.g., by increasing the number of pressure differential thresholds at which an additional valve opens or closes). In some embodiments, the system 1100 can omit the shunting element 1101. In yet other embodiments, the shunting element 1101 can include one/or more flow control elements, such as described elsewhere herein.

The first valve 1102 and the second valve 1103 may be created through a number of methods. In one embodiment, for example, a method includes the following steps: (1) access the RA via a catheterization of a femoral or internal jugular vein, or another suitable vein; (2) via a guidewire or other tools well-known in the field of interventional cardiology, navigate a suitable cutting catheter and/or transseptal puncture tools to the RA; (3) as an optional step, use mechanical techniques or imaging techniques such as echocardiography or fluoroscopy to determine the thickness of the septal wall; (4) create a transseptal puncture using established techniques; (5) deploy the shunting element 1101, for example by traversing a delivering catheter through the transseptal puncture and into the LA, deploying a first portion of the shunting element 1101, retracting the delivery catheter back into the RA, and deploying a second portion of the shunting element 1101; (6) creating the valves, with or without the exchange of a shunt delivery catheter for a cutting catheter, by using a cutting catheter applied to the septal wall S in locations proximate to the location of the shunting element 1101.

Figure 12A:
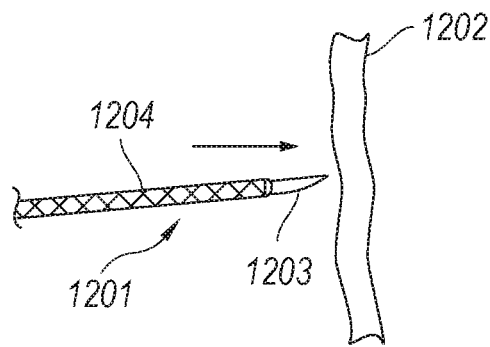
FIGS. 12A-12C are a schematic illustration of an exemplary workflow for creating interatrial valves in a septal wall in accordance with select embodiments of the present technology.
Figure 12B:
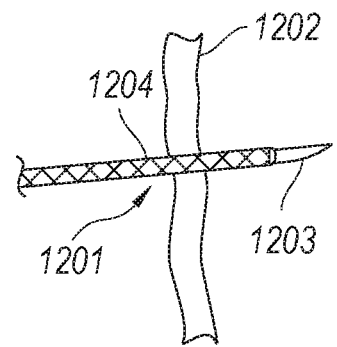
Figure 12C:
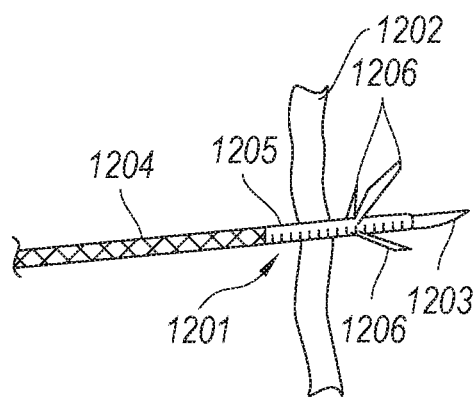
Figure 12D:
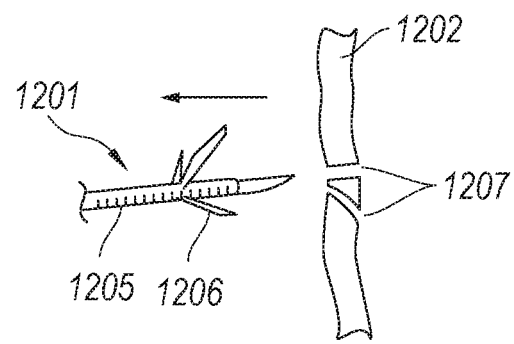

FIGS. 12A-12D illustrate an embodiment of a cutting catheter 1201 along with a method of use in accordance with select embodiments of the present technology. The catheter 1200 can be used to form the first valve 1102 and the second valve 1103 described with respect to FIGS. 11A-11C. Referring first to FIG. 12A, the cutting catheter 1201 is shown proximate to the septal wall 1202. The body of the catheter 1201 is covered with a sheath 1204, leaving only the distal cutting portion 1203 exposed. In FIG. 12B, the distal cutting tip 1203 of catheter 1201 has been used to create a transseptal puncture through the septal wall 1202 (e.g., in the RA to LA direction), and portions of the catheter 1201 are located in both the LA and the RA. The sheath 1204 remains fully-deployed. In FIG. 12C, the distal tip of catheter 1201 remains in the LA, but the sheath 1204 has been retracted, exposing both the catheter body 1205 and cutting elements 1206. The cutting elements 1206 are preferably at least partially constructed of a superelastic material such as nitinol such that when the sheath 1204 is retracted, they self-expand into an open configuration similar to that shown in FIG. 12C. In some embodiments, cutting elements 1206 will have support structures (not shown) to provide positional stability when they are extended in an unsheathed state. In these implementations, the support structures may be comprised of nitinol or a similar superelastic material and the cutting surfaces may be composed of a material such as titanium with a relatively higher tensile strength. In some embodiments, the cutting elements 1206 may be locked into place in an open configuration, for example by manipulating a dial or control feature on the handle of the catheter 1201 to induce a mechanical change that prevents the cutting surfaces and/or support structures from collapsing into the plane of the catheter 1201. Following the performance of a cutting operation, the cutting elements 1206 may then be unlocked to allow them once again to collapse when desired. In FIG. 12D, the cutting catheter 1201 has been withdrawn and is now entirely within the RA. As it has been withdrawn, the cutting tip 1203 and cutting elements 1206 have left several slices or holes 1207 in the septal wall: the central hole where the original puncture was taken via the cutting tip 1203, and the auxiliary slices created by the cutting elements 1206 that create the leaflet portions of the valves. In some embodiments, the methods described herein may contain additional steps; for example, dilation balloons or dilation catheters may be utilized (e.g., following transseptal puncture but prior to the catheter body crossing the septum) in some embodiments of the present technology.

Figure 13A:
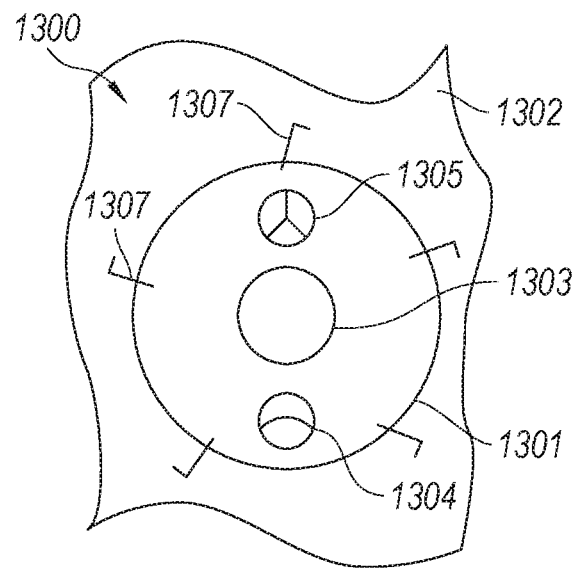
FIGS. 13A and 13B illustrate an interatrial shunting system with a central lumen and two valves and configured in accordance with select embodiments of the present technology.
Figure 13B:
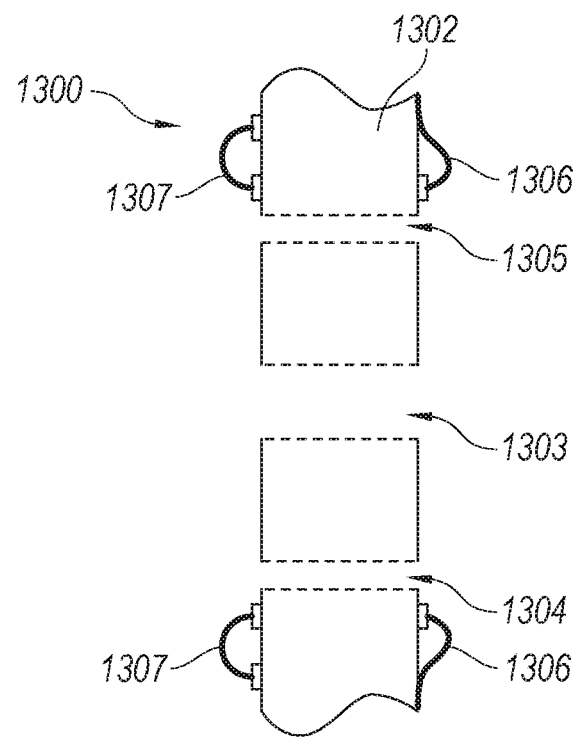

FIGS. 13A and 13B illustrate another interatrial shunting system 1300 ("system 1300") configured in accordance with embodiments of the present technology. In the illustrated embodiment, a single implantable component 1301 contains multiple potential conduits by which fluid communication may be established between the LA and the RA. As shown in FIG. 13A, the implant 1301 can be positioned in the septal wall 1302. The implantable component 1301 can include a central core lumen 1303, which may remain substantially and/or continuously open following implantation of the system 1300. The implantable component 1301 can also contain one or more supplementary valves, flaps, protrusions, or similar means of inter-chamber fluid communication. For example, in the illustrated embodiment, the implantable component 1301 includes two supplementary valves: a two-leaflet valve 1304 and a smaller three leaflet valve 1305 (valves in figure are not drawn to scale). In some embodiments, the supplementary valves are configured such that they open when a predetermined pressure gradient between the heart chambers has been reached. In some embodiments, the pressure differential required for the valves to open may be different for each of the valves (e.g., similar to the operation of the first valve 1102 and the second valve 1103 described with respect to FIGS. 11A-11C). As such, as left atrial pressure increases, the system 1300 may provide progressively more relief to the LA. In other embodiments, the supplementary means of inter-chamber fluid communication may be lumens with an adjustable shutter or iris instead of valves. As shown in FIG. 13B, which is a transverse view of the system 1300 following implantation into the septal wall 1302, the implantable component 1301 can include one or more anchoring mechanisms. For example, the implantable component 1301 can include first (e.g., LA) side anchors 1306 and second (e.g., RA) side anchors 1307. The anchors may be constructed of a flexible material such as nitinol or another suitable material to provide a mild pressure against the wall. The anchors may be similar in design, although in some embodiments it may be desirable for one set of anchors to be designed such that the implant may accommodate differences in septal wall thickness.

Figures 14A, 14B:
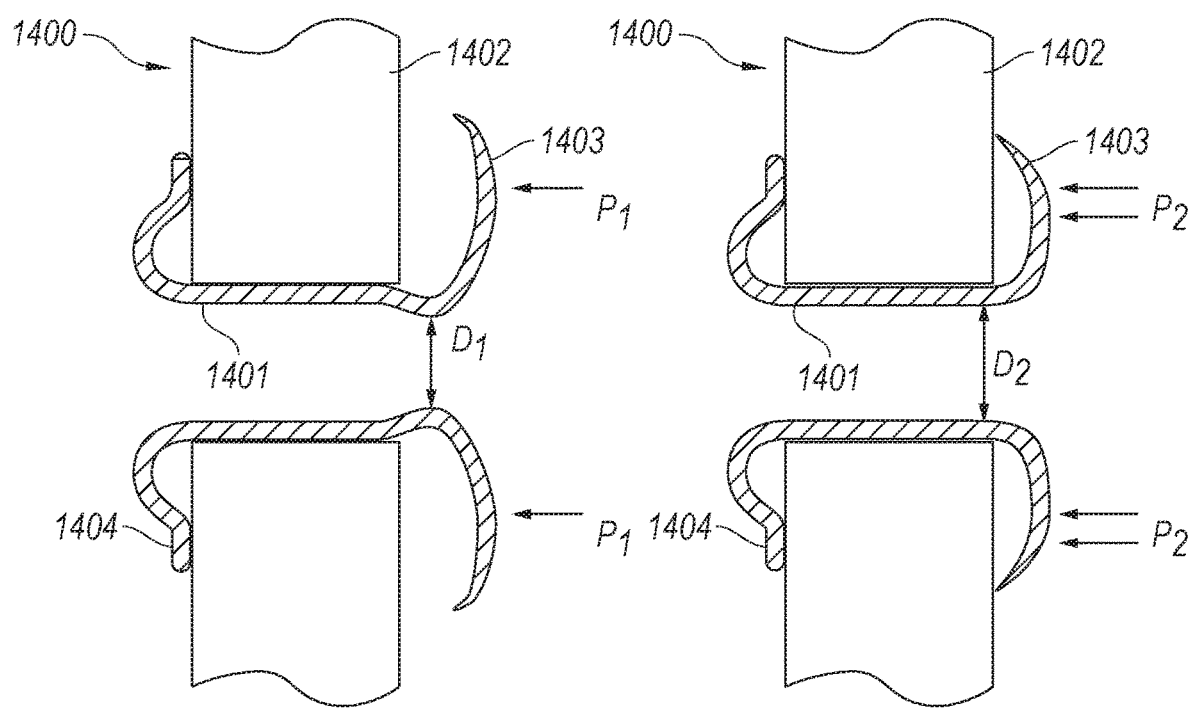
FIGS. 14A and 14B illustrate a passively adjustable interatrial shunting system configured in accordance with select embodiments of the present technology.

FIGS. 14A and 14B are cross-sectional views of an interatrial shunting system 1400 ("system 1400") after deployment into the septal wall and configured in accordance with embodiments of the present technology. The system 1400 includes a shunting element 1401, shown in FIGS. 14A and 14B as implanted across the septal wall 1402. When implanted, the shunting element 1401 defines a lumen extending between and fluidly connecting a RA and a LA. First (e.g. RA) anchors 1404 extend from a first end portion of the shunting element 1401 and can interface with the septal wall 1402 of the RA to stabilize the position of the shunting element 1401. The shunting element 1401 may at least partially narrow towards a second end portion (e.g., the end portion adjacent and/or within the LA), having a minimum lumen diameter noted as D1 in FIG. 14A. Second (e.g., LA) anchors 1403 can be curved and composed of an at least partially flexible material. In some embodiments, further anchoring mechanisms (not shown) may be present between the second anchors 1403 and the septal wall 1402 on the LA side. The shunting element 1401 can adjust a size of the lumen at the second end portion of the shunting element 1401 based on a pressure or a pressure differential. For example, when a pressure in the LA is below a predetermined threshold (e.g., when the mean pressure in the LA is P1), the second anchors 1403 can remain offset from the septal wall 1402 and as such restrict the minimum lumen diameter to D1 (FIG. 14A). When a pressure differential in the LA increases above the predetermined threshold (e.g., when the mean pressure in the LA is P2), the increased pressure forces the second anchors 1403 to move closer to the septal wall (FIG. 5B), which widens the lumen to a new minimal diameter of D2, where D2>D1. The operation can be reversed if the LA pressure falls below the predetermined threshold.

Figures 15A, 15B:
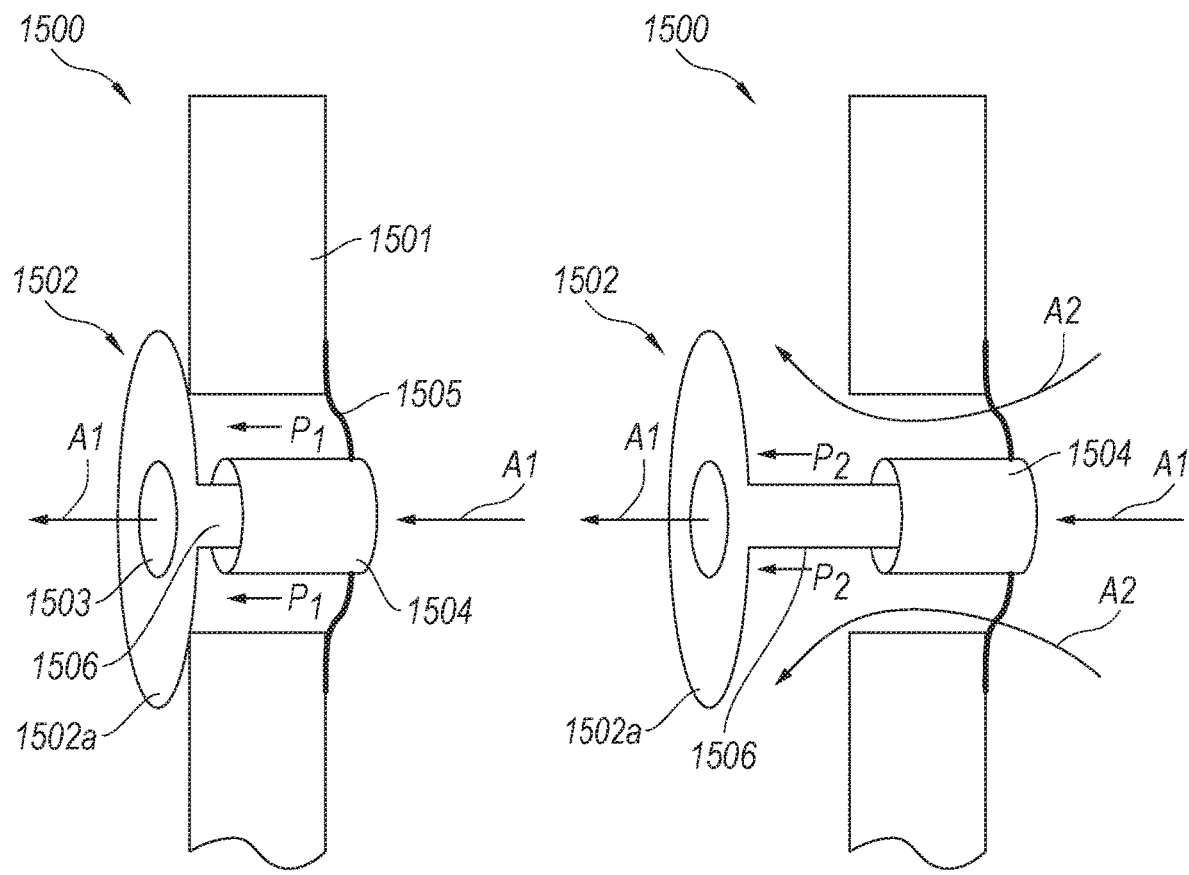
FIGS. 15A and 15B illustrate another passively adjustable interatrial shunting system with a sliding element and configured in accordance with select embodiments of the present technology.

FIGS. 15A and 15B are partially schematic, cross-sectional views of an interatrial shunting system 1500 ("system 1500") configured in accordance with additional embodiments of the present technology. FIG. 15A, for example, shows a transverse view of the system 1500 that has been implanted across the septal wall 1501. The system 1500 can include multiple components. On the RA side, for example, the system 1500 includes a sliding element 1502 (e.g., a flow control element), which includes a central lumen 1503 extending therethrough. The sliding element 1502 can include a light-weight annular hood 1502a positionable in the RA and a tubular portion 1506 positioned at least partially across the septal wall. The system 1500 can further include a receiving element 1504 which can slidably receive the tubular portion 1506. The receiving element 1504 includes a lumen (not shown) that can align with the lumen 1503 extending through the sliding element 1502. Accordingly, blood can flow through the receiving element 1504 and the sliding element 1502 between the LA and the RA, as indicated by the arrows A1. In some embodiments, the interface between the tubular portion 1506 of the sliding element 1502 and the receiving element 1504 includes one or more springs, or other suitable mechanisms to adjust how the tubular portion 1506 and the receiving element 1504 move relative to one another. The tubular portion 1506 of the sliding element 1502 and the receiving element 1504 can have diameters smaller than the diameter of the hole created during the transseptal puncture to allow blood to freely enter the transseptal space between the tubular portion 1506 and the septal wall 1501. The system 1500 can be secured to the septal wall using any suitable mechanism such as with anchors 1505. In some embodiments, there may also be anchors provided on the RA side of the system 1500 (not shown).

The sliding element 1502 moves relative to the receiving element 1504 based on a pressure differential between the LA and the RA. In an initial state, such as shown in FIG. 15A, pressure between the LA and the RA is below a predetermined threshold and blood flows from the LA to the RA exclusively through the lumen 1503. The annular hood 1502a engages with the septal wall 1501, preventing additional flow between the LA and the RA. A mean pressure P1, which is a function of the LA and RA pressures, exerts a force onto the septal side of the annular hood 1502a, but this pressure is not sufficient to push the annular hood 1502a away from the septal wall. FIG. 15B shows the system 1500 in a second state. In the second state, the pressure differential between the LA and the RA has increased above the predetermined threshold such that there is a second mean pressure P2, where P2>P1. In this state, pressure P2 has exerted sufficient force on the annular hood 1502a such that that the tubular portion 1506 has slid at least partially out of the receiving element 1504 and the annular hood 1502a has moved away from septal wall 1501. Accordingly, in addition to blow flow through the central lumen 1503, there are additional paths for interatrial blood flow around the central portions of the system (e.g., the tubular portion 1506 and the receiving element 1504), as denoted by arrows A2. These additional pathways are expected to allow a larger volume of blood to flow from the LA to the RA, and as such are expected to facilitate a more rapid unloading of the LA. As this pressure is gradually relieved, the mean pressure is lowered and the tubular portion 1506 may retract into its initial position within the receiving element 1504, returning the annular hood 1502a into contact with the septal wall 1501 and re-establishing the lumen 1503 as the only pathway for interatrial fluid communication.

Figure 16A:
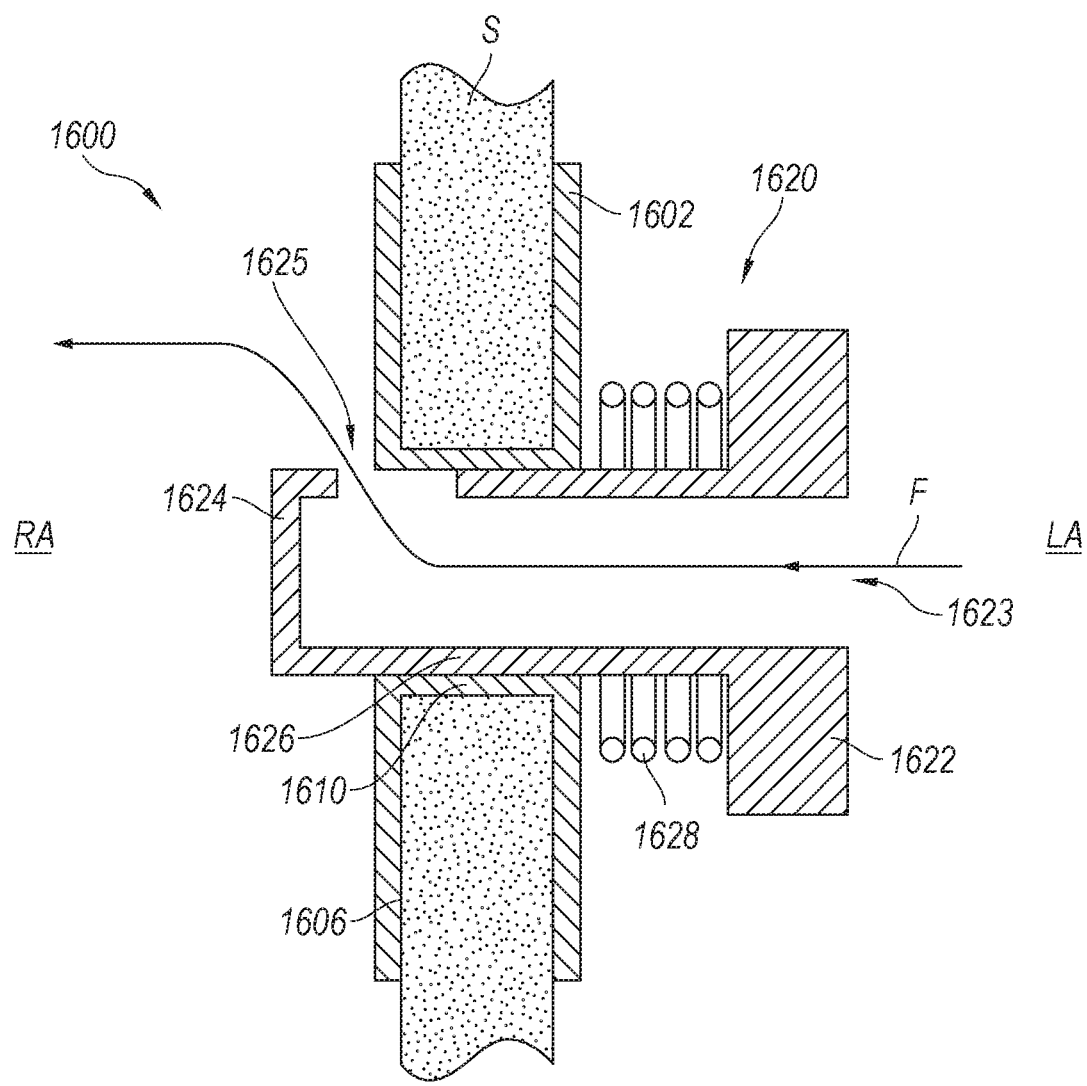
FIGS. 16A-16C illustrate another passively adjustable interatrial shunting system with a sliding element and configured in accordance with select embodiments of the present technology.

FIG. 16A is a cross-sectional illustration of an interatrial shunting system 1600 ("system 1600") configured in accordance with embodiments of the present technology. The system 1600 includes a first flange 1602, a second flange 1606, and a shunting or tubular element 1610 connecting the first flange 1602 and the second flange 1606. The first flange 1602 and the second flange 1606 are at least partially spaced apart by the tubular element 1610 and can secure the system 1600 to an anatomical structure, such as a septal wall S.

The system 1600 includes a flow control element (e.g., plug element 1620), which can include a flared first end portion 1622 positioned on a first side (e.g., LA side) of the system 1600 and a second end portion 1624 on a second side (e.g., RA side) of the system 1600. The plug element 1620 further includes a medial portion 1626 extending between the flared first end portion 1622 and the second end portion 1624. The medial portion 1626 is sized and shaped such that the plug element 1620 can be slidably received within the tubular element 1610. For example, when the plug element 1620 is disposed within the tubular element 1610, the medial portion 1626 of the plug element slidably engages an interior surface of the tubular element 1610. The flared first end portion 1622 of the plug element 1620 includes an inflow aperture 1623 that, when the shunt is implanted across the septal wall S, is in fluid communication with the LA. The medial portion 1626 includes an outflow aperture 1625 proximate the second end portion 1624 that, when the shunt is implanted across the septal wall S, can be in fluid communication with the RA. The medial portion 1626 may be hollow such that the inflow aperture 1623 is fluidly coupled to the outflow aperture 1625. The plug element 1620 also includes a spring 1628 positioned generally between the flared first end portion 1622 and the septal wall (e.g., between the flared first end portion 1622 and the first flange 1602).

The plug element 1620 can slide with respect to the tubular element 1610 based, at least in part, on the pressure difference between the LA and the RA. For example, in a first state (not shown) in which the pressure differential between the LA and the RA is relatively low, the outflow aperture 1625 may be aligned with, and thus blocked by, an interior surface of the tubular element 1610. In such state, the outflow aperture 1625 is not in fluid communication with the RA and blocks the flow of blood between the LA and the RA. As the pressure differential between the LA and the RA increases, the force imparted on the flared first end portion 1622 is increased and, as a result, the resistance provided by the spring 1628 is overcome. The plug element 1620 therefore compresses the spring 1628 and slides towards the RA. As illustrated in FIG. 16A, the outflow aperture 1625 can thus be fluidly connected to the RA as the plug element 1620 moves further towards the RA. In such configurations, blood can flow through the plug element 1620 from the LA to the RA. When the pressure differential between the LA and the RA decreases, the spring 1628 expands and pushes the plug element 1620 back towards the LA, thereby blocking the outflow aperture 1625 and closing the flow path between the LA and the RA.

In some embodiments, the spring has a spring constant that is set such that the pressure differential between the RA and the LA must exceed a predetermined threshold (e.g., 5 mmHg, 10 mmHg, 15 mmHg, etc.) before the plug element 1620 slides towards the RA and fluidly connects the LA and RA. Accordingly, the degree of blood transfer from the LA to the RA can be controlled based on the relative stiffness of the spring. In some embodiments, the stiffness of the spring may be adjustable after implanting the shunt into the heart to adapt the therapy to changing disease states.

Figure 16B:
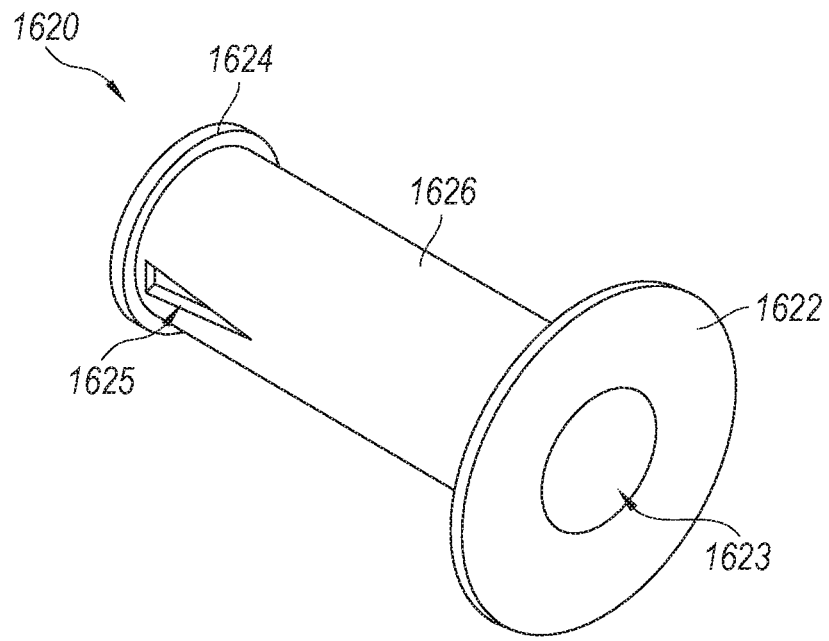
Figure 16C:
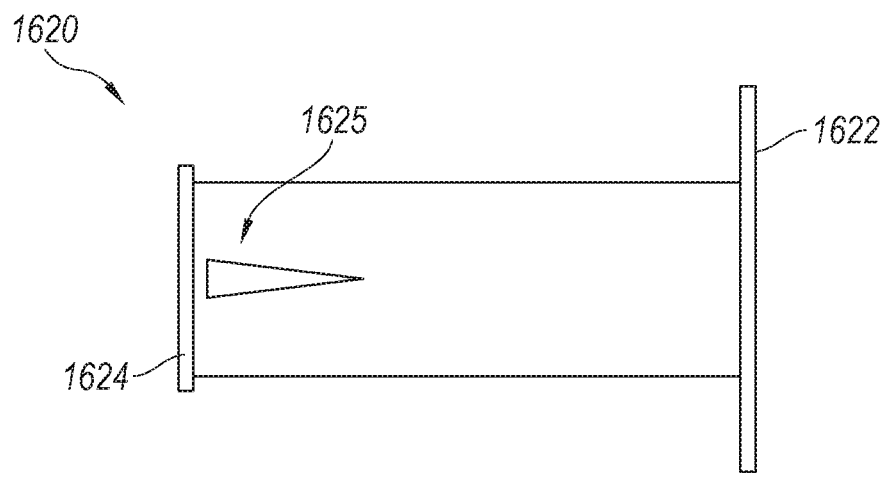

FIG. 16B is an isometric view of the plug element 1620, and FIG. 16C is a side view of the plug element 1620. In particular, FIGS. 16B and 16C illustrate that the outflow aperture 1625 can have a generally triangular shape. Without being bound by theory, the triangular shape of the outflow aperture 1625 may make blood flow less dependent on pressure and more dependent on the length of time the outflow aperture 1625 is in fluid communication with the RA. In other embodiments, however, the outflow aperture 1625 has other suitable shapes, such as circular, oval, or rectangular. The outflow aperture 1625 can also extend at least partially around a circumference of the medial portion 1626.

The flow control mechanism can include a control element for selectively adjusting the blood flow through the shunting element. In some embodiments, the control element can be adjusted by (1) changing the shape or size (e.g., volume, diameter, width, dimension, etc.) of the control element and/or (2) changing the distance between the control element and the shunting element. In some embodiments, increasing the size and/or decreasing the distance causes the control element to at least partially obstruct the lumen of the shunting element, thereby decreasing or preventing blood flow therethrough. Conversely, decreasing the size and/or increasing the distance can permit blood to flow through the lumen of the shunting element with little or no obstruction.

Figure 17A:
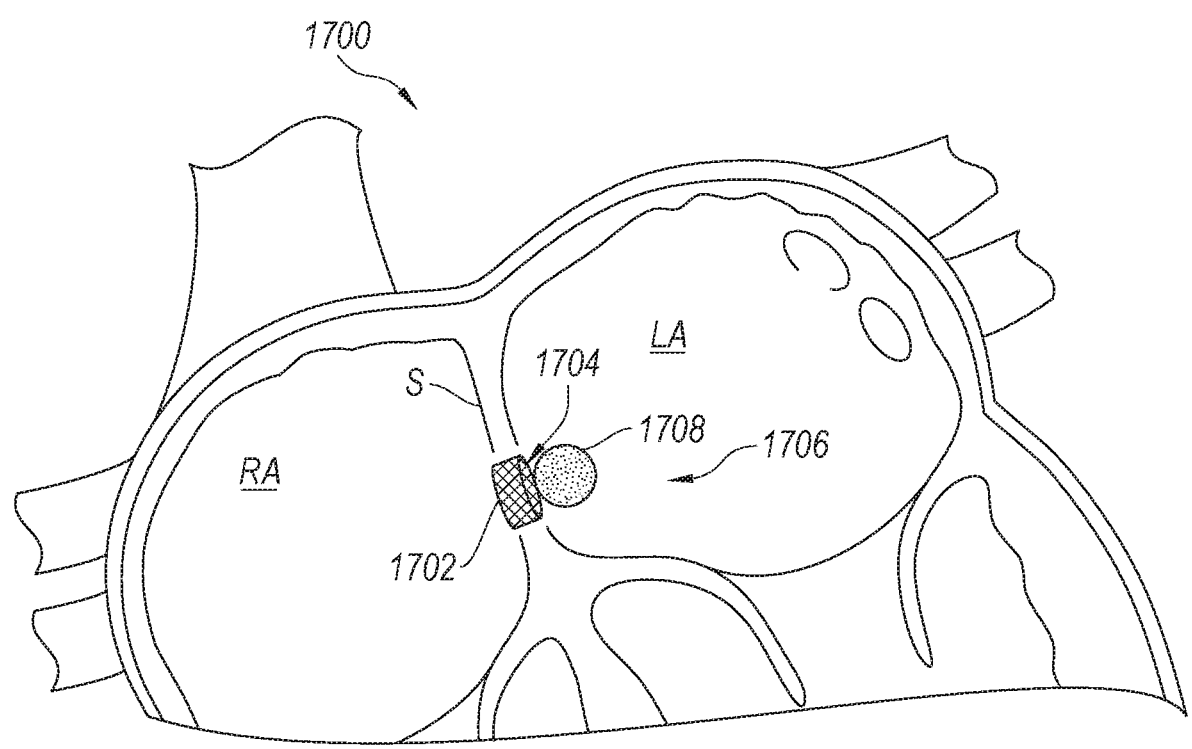
FIG. 17A is a schematic illustration of an interatrial shunting system configured in accordance with an embodiment of the present technology.

FIG. 17A illustrates another interatrial shunting system 1700 ("system 1700") configured in accordance with embodiments of the present technology. As described in detail below, the system 1700 can be adapted for passive adjustments (FIGS. 17A-17C), or can be adapted for active adjustments that require an input (FIGS. 17D-17F). The system 1700 includes a shunting element 1702 defining a lumen 1704 therethrough. The shunting element 1702 can be implanted in the septal wall S so as to fluidly connect the LA and the RA via the lumen 1704. As a result, when the system 1700 is implanted, blood flow can flow through the lumen 1704 from the LA to the RA.

The system 1700 further includes a flow control system 1706 operably coupled to the shunting element 1702 for controlling blood flow therethrough. The flow control system 1706 can include an expandable member 1708 (e.g., a balloon), which serves as a control element (e.g., a flow control element) for selectively adjusting blood flow through the shunting element 1702. In some embodiments, the expandable member 1708 is positioned within the LA at, near, or within the lumen 1704 of the shunting element 1702. In other embodiments the expandable member 1708 can be positioned within the RA at, near, or within the lumen 1704 of the shunting element 1702. Although FIG. 17A illustrates the expandable member 1708 as having a spherical shape, in other embodiments, the expandable member 1708 can have a different shape (e.g., ellipsoidal, cylindrical, etc.). The expandable member 1708 can be filled with a fluid, such as a liquid or gas. In some embodiments, the expandable member 1708 is configured to change in size (e.g., volume, diameter, etc.) in response to changes in left atrial pressure. For example, in embodiments where the expandable member 1708 is filled with a gas, the relationship between the volume (V) of the expandable member 1708 and the pressure (P) of the gas can be governed by the ideal gas equation PV=constant (e.g., assuming constant temperature of the gas), such that the volume of the expandable member 1708 increases when the pressure decreases, and vice-versa. As a result, the expandable member 1708 can automatically vary in size as the pressure within the LA changes.

The size of the expandable member 1708 can control the amount of blood flow through the lumen 1704. For example, when the expandable member 1708 has a relatively large size, the expandable member 1708 can partially or completely obstruct the lumen 1704, resulting in decreased or no blood flow therethrough. In some embodiments, the expandable member 1708 has a cross-sectional area and/or diameter that is greater than or equal to the cross-sectional area and/or diameter of the lumen 1704. Conversely, when the expandable member 1708 has a relatively small size, blood can flow through the lumen 1704 with reduced or no obstruction. In such embodiments, the expandable member 1708 can have a cross-sectional area and/or diameter that is less than the cross-sectional area and/or diameter of the lumen 1704. As a result, the flow control mechanism 1706 can provide passive pressure-based regulation of blood flow through the shunting element 1702. For example, when the pressure in the LA increases, the expandable member 1708 can automatically shrink to a smaller size, thereby permitting an increased amount of blood flow through the lumen 1704. When the pressure in the LA decreases, the expandable member 1708 can automatically expand to a greater size, thereby permitting a decreased amount of blood flow through the lumen 1704.

Figure 17B:
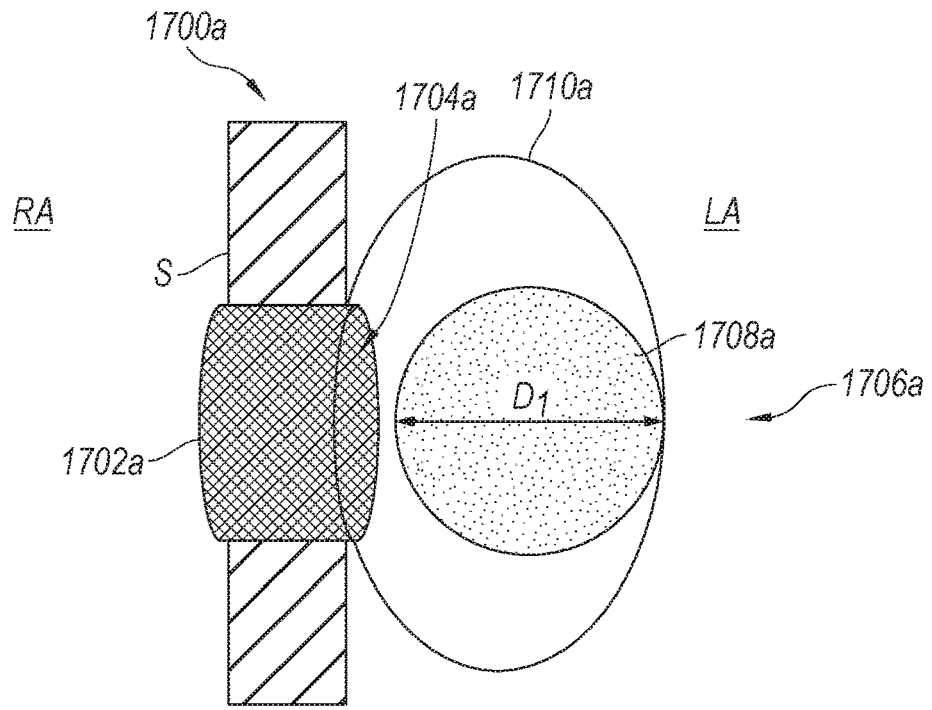
FIGS. 17B and 17C are side cross-sectional views of an interatrial shunting system configured in accordance with another embodiment of the present technology.
Figure 17C:
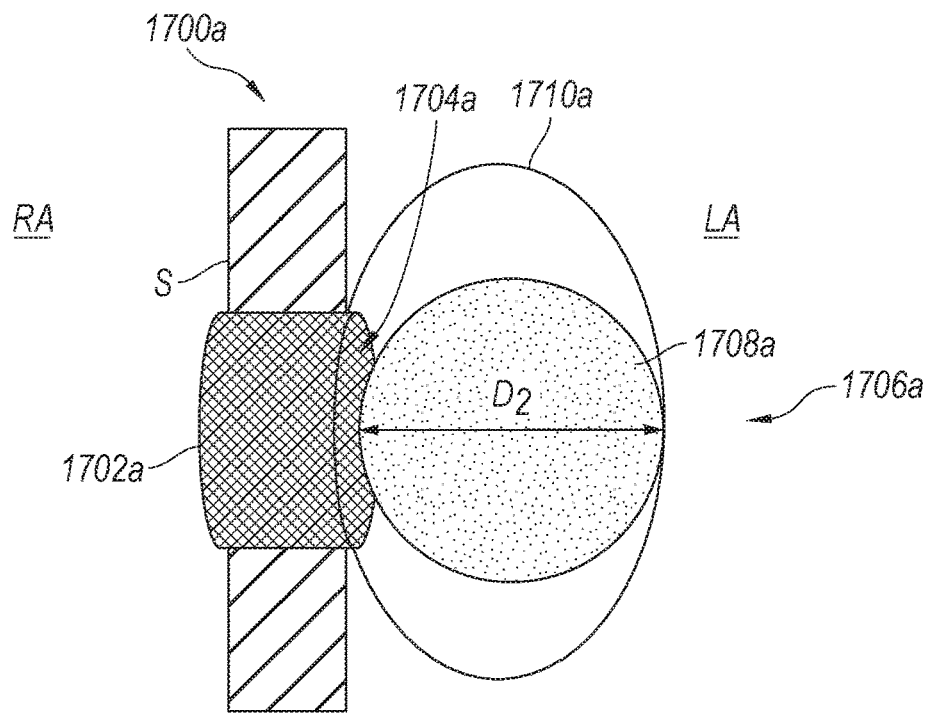
Figure 17D:
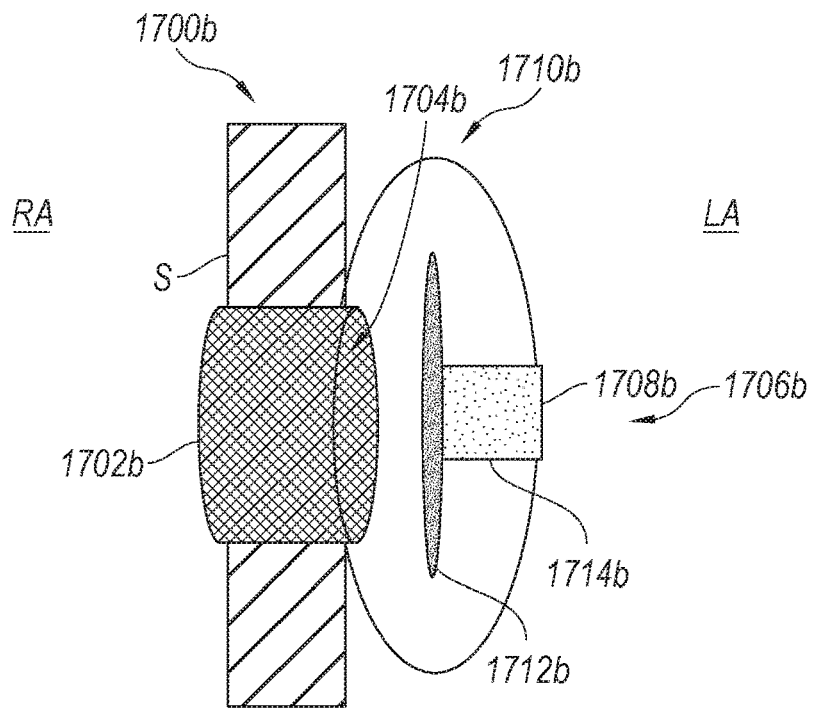
FIGS. 17D and 17E are side cross-sectional views of an interatrial shunting system configured in accordance with a further embodiment of the present technology.
Figure 17E:
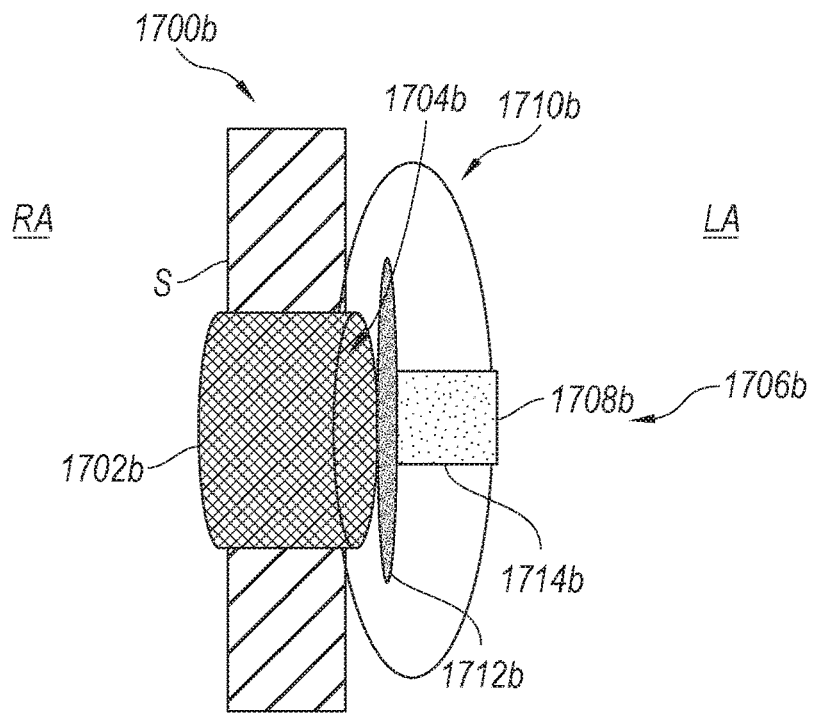
Figure 17F:
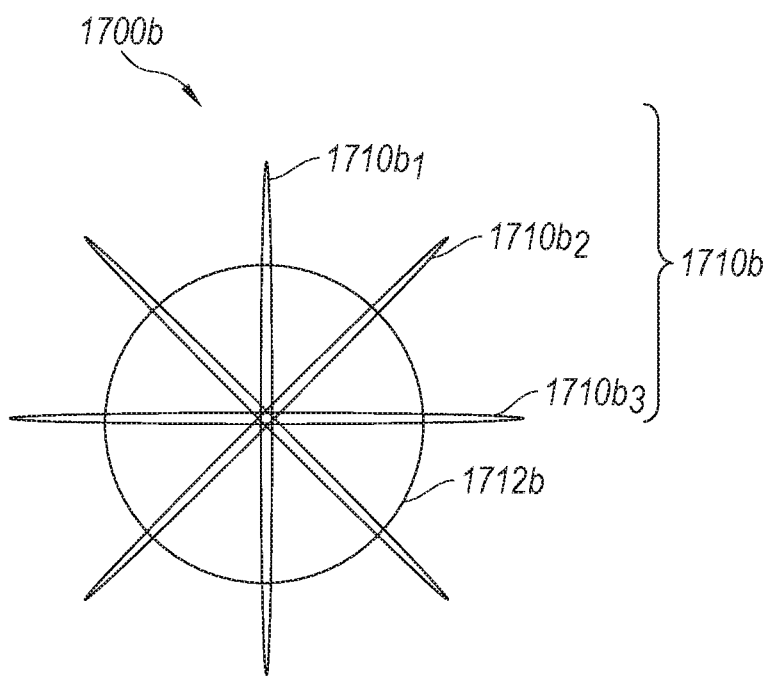
FIG. 17F is an end view of the system of FIGS. 17D and 17E.

FIGS. 17B and 17C are side cross-sectional views of one embodiment of an interatrial shunting system 1700a adapted for passive adjustments. The expandable member 1708a of the flow control system 1706a can be supported by a frame structure 1710a. As previously described, the expandable member 1708a can serve as a control element for the flow control system 1706a. In some embodiments, the expandable member 1708a is configured to change in size (e.g., volume, diameter, etc.) in response to changes in left atrial pressure. For example, referring to FIG. 17B, the expandable member 1708a can initially have a first size (e.g., a first diameter $D_1$). The first size can be sufficiently small so as to produce little or no obstruction of the lumen 1704a. Referring to FIG. 17C, when the pressure in the LA decreases, the expandable member 1708a can automatically expand to a second, greater size (e.g., a second diameter D2). The second size can be sufficiently large such that the lumen 1704a is partially or completely obstructed, thereby decreasing the amount of blood flow through the lumen 1704a. As a result, the flow control system 1706a can provide passive pressure-based regulation of blood flow through the shunting element 1702a.

In some embodiments, the geometry of the frame structure 1710a is configured such that the expandable member 1708a is positioned a distance away from the lumen 1704a when coupled to the frame structure 1710a. The distance between the expandable member 1708a and the lumen 1704a can be varied to control the amount of blood flow through the lumen 1704a. For example, the blood flow can increase as the distance between the expandable member 1708a and the lumen 1704a increases, and can decrease as the distance decreases. In some embodiments, the size of the expandable member 1708a affects the distance between the expandable member 1708a and the lumen 1704a. For example, as the expandable member 1708a increases in size, the external surface of the expandable member 1708a can move towards the lumen 1704a, resulting in partial or complete obstruction of blood flow. Conversely, as the expandable member 1708a decreases in size, the external surface of the expandable member 1708a can move away from the lumen 1704a, thus permitting an increased amount of blood flow through the lumen 1704a.

FIGS. 17D-17F illustrate another embodiment of an interatrial shunting system 1700b configured in accordance with the present technology and adapted for "active" adjustments. More specifically, FIGS. 17D and 17E are side cross-sectional views of the system 1700b, and FIG. 17F is an end view of the system 1700b. Referring to FIGS. 17D and 17E, the system 1700b includes a shunting element 1702b defining a lumen 1704b therethrough. The shunting element 1702b can be implanted in the septal wall S to fluidly connect the LA and the RA via the lumen 1704b.

Referring to FIGS. 17D-17F together, the system 1700b further includes a flow control system 1706b operably coupled to the shunting element 1702b for controlling blood flow therethrough. The flow control system 1706b can include a flow control element 1708b positioned at or near the shunting element 1702b, and a plurality of frame segments 1710b (e.g., a first frame segment $1710b_1$, a second frame segment $1710b_2$, and a third frame segment $1710b_3$—best seen in FIG. 17F) coupled to the control element 1708b. In the illustrated embodiment, the control element 1708b includes a valve member 1712b and a stem 1714b, and each frame segment 1710b is coupled to the stem 1714b.

In some embodiments, each of the frame segments 1710b is individually actuatable to adjust the distance between the flow control element 1708b (e.g., the valve member 1712b) and the lumen 1704b. For example, each frame segment 1710b can be actuatable between a resting configuration (e.g., as shown in FIG. 17D) and an actuated configuration (e.g., as shown in FIG. 17E). In the actuated configuration, the frame segment 1710b can have a compressed shape that positions the control element 1708b towards the lumen 1704b. In the resting configuration, the frame segment 1710b can have an expanded shape that positions the flow control element 1708b away from the lumen 1704b. The distance between the flow control element 1708b and the lumen 1704b can be controlled based on the number of actuated frame segments 1710b, such that the distance decreases as the number of frame segments 1710b in the actuated configuration increases, and increases as the number of frame segments 1710b in the resting configuration increases.

The distance between the flow control element 1708b and the lumen 1704b can be used to control the amount of blood flow through the lumen 1704b. For example, the amount of blood flow can increase as the distance between the flow control element 1708b and the lumen 1704b increases, and can decrease as the distance decreases. In some embodiments, the valve member 1712b has a surface area greater than or equal to the cross-sectional area of the lumen 1704b, such movement of the valve member 1712b towards the lumen 1704b partially or completely obstructs blood flow through the lumen 1704b.

The frame segments 1710b can be actuated by an actuation mechanism (not shown). For example, the actuation mechanism can be housed within the stem 1714b of the flow control element 1708b. In some embodiments, the actuation mechanism is an active mechanism, such as a motor, piston, pump, etc. Suitable motors include electromagnetic motors, implanted battery and mechanical motors, MEMS motors, micro brushless DC motors, piezoelectric based motors, solenoids, and other motors. Alternatively or in combination, the actuation mechanism can include one or more shape memory elements (e.g., metals, polymers) configured to change in shape (e.g., shrink, expand) in response to application of energy (e.g., heat, light). Optionally, the frame segments 1710b can be shape memory elements, and can be actuated by energy transmitted from another component of the system 1700b or from an external source.

In some embodiments, the frame segments 1710b are actuated in response to changes in left atrial pressure. For example, the flow control system 1706b can include or be operably coupled to one or more pressure sensors (not shown) configured to generate pressure data. The pressure data can be transmitted to an actuation mechanism, and the actuation mechanism can actuate one or more frame segments 1710b to move the control element 1708b towards or away from the lumen 1704b in response to the pressure data. For example, if the pressure data indicates an increase in left atrial pressure, the control element 1708b can be moved away from the lumen 1704b to increase blood flow therethrough. Conversely, if the pressure data indicates a decrease in left atrial pressure, the control element 1708b can be moved towards the lumen 1704b to decrease blood flow therethrough. As a result, the flow control system 1706b can provide active pressure-based regulation of blood flow through the shunting element 1702b.

It shall be appreciated that the configuration described with respect to FIGS. 17D-17F can be varied as desired. For example, although FIG. 17F illustrates three frame segments $1710b_{1-3}$, in other embodiments the flow control system 1706b can include a different number of frame segments (e.g., one, two, four, five, or more). Additionally, although each frame segment 1710b is shown as having an elliptical shape, in other embodiments, the frame segments 1710b can have a different shape (e.g., circular, rectangular, square, polygonal, rectilinear, curvilinear, etc.). Moreover, although the valve member 1712b is depicted as having a circular shape, in other embodiments, the valve member 1712b can have a different shape (e.g., elliptical, rectangular, square, polygonal, rectilinear, curvilinear, etc.).

Figure 18A:
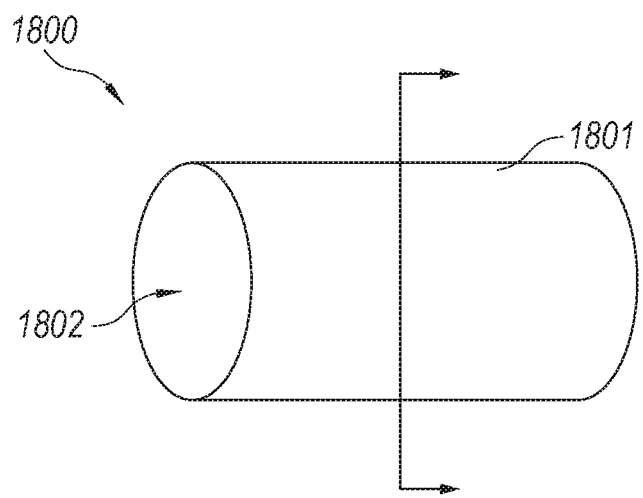
FIGS. 18A-18C illustrate another embodiment of an adjustable interatrial shunting system configured in accordance with select embodiments of the present technology.
Figure 18B:
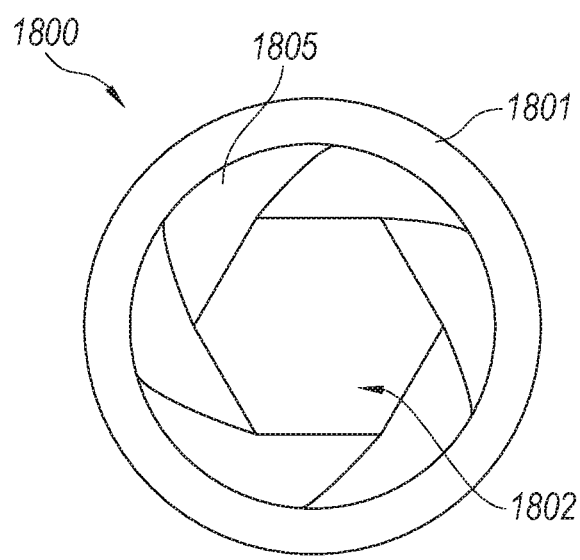
Figure 18C:
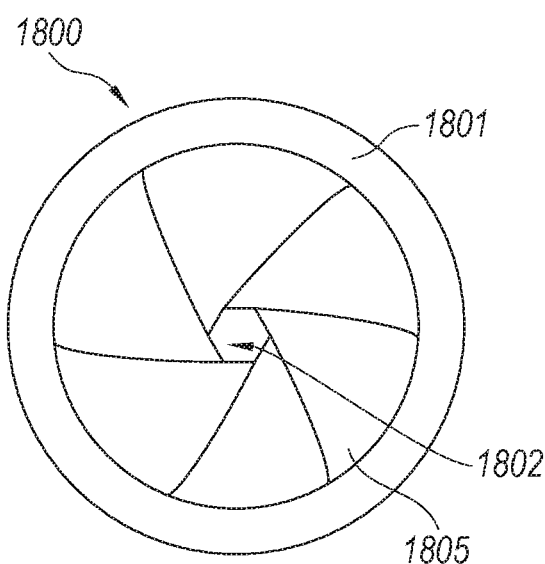

FIGS. 18A-18C illustrate yet another interatrial shunting system 1800 ("system 1800") configured in accordance with select embodiments of the present technology. As illustrated, the system 1800 includes a shunting element 1801 having a lumen 1802 extending therethrough. The lumen 1802 can fluidly couple the LA and the RA when the shunting element 1801 is implanted in the patient. The system 1800 can include a flow control element 1805 positioned within the lumen 1802. The flow control element 1805 can be an iris or other similar feature that can be selectively transitioned between a generally open position (FIG. 18B) and a generally closed position (FIG. 18C). The flow control element 1805 can be operated using any suitable actuation mechanism, such as any actuation mechanism described herein.

E. SELECT FEATURES TO MITIGATE RISK OF THROMBOSIS

In some embodiments, the shape of one or more components of the interatrial shunting systems described herein may be configured so as to guide the field of fluid flow between chambers. For example, it may be desirable to limit the degree of turbulence in the flow between chambers for reasons related to blood cell physiology, for reasons related to thrombus/clot formation, or for other reasons. In some embodiments, the entryway to the lumen of a shunting element may be configured to be curved, parabolic, conical, or hemispherical in shape, or be otherwise shaped geometrically to avoid sharp edges and/or regions where fluid may become trapped or pooled.

Some embodiments of the interatrial shunting systems described herein may also include elements to restrict flow in one direction. Implementations of said embodiments may use valves or other means to mechanically restrict flow in a single direction. Variation implementations may utilize pressure sensors to determine the pressure in one or more chambers of the heart and dynamically open/close a lumen in response to the pressure profile in the heart. In some embodiments, this opening and closing of a lumen would occur dynamically throughout certain cardiac cycles. In some embodiments, the shunting element includes screens, filters, or other components to prevent clot/thrombus/emboli from traveling from the RA to the LA. In such embodiments, flow may not be meaningfully restricted, but any clot carried by incidental flow from the RA to the LA would be captured by the screen/filter complex and therefore not enter the arterial circulation.

In an embodiment, a system is adapted to replace/exchange/add a filter or screen to the RA side of an implanted interatrial shunt. This would be useful, for example, if the filter became occluded over time and therefore limits flow through the lumen. In some implementations, catheters could be used to access and remove a screen or filter from the implant, remove the screen or filter from the body of the patient, then replace (with or without suturing) a new screen or filter into position.

F. SELECT FEATURES TO REDUCE TISSUE INGROWTH

Certain aspects of the interatrial shunting systems described herein may also include features and/or methods of use to prevent endothelialization, tissue overgrowth, and/or other phenomena that may lead to stenosis or occlusion of the lumen(s). While endothelialization or tissue overgrowth may be a desirable phenomenon in certain regions of an implanted device (e.g., in regions containing anchors), it may be an undesirable phenomenon in other regions (e.g., in luminal areas). The features and/or methods of use described may be useful both to ensure the long-term patency of any fluid communication channels and to preserve the range of motion that is achievable by any of the components that are adapted to move, such as valves that are adapted to open and close and/or balloons that may inflate and deflate.

In one particular example of operation, the systems described herein may direct one or more adjustable or dynamic components (e.g., the flow control element) to move through a full range of motion at set intervals, such as, for example, once every 6 hours, once every day, once every week, or another suitable period of time. For example, in embodiments that utilize one or more balloons to alter the diameter or effective diameter of a fluid communication channel, the balloon may be inflated to its maximum capacity, then deflated to its minimum capacity, and then return to the desired volume at set intervals. In a second example, embodiments that utilize valves or flaps may be forced open via electrical or mechanical means at set intervals. Without being bound by theory, moving the flow control element through a full range of motion at set intervals may decrease the likelihood of tissue overgrowth that may prevent future movement of the flow control element. Optionally, some components of the system can be composed or partially composed of synthetic materials that limit or retard the onset of tissue growth.

G. ADJUSTABLE INNER DIAMETER TO ALLOW FOR HEART PROCEDURES

In some embodiments, the interatrial shunting systems can be configured to permit a healthcare practitioner to access the heart using standard techniques to perform various transseptal cardiac procedures. For example, a lumen in the shunting element or the lumen created in the tissue may be dilated or expanded to a size that is not typical for use with interatrial shunts in order to allow additional transseptal cardiac procedures to occur. In some embodiments, the lumen may be expanded greater than about 24 Fr, such as up to about 30 Fr, about 40 Fr, or larger. For example, the lumen may be flexible such that it may be dilated with a cylindrical balloon in order to provide temporarily enlarged transseptal access. In such embodiments, some or all materials comprising the lumen portion of an implant may be constructed of a material with shape-memory or superelastic properties, such as nitinol. In variation embodiments, a shutter, iris, valve, or balloon configuration may have a normal diameter range of adjustable operation, which at the discretion of a physician may be opened to a wider diameter that is outside of this normal range in order to facilitate interventional tools traversing the lumen. Following the secondary procedure, the lumen diameter may be reconfigured to once again operate primarily within the normal range of diameters.

In some embodiments, a system is configured to have no shunting capability. In such an embodiment, the implant is intended to place one or more sensors in the LA, with or without additional sensors placed in other anatomical locations such as the RA, CS, etc. In some embodiments, an implant that normally has no interatrial passageway is adaptable such that a passageway may be created, for example via expansion with a balloon dilator, in order to facilitate future transseptal procedures. In some embodiments, the implant includes a shunt passage which is selectively sealed (e.g. by an inflatable balloon). The seal can be removed (e.g. by deflating the balloon) thereby opening the passageway to facilitate delivery of therapeutic devices therethrough. For example, the shunt may be configured to open for the purpose of allowing introduction of a delivery tool and prosthetic valve from the RA to the LA. In still another embodiment, the implant may contain a sealed lumen that is initially blocked with one or more membranes that prevent fluid communication between heart chambers. If a future transseptal procedure is needed, or if at a later time a shunting effect is desired, a cutting or dilating catheter may be utilized to remove, puncture, or otherwise manipulate the membranes to establish a pathway into the LA from the RA. Following the procedure, either the lumen may be left open, or the lumen may be closed, for example using tools and techniques that are similar to those utilized during closure of patent foramen ovule (PFO).

H. USING ARTIFICIAL INTELLIGENCE AND/OR EMPIRICAL ALGORITHMS TO CONTROL ADJUSTABLE SYSTEMS

In some embodiments, adjustments to the flow control elements described herein are determined according to an empirical algorithm. For example, an algorithm can be included in processing circuitry that determines an optimal flow rate, shunt diameter, and/or flow control element position as a function of an input (e.g., left atrial pressure, heart rate, etc.). The processing circuitry can then direct the actuator mechanism to adjust the flow control element to the desired position, achieve the desired left atrial pressure, and/or to achieve the desired flow. Thus, in some embodiments, the device automatically adjusts a position of the flow control element according to the algorithm. The empirical formula can be used to control continuous or substantially continuous adjustments, or to control periodic adjustments.

In some embodiments, the system may also incorporate one or more artificial intelligence (AI) and/or machine-learning (ML) architectures. For example, a sensor can measure the pressure in the LA and RA, calculate a pressure differential between the LA and RA, and use the pressure differential, potentially along with other factors, to estimate flow between the LA and RA. These data can captured by an implanted device and transmitted to an external hub or reader. Data may be processed locally at the hub/reader and/or uploaded to the cloud, and AI may be used to perform additional analytics. These analytics may be shared with healthcare practitioners to provide snapshots regarding insights into the patient's state of health and the stability of their managed condition, and may provide information predictive of future patient status. For example, based on data available from the implant, an AI architecture and/or other algorithms may be able to predict an elevated risk for patient decompensation, which may lead to hospitalization. With this information available, a healthcare practitioner may be able to intervene and improve a patient condition by, for example, adjusting the patient's medications, by advising the patient regarding dietary or exercise habits, by adjusting the flow control element in an adjustable interatrial shunting system, or by taking another action.

In some embodiments, an AI architecture may integrate data from implanted sensors, wearable sensors, external sources, and/or any combination thereof. For example, using a phone or computer application, a patient may record information about their symptoms (e.g., how they are feeling overall, any shortness of breath, any fatigue, etc.). In some embodiments, this information may be combined with information from other devices, for example weight measurements made by a scale or information available from patches, watches, or other wearable devices. A ML algorithm may collect data longitudinally for a patient, and/or combine data available from many patients, in order to empirically determine the ideal size of a shunt lumen for a particular patient—either for the patient in general, or for the patient acutely based upon his or her current symptoms, pressures, cardiac rhythm, etc. The system may learn from the pressure data to optimize operation of the shunt diameter during, for example, exercise or other activities. The data may be used to personalize the therapy provided by the adjustable interatrial shunting systems to the individual patient in other ways as well.

In some embodiments, an AI architecture can be used to establish a relationship between an input (e.g., left atrial pressure, heart rate, etc.), an adjustment value (e.g., a positional value of the flow control element), and a desired outcome (left atrial pressure following adjustment). Thus, the trained AI model can, among other things, predict decompensation, determine ideal size of the shunt, determine when to adjust shunt size automatically, etc. In some embodiments, the AI model can be used to adjust the empirical algorithm controlling the system. In some embodiments, the AI model is used to adjust the device itself. In some embodiments, the AI model can detect when an action (e.g., adjusting a shunt size) does not lead to a predicted corresponding effect size (e.g., a change in left atrial pressure), and alert a healthcare practitioner that additional interventions or medical attention may be necessary.

I. POWER HARVESTING

Some embodiments may include power supply components that allow for energy harvesting in order to recharge a battery, supercapacitor, or other storage component for electrical energy. In one example implementation, piezoelectric components are included in an implant to harness energy produced by the motion of the heart as it contracts to pump blood. The piezoelectric component may convert the mechanical energy of the heart into electrical energy that may be utilized to power sensors in an implant, power motors, actuators, or other systems that open or close valves, shutters, irises, or other adjustable components, or drive pumps or other systems that exchange filling media between one or more balloons and a secondary storage location. In one example, the system includes a turbine or other means to capture kinetic energy of blood passing through the shunt. In some embodiments, the turbine can incorporate a brake acting as a variable resistor and can be used to selectively control the flow control element. Power harvesting can include conversion of any or any combination of RF, magnetic energy, and acoustic ultrasound. The harvested energy source can be naturally occurring or provided by an external device. Power harvesting can include energy storage, which can be coupled to an onboard power management (e.g., as in FIG. 1D).

J. SELECT METHODS OF OPERATING ADJUSTABLE INTERATRIAL SHUNTING SYSTEMS

The present technology also provides methods of operating adjustable interatrial shunting systems. For example, the present technology includes methods of treating HF using one or more of the adjustable interatrial shunting systems described herein. The present technology also includes methods for selectively controlling blood flow between a LA and a RA in a patient using one or more of the adjustable interatrial shunting systems described herein.

Some embodiments of the present technology adjust the relative size and/or shape of the lumen consistently (e.g., continuously, hourly, daily, etc.). Consistent adjustments might be made, for example, to adjust the flow of blood based on a blood pressure level, respiratory rate, heart rate, and/or another parameter of the patient, which changes frequently over the course of a day. For example, the system can have a baseline state in which the flow control element does not allow substantial blood flow between the LA and the RA, and an active state in which the flow control element is open and allows blood to flow between the LA and the RA. The system can transition between the baseline state and the active state whenever one or more patient status parameters change due to exercise, stress, or other factors. In other embodiments, consistent adjustments can be made based on, or in response to, physiological parameters that are detected using sensors, including, for example, sensed left atrial pressure and/or right atrial pressure via sensors. If the left atrial pressure increases, the system can automatically adjust the flow control element to decrease flow resistance between the LA and the RA and allow increased blood flow. In another example, the system can be configured to adjust based on, or in response to, an input parameter from another device such as a pulmonary arterial pressure sensor, insertable cardiac monitor, pacemaker, defibrillator, cardioverter, wearable, external ECG or PPG, and the like.

Some embodiments of the present technology adjust the relative size and/or shape of the lumen only after a threshold has been reached (e.g., a predetermined period of time has elapsed). This may be done, for example, to avoid unnecessary back and forth adjustments and/or avoid changes based on clinically insignificant changes. In some embodiments, adjustments may occur occasionally as a patient's condition changes. For example, the flow control element may move to gradually open a lumen through the shunting element if a patient experiences a sustained rise in left atrial pressure (e.g., rate of change is above a predetermined threshold, and/or the left atrial pressure remains higher than a predetermined threshold for longer than a predetermined amount of time), pulmonary artery pressure, weight, or another physiologically relevant parameters. Additionally or alternatively, adjustments can occur if pressure exceeds a threshold or increases by a threshold amount over a period of time (e.g., several days or more). The diameter of the lumen can then be increased to increase blood flow between the LA and RA and to avoid decompensation.

The system can also enable a clinician to periodically (e.g., monthly, bi-monthly, annually, as needed, etc.) adjust the system to improve patient treatment. For example, during a patient visit, the clinician can assess a number of patient parameters and determine whether adjusting the flow control element, and thus altering blood flow between the LA and the RA, would provide better treatment and/or enhance the patient's quality of life. Patient parameters can include, for example, physiological parameters (e.g., LA blood pressure, RA blood pressure, the difference between LA blood pressure and RA blood pressure, flow velocity, heart rate, cardiac output, myocardial strain, etc.), subjective parameters (e.g., whether the patient is fatigued, how the patient feels during exercise, etc.), and other parameters known in the art for assessing whether a treatment is working. If the clinician decides to adjust the system, the clinician can adjust the device lumen using the techniques described herein.

K. EXAMPLES

Several aspects of the present technology are set forth in the following examples.

1. A system for shunting blood between a left atrium and a right atrium of a patient, the system comprising:
   a shunting element having a lumen extending therethrough, wherein the lumen is configured to fluidly couple the left atrium and the right atrium when the shunting element is implanted in the patient;
   an expandable member within and/or adjacent to the lumen;
   a fluid reservoir operably coupled to the expandable member; and
   an actuation mechanism configured to selectively adjust a volume of the expandable member by controlling fluid flow between the fluid reservoir and the expandable member,
   wherein selectively adjusting the volume of the expandable member changes a cross-sectional area of the lumen and selectively controls blood flow therethrough.
2. The system of example 1 wherein the expandable member is adjustable between a first volume permitting a first amount of blood flow through the lumen, and a second, greater volume permitting a second amount of blood flow less than the first amount through the lumen.
3. The system of example 2 wherein the lumen is at least partially obstructed by the expandable member when the expandable member is adjusted to the second volume.
4. The system of any one of examples 1-3 wherein the actuation mechanism is configured to selectively adjust the volume of the expandable member by adjusting an amount of fluid within the expandable member.
5. The system of any one of examples 1-4 wherein the actuation mechanism comprises one or more shape memory elements.
6. The system of example 5 wherein heating of a first subset of the one or more shape memory elements causes fluid to flow from the fluid reservoir into the expandable member, and wherein heating of a second subset of the one or more shape memory elements causes fluid to flow from the expandable member into the fluid reservoir.
7. The system of example 6 wherein at least some of the one or more shape memory elements are coupled to the fluid reservoir.
8. The system of example 6 wherein the fluid reservoir is fluidly coupled to the expandable member by a connecting structure, and wherein at least some of the one or more shape memory elements are coupled to the connecting structure.
9. The system of any one of examples 1-4 wherein the actuation mechanism comprises a plurality of elongated elements extending across the fluid reservoir, the plurality of elongated elements transitionable between a first generally loosened configuration and a second generally tightened configuration, wherein:
   transitioning one or more of the plurality of elongated elements from the first generally loosened configuration to the second generally tightened configuration compresses the fluid reservoir to push fluid out of the fluid reservoir and into the expandable member, and
   transitioning one or more of the plurality of elongated elements from the second generally tightened configuration to the first generally loosened configuration permits fluid to flow out of the expandable member and into the fluid reservoir.
10. The system of example 9 wherein each of the plurality of elongated elements is made of a shape memory material configured to change geometry when energy is applied thereto, and wherein the change in geometry causes the corresponding elongated element to compress the fluid reservoir.
11. The system of example 9 wherein each of the plurality of elongated elements is coupled to a shape memory element configured to change geometry when energy is applied thereto, and wherein the change in geometry causes the corresponding elongated element to compress the fluid reservoir.
12. The system of any one of examples 1-4 wherein the actuation mechanism comprises:
    a rod positioned over the fluid reservoir; and
    one or more shape memory elements coupled to the reservoir and configured to change in shape when energy is applied thereto, wherein the change in shape causes the rod to slide along the fluid reservoir to push fluid out of the fluid reservoir and into the expandable member.
13. The system of any one of examples 1-4 wherein the actuation mechanism is a valve positioned between the expandable member and the fluid reservoir.
14. The system of example 13 wherein the valve has an open position that permits fluid to flow between the reservoir and the expandable member and a closed position that does not permit the fluid to flow between the reservoir and the expandable member.
15. The system of example 13 wherein the valve is configured to open when a pressure difference between the left atrium and the right atrium exceeds a predetermined threshold.
16. The system of example 13 wherein the valve is configured to open when a pressure difference between the left atrium and the right atrium falls below a predetermined threshold.
17. The system of any one of examples 1-16 wherein the expandable member is positioned at least partially within the lumen.

18. The system of any one of examples 1-17 wherein the expandable member is toroid-shaped.
19. A system for shunting blood between a left atrium and a right atrium of a patient, the system comprising:
a flow path extending between the left atrium and the right atrium;
an expandable flow control element positioned proximate and/or within the flow path, wherein the expandable flow control element is transitionable between a first geometry imparting a first flow resistance through the flow path and a second geometry imparting a second flow resistance through the flow path that is different than the first flow resistance; and
a fluid reservoir coupled to the expandable flow control element and spaced apart from the flow path,
wherein the system is configured to (i) transfer fluid from the fluid reservoir toward the expandable flow control element to transition the expandable flow control element from the first geometry toward the second geometry, and (ii) transfer fluid from the expandable flow control element to the fluid reservoir to transition the expandable flow control element from the second geometry toward the first geometry.
20. The system of example 19 wherein the first geometry has a first volume and the second geometry has a second volume greater than the first volume.
21. The system of example 19 wherein the second flow resistance is greater than the first flow resistance.
22. The system of any one of examples 19-21, further comprising a valve positioned between the expandable flow control element and the fluid reservoir, wherein the valve is configured to control the flow of the fluid between the expandable flow control element and the fluid reservoir to selectively inflate and deflate the expandable flow control element.
23. The system of any one of examples 19-22, further comprising a shape memory actuation element, wherein the shape memory actuation element is configured to control the flow of the fluid between the expandable flow control element and the fluid reservoir to selectively inflate and deflate the expandable flow control element.
24. The system of example 19 wherein the system is configured such that the fluid automatically flows out of the flow control element and into the fluid reservoir as a pressure differential between the left atrium and right atrium increases, and automatically flows out of the fluid reservoir and into the flow control element as the pressure differential between the left atrium and right atrium decreases.
25. The system of any one of examples 19-24 wherein the expandable flow control element is biased toward the first geometry.
26. The system of any one of examples 19-24 wherein the expandable flow control element is biased toward the second geometry.
27. The system of any one of examples 19-26 wherein the expandable flow control element is positioned within the flow path.
28. The system of any one of examples 19-27 wherein the expandable flow control element is positioned at and inlet and/or an outlet to the flow path.
29. The system of any one of examples 19-28 wherein the expandable flow control element is toroid-shaped.
30. A system for shunting blood between a left atrium and a right atrium of a patient, the system comprising:
a frame having a generally fixed outer diameter and configured to engage a septal wall of the patient when the system is implanted in the patient; and
a toroid-shaped expandable member positioned within the frame, the toroid-shaped expandable member having a lumen extending therethrough, wherein, when implanted within the patient, the lumen is configured to fluidly connect the left atrium and the right atrium of the patient,
wherein increasing a volume of the toroid-shaped expandable member decreases a cross-sectional area of the lumen, and
wherein decreasing a volume of the toroid-shaped expandable member increases a cross-sectional area of the lumen.
31. The system of example 30 wherein the frame prevents an outer diameter of the toroid-shaped expandable member from increasing as the volume of toroid-shaped expandable member is increased.
32. The system of example 30 or example 31 wherein the toroid-shaped expandable member is configured to receive fluid to increase its volume and is configured to expel fluid to decrease its volume.
33. The system of example 32, further comprising a fluid reservoir coupled to the toroid-shaped expandable member and configured to direct fluid to, and receive fluid from, the toroid-shaped expandable member.
34. An adjustable shunt system for moving blood between a left atrium and a right atrium of a patient, the adjustable shunt system comprising:
an external surface facing radially outward, wherein the external surface has a generally fixed diameter;
an internal surface facing radially inward, wherein the internal surface defines a lumen extending through the adjustable shunt, wherein, wherein the shunt system is implanted in the patient, the lumen is configured to fluidly couple the left atrium and the right atrium; and
a flow control element configured to change a shape and/or size of the internal surface to adjust a cross-sectional area of the lumen.
35. The adjustable shunt of example 34 wherein the flow control element is inflatable.
36. The adjustable shunt of example 34 wherein the flow control element comprises the internal surface.
37. The adjustable shunt of example 34 wherein the flow control element is distinct from the internal surface.
38. The adjustable shunt of any one of examples 34-37, further comprising an actuation element configured to move the flow control element to change the shape and/or size of the internal surface.
39. The adjustable shunt of any one of examples 34-37 wherein the actuation element is a shape memory actuation element.
40. A system for shunting blood between a left atrium and a right atrium of a patient, the system comprising:
a shunting element having a lumen extending therethrough, wherein the lumen is configured to fluidly couple the left atrium and the right atrium when the shunting element is implanted in the patient; and
a flow control element slidably receivable within the lumen, wherein the flow control element is configured to move relative to the shunting element in a direction parallel to a central longitudinal axis of the lumen in response to a change in the pressure differential between the left atrium and the right atrium to adjust the flow of blood through the lumen.

41. The system of example 40 wherein the flow control element includes:
a first end portion having an inflow aperture configured for fluid communication with the left atrium;
a second end portion spaced apart from the first end portion, and
a medial portion extending between the first end portion and the second end portion, wherein the medial portion includes an outflow aperture proximate the second end portion and in fluid communication with the inflow aperture,
wherein, when the system is implanted, the flow control element is slidable from a first position in which the outflow aperture is blocked by an inner surface of the shunting element to a second position in which the outflow aperture is in fluid communication with the right atrium, thereby fluidly connecting the left atrium and right atrium.

42. The system of example 41 wherein the flow control element is configured to slide from the first position toward the second position when a pressure differential between the left atrium and the right atrium exceeds a predetermined threshold.

43. The system of example 41 wherein the flow control element is configured to slide from the second position toward the first position when a pressure differential between the left atrium and the right atrium falls below a predetermined threshold.

44. The system of example 40 wherein the flow control element includes:
a first end portion having an inflow aperture configured for fluid communication with the left atrium;
a second end portion having an outflow aperture configured for fluid communication with the right atrium;
a medial portion extending between and fluidly coupling the first end portion and the second end portion;
wherein the system is configured such that blood flows from the inflow aperture positioned in the left atrium, through the medial portion, and out the outflow aperture positioned in the right atrium.

45. The system of example 44 wherein the second end portion includes a flange, wherein the flow control element is slidable from a first position in which the flange is in contact with the septal wall and a second position in which the flange is out of contact with the septal wall.

46. The system of example 45 wherein the flow control element is configured to slide from the first position toward the second position when a pressure differential between the left atrium and the right atrium exceeds a predetermined threshold, and wherein sliding from the first position toward the second position increases an amount of blood flowing between the left atrium and the right atrium.

47. The system of example 45 wherein the flow control element is configured to slide from the second position toward the first position when a pressure differential between the left atrium and the right atrium falls below a predetermined threshold, and wherein sliding form the second position toward the first position decreases an amount of blood flowing between the left atrium and the right atrium.

48. A method for selectively controlling blood flow between a left atrium and a right atrium in a patient using an implantable system including a shunting element having a lumen fluidly coupling the left atrium and the right atrium, the method comprising:
adjusting a volume of an expandable member positioned within and/or proximate the lumen to adjust the flow resistance through the lumen, wherein adjusting the volume includes—
flowing fluid into the expandable member to increase the volume of the expandable member and increase a flow resistance through the lumen, and/or
withdrawing fluid from the expandable member to decrease the volume of the expandable member and decrease a flow resistance through the lumen.

49. The method of example 48 wherein the shunting element further includes a fluid reservoir coupled to the expandable member, and wherein—
flowing fluid into the expandable member comprises transferring fluid from the fluid reservoir to the expandable member, and
withdrawing fluid from the expandable member comprises transferring fluid from the expandable member to the fluid reservoir.

50. The method of example 48 or example 49 wherein adjusting the volume of the expandable member comprises actuating one or more shape memory elements.

51. The method of example 48 or example 49 wherein adjusting the volume of the expandable member comprises moving one or more valves.

52. The method of example 48 or example 49 wherein the adjusting the volume of the expandable member includes automatically adjusting the volume of the expandable member based at least in part on a pressure differential between the left atrium and the right atrium.

53. The method of any one of examples 48-52, further comprising measuring one or more physiological parameters of the patient, wherein the volume of the expandable member is adjusted based at least in part on the one or more physiological parameters.

54. The method of any one of examples 48-53 wherein the one or more physiological parameters include one or more of a pressure within the left atrium, a pressure within the right atrium, or a pressure differential between the left atrium and the right atrium.

55. A method for selectively controlling blood flow between a left atrium and a right atrium in a patient using a shunting element fluidly coupling the left atrium and the right atrium, the method comprising:
after the shunting element is implanted in the patient, adjusting an inner cross-sectional area of the shunting element without adjusting an outer diameter of the shunting element to selectively alter the flow of blood through the lumen,
wherein adjusting the inner cross-sectional area of the shunting element comprises actuating one or more shape memory actuation elements carried by the shunting element.

56. The method of example 55 wherein actuating the one or more shape memory actuation elements comprises heating the one or more shape memory elements to transform the one or more shape memory elements from a first material state toward a second material state.

57. The method of example 55 wherein the first material state is martensitic and the second material state is austenitic.

58. The method of example 55 wherein the first material state is martensitic and the second material state is R-phase.

59. The method of example 55 wherein the first material state is R-phase and the second material state is austenitic.

CONCLUSION

Embodiments of the present disclosure may include some or all of the following components: a battery, supercapacitor, or other suitable power source; a microcontroller, FPGA, ASIC, or other programmable component or system capable of storing and executing software and/or firmware that drives operation of an implant; memory such as RAM or ROM to store data and/or software/firmware associated with an implant and/or its operation; wireless communication hardware such as an antenna system configured to transmit via Bluetooth®, WiFi, or other protocols known in the art; energy harvesting means, for example a coil or antenna which is capable of receiving and/or reading an externally-provided signal which may be used to power the device, charge a battery, initiate a reading from a sensor, or for other purposes. Embodiments may also include one or more sensors, such as pressure sensors, impedance sensors, accelerometers, force/strain sensors, temperature sensors, flow sensors, optical sensors, cameras, microphones or other acoustic sensors, ultrasonic sensors, ECG or other cardiac rhythm sensors, SpO2 and other sensors adapted to measure tissue and/or blood gas levels, blood volume sensors, and other sensors known to those who are skilled in the art. Embodiments may include portions that are radiopaque and/or ultrasonically reflective to facilitate image-guided implantation or image guided procedures using techniques such as fluoroscopy, ultrasonography, or other imaging methods. Embodiments of the system may include specialized delivery catheters/systems that are adapted to deliver an implant and/or carry out a procedure. Systems may include components such as guidewires, sheaths, dilators, and multiple delivery catheters. Components may be exchanged via over-the-wire, rapid exchange, combination, or other approaches.

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments. For example, although this disclosure has been written to describe devices that are generally described as being used to create a path of fluid communication between the LA and RA, the LV and the right ventricle (RV), or the LA and the coronary sinus, it should be appreciated that similar embodiments could be utilized for shunts between other chambers of heart or for shunts in other regions of the body.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for selectively controlling blood flow between a left atrium and a right atrium in a patient using a shunting element fluidly coupling the left atrium and the right atrium, the method comprising:
    after the shunting element is implanted in the patient, adjusting an inner cross-sectional area of the shunting element within a cross-sectional plane of the shunting element without adjusting an outer diameter of the shunting element within the cross-plane to selectively alter the flow of blood through the shunting element,
    wherein adjusting the inner cross-sectional area of the shunting element comprises actuating one or more shape memory actuation elements carried by the shunting element.

2. The method of claim 1 wherein actuating the one or more shape memory actuation elements comprises heating the one or more shape memory actuation elements to transform the one or more shape memory elements from a first material state toward a second material state.

3. The method of claim 2 wherein the first material state is martensitic and the second material state is austenitic.

4. The method of claim 2 wherein the first material state is martensitic and the second material state is R-phase.

5. The method of claim 2 wherein the first material state is R-phase and the second material state is austenitic.

6. The method of claim 2 wherein heating the one or more shape memory elements includes heating the one or more shape memory elements above a transition temperature of at least about 45 degrees Celsius.

7. The method of claim 1 wherein an outer portion of the shunting element that defines the outer diameter is in apposition with a portion of the septal wall forming a hole that the shunting element extends through.

* * * * *